(12) United States Patent
Mueck et al.

(10) Patent No.: US 10,609,595 B2
(45) Date of Patent: Mar. 31, 2020

(54) METHODS FOR PERFORMING MOBILE COMMUNICATIONS BETWEEN MOBILE TERMINAL DEVICES, BASE STATIONS, AND NETWORK CONTROL DEVICES

(71) Applicant: INTEL Corporation, Santa Clara, CA (US)

(72) Inventors: Markus Dominik Mueck, Unterhaching (DE); Michael Heimlich, Sydney (AU); Pierce Rixon, Sydney (AU); Beeshanga Jayawickrama, Sydney (AU); Eryk Dutkiewicz, Sydney (AU); Christian Drewes, Germering (DE); Gengfa Fang, Sydney (AU)

(73) Assignee: Apple Inc., Cupertino, CA (US)

( * ) Notice: Subject to any disclaimer, the term of this patent is extended or adjusted under 35 U.S.C. 154(b) by 177 days.

(21) Appl. No.: 15/758,759

(22) PCT Filed: Aug. 22, 2016

(86) PCT No.: PCT/US2016/047943
§ 371 (c)(1),
(2) Date: Mar. 9, 2018

(87) PCT Pub. No.: WO2017/052869
PCT Pub. Date: Mar. 30, 2017

(65) Prior Publication Data
US 2019/0045397 A1    Feb. 7, 2019

(30) Foreign Application Priority Data
Sep. 25, 2015   (DE) .................. 10 2015 116 250

(51) Int. Cl.
*H04W 28/08* (2009.01)
*H04W 72/04* (2009.01)
(Continued)

(52) U.S. Cl.
CPC .......... *H04W 28/085* (2013.01); *H04L 5/001* (2013.01); *H04L 5/0094* (2013.01);
(Continued)

(58) Field of Classification Search
CPC .......... H04W 72/048; H04W 72/0493; H04W 72/10; H04W 72/1263; H04W 88/06;
(Continued)

(56) References Cited

U.S. PATENT DOCUMENTS

| 2009/0219875 A1* | 9/2009 | Kwak | .................. | H04B 7/2615 370/329 |
| 2011/0255451 A1* | 10/2011 | Moon | ................... | H04L 5/0007 370/280 |

(Continued)

FOREIGN PATENT DOCUMENTS

| WO | 2014110161 A1 | 7/2014 |
| WO | 2015113499 A1 | 8/2015 |

OTHER PUBLICATIONS

German Office Action based on application No. 10 2015 116 250.4 (8 pages ) dated May 20, 2016 (for reference purpose only).
(Continued)

*Primary Examiner* — Ashley Shivers

(57) ABSTRACT

A mobile terminal device may include a radio processing circuit and a baseband processing circuit adapted to interact with the radio processing circuit. The mobile terminal device may be configured to transmit or receive a data sequence using a first channel and a second channel according to a data allocation ratio, wherein the data sequence is allocated between frequency division duplexing (FDD) transmission or reception and time division duplexing (TDD) transmission or reception according to the data allocation ratio, and concurrently to transmitting or receiving the data sequence, recurrently adjust the data allocation ratio to re-allocate the
(Continued)

distribution of the data sequence between FDD transmission or reception and TDD transmission or reception on the first channel and the second channel.

23 Claims, 19 Drawing Sheets

(51) Int. Cl.
    *H04W 88/06* (2009.01)
    *H04L 5/00* (2006.01)
    *H04L 5/14* (2006.01)

(52) U.S. Cl.
    CPC ....... *H04L 5/1469* (2013.01); *H04W 72/0493* (2013.01); *H04W 88/06* (2013.01)

(58) Field of Classification Search
    CPC ... H04W 28/085; H04W 28/10; H04W 28/18; H04W 28/26; H04L 5/0005; H04L 5/0023
    See application file for complete search history.

(56) References Cited

U.S. PATENT DOCUMENTS

| | | |
|---|---|---|
| 2013/0336175 A1 | 12/2013 | Um et al. |
| 2014/0086078 A1 | 3/2014 | Malladi et al. |
| 2015/0098322 A1 | 4/2015 | Chen et al. |
| 2015/0181601 A1 | 6/2015 | Schmidt et al. |
| 2015/0201431 A1 | 7/2015 | Um et al. |
| 2015/0271726 A1 | 9/2015 | Kim et al. |
| 2015/0365844 A1* | 12/2015 | Qin ........................ H04W 16/02 370/280 |
| 2015/0373676 A1* | 12/2015 | Lee ......................... H04L 5/001 370/280 |
| 2017/0048040 A1* | 2/2017 | Zhang .................. H04B 7/2621 |

OTHER PUBLICATIONS

International Search Report based on application No. PCT/US2016/047943 (3 pages) dated Nov. 24, 2016 (for reference purpose only).
FDD/TDD Comparison—Key Messages.
InterDigital, Inc.; "Spectrum Sharing & Dynamic Spectrum Access"; Mobile World Congress; 2015; pp. 1-23.

* cited by examiner

METHODS FOR PERFORMING MOBILE COMMUNICATIONS BETWEEN MOBILE TERMINAL DEVICES, BASE STATIONS, AND NETWORK CONTROL DEVICES

RELATED APPLICATIONS

The present application is a national stage entry according to 35 U.S.C. § 371 of PCT application No.: PCT/US2016/047943 filed on Aug. 22, 2016, which claims priority from German application No.: 10 2015 116 250.4 filed on Sep. 25, 2015, and is incorporated herein by reference in its entirety.

TECHNICAL FIELD

Various embodiments relate generally to methods for performing mobile communications, mobile terminal devices, base stations, and network control devices.

BACKGROUND

Conventional mobile communication networks may utilize either time division duplexing (TDD) or frequency division duplexing (FDD) schemes to facilitate uplink and downlink communications between mobile terminals and base stations.

In TDD schemes, uplink and downlink communications are separated from one another on a time-basis by allocating certain time periods for uplink communications and other time periods for downlink communications. Accordingly, frequency resources may be shared between uplink and downlink communications.

In FDD schemes, uplink and downlink communications are separated from one another on a frequency basis by allocating certain frequency resources for uplink communication and other frequency resources for downlink communications. Uplink and downlink communications may thus occur simultaneously.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
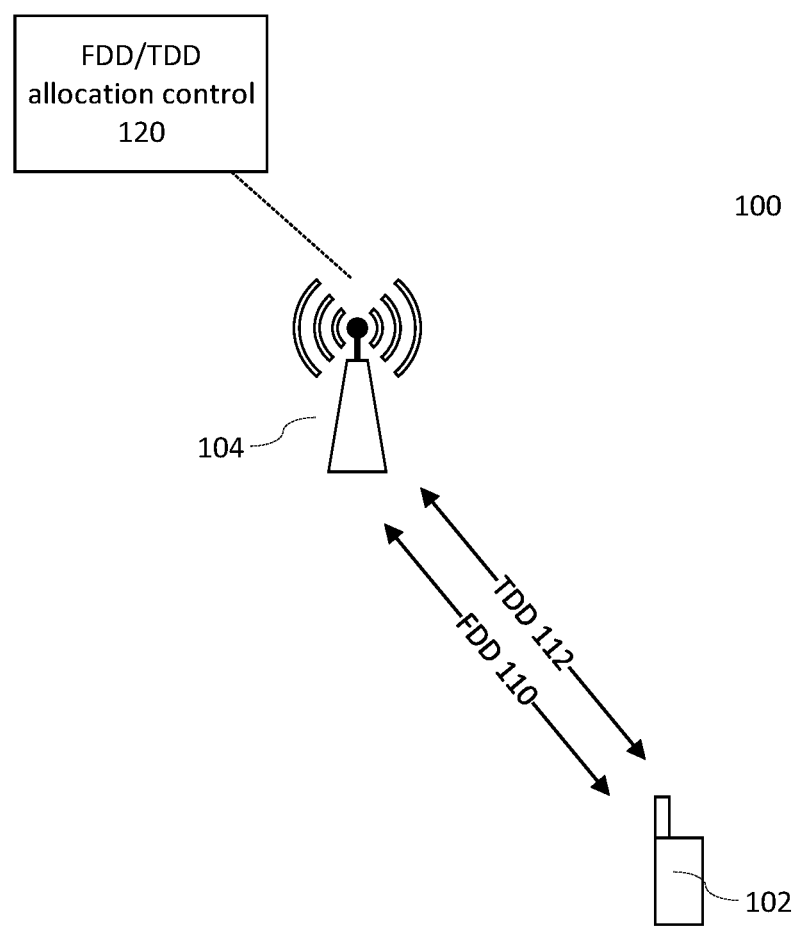
FIG. 1 shows a first mobile communication network.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

As used herein, a "circuit" may be understood as any kind of logic (analog or digital) implementing entity, which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. In particular with respect to the use of "circuitry" in the claims included herein, the use of "circuit" may be understood as collectively referring to two or more circuits.

A "processing circuit" (or equivalently "processing circuitry") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

The term "base station" used in reference to an access point of a mobile communication network may be understood as a macro base station, micro base station, Node B, evolved NodeBs (eNB), Home eNodeB, Remote Radio Head (RRH), relay point, etc.

As used herein, a "cell" in the context of telecommunications may be understood as a sector served by a base station. Accordingly, a cell may be a set of geographically co-located antennas that correspond to a particular sectorization of a base station. A base station may thus serve one or more "cells" (or sectors), where each cell is characterized by a distinct communication channel. Furthermore, the term "cell" may be utilized to refer to any of a macrocell, microcell, femtocell, picocell, etc. It is appreciated that the ensuing description may detail exemplary scenarios involving mobile device operating according to certain 3GPP (Third Generation Partnership Project) specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as any cellular wide area radio communication technology (which may include e.g. $5^{th}$ Generation (5G) communication systems, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 12), 3GPP Rel. 14 (3rd Generation Partnership Project Release 12), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, etc.), etc. The examples provided herein are thus understood as being applicable to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, is intended to encompass both an access component of a network (e.g. a radio access network (RAN) component) and a core component of a network (e.g. a core network component).

As utilized herein, the term "idle mode" used in reference to a mobile terminal refers to a radio control state in which the mobile terminal is not allocated at least one dedicated communication channel of a mobile communication network. The term "connected mode" used in reference to a mobile terminal refers to a radio control state in which the mobile terminal is allocated at least one dedicated communication channel of a mobile communication network.

Unless explicitly specified, the terms "transmit" and "send" embrace both direct and indirect transmission/sending. Similarly, the term "receive" embraces both direct and indirect reception unless explicitly specified. As utilized herein, the term "derived from" designates being obtained directly or indirectly from a specific source. Accordingly, data derived from a source includes data obtained directly from the source or indirectly from the source, i.e. through one or more secondary agents.

Communication systems may conventionally utilize time division duplexing (TDD) or frequency division duplexing (TDD) in order to facilitate uplink and downlink communications. In a mobile communication context, a TDD scheme may separate uplink and downlink communications in time while utilizing common wireless frequency resources for both uplink and downlink communications. Certain time periods may be allocated exclusively to uplink communications while other time periods may be allocated exclusively to downlink communications. Alternatively, an FDD scheme may allow for simultaneous uplink and downlink communications by using separate wireless frequency resources for uplink and downlink communications.

Both TDD and FDD schemes have distinct strengths and weaknesses, and accordingly each may be better suited for certain scenarios. In addition, to enhance spectral efficiency, TDD schemes may offer simplified beamforming and channel quality reporting due to channel reciprocity between uplink and downlink channels. Additionally, TDD schemes may reduce the overall complexity and power usage of hardware due to simplified internal circuitry (e.g. lack of duplexing circuitry and ability to share certain components between transmit and receive chains). Furthermore, TDD schemes may allow for greater adaptability in uplink/downlink load (e.g. by adjusting the total time respectively allocated for uplink and downlink relative to one another), which may prove useful in asymmetrical uplink/downlink data rate balance scenarios such as Internet or other data-heavy applications.

In contrast, FDD schemes may exhibit reduced spectral efficiency, increased complexity, higher power demands, and limited control over relative uplink/downlink data rates compared to TDD schemes. However, FDD schemes may offer concurrent transmission and reception (i.e. simultaneous uplink and downlink operation), lower latency, overall increased geographical coverage and capacity, and better performance for spectrally isolated mobile terminals.

Due to the inherent strengths and weaknesses of both FDD and TDD schemes, certain mobile communication scenarios may be better suited to an FDD scheme while others may be better served by a TDD scheme. For example, due to the comparatively limited coverage area of TDD, a TDD-configured base station supporting multiple mobile terminals at the cell edge may have weak performance compared to a counterpart FDD-configured base station servicing similarly positioned mobile terminals. Alternatively, a TDD-configured base station may be better configured to support multiple mobile terminals performing download-heavy applications than a counterpart FDD-configured base station due to the asymmetrical data load capabilities of TDD. Furthermore, certain types of mobile terminals may be better suited for either TDD or FDD operation due to design considerations.

Base stations rigidly configured according to FDD or TDD operation may experience fluctuating performance dependent on evolving cell conditions. Specific contributory factors may include mobile terminal positioning, mobile terminal access channel properties (e.g. channel state), mobile terminal type (i.e. specific make and/or model), current mobile terminal status information, mobile terminal application and other operational requirements, etc. Performance may vary as cell conditions differ over time, and overall cell-level performance may be dependent on individual contributions from each connected mobile terminal.

The performance variation may also be seen on the user side at each mobile terminal. For example, mobile terminals located at the cell-edge may strain to effectively transmit and/or receive data if served by a TDD-configured base station, but may be well-served by a TDD scheme if the mobile terminals relocate to closer distances to base station. Alternatively, mobile terminals operating in an FDD scheme may suffer from both complex design and operation due to the inclusion of duplexing circuitry, lack of certain dual-use transmit and receive chain components, and absence of channel reciprocity between the respective uplink and downlink wireless channels.

Accordingly, both base stations and mobile terminals may experience certain cell conditions that are more suitable for TDD operation and other conditions that are more suitable for FDD operation. However, base stations may be rigidly configured for either FDD or TDD operation by higher layers, and thus may not be capable of dynamically changing the duplexing scheme. As base stations may assume a controlling role in radio access networks, mobile terminals may be required to operate according to the particular duplexing scheme of the base station.

Radio access situations involving only a single set of available wireless resources, i.e. a single available carrier channel (which may be e.g. composed of one or more subcarriers distributed across the channel bandwidth), may thus be hypothetically optimized by dynamically changing the single carrier channel between FDD and TDD operation.

For example, a base station may dynamically switch a carrier channel between FDD and TDD operation dependent on the current cell conditions, thus enacting a single-channel FDD/TDD balancing system. Such a solution may be relevant where carrier aggregation or Multiple Input Multiple Output (MIMO) uplink and/or downlink communications are not supported.

Alternatively, certain radio access situations may provide multiple sets of available wireless resources, i.e. two or more separate carrier channels, such as in a carrier aggregation. Accordingly, such scenarios may allow for a first set of wireless resources (e.g. a carrier channel composed of one or more subcarriers distributed across a the channel bandwidth) to be configured to utilize an FDD scheme, while a second set of wireless resources may be configured to utilize a TDD scheme. Accordingly, uplink and downlink data may be balanced between the FDD carrier and the TDD carrier (multi-channel FDD/TDD balancing), such as by allocating data corresponding to a given mobile terminal exclusively to either the FDD carrier or the TDD carrier or by allocating data corresponding to a given mobile terminal to both the FDD carrier and the TDD carrier according to a data balancing ratio. As will be detailed, such an implementation may be particularly suitable to recent development of spectrum sharing and carrier aggregation in Fourth Generation (4G) and Fifth Generation (5G) access technologies, including FDD/TDD Carrier Aggregation optionally in conjunction with Spectrum Access System (SAS) or Licensed Spectrum Access (LSA).

Single-channel and multi-channel FDD/TDD balancing may be additionally unified to provide greater control over FDD/TDD data allocation. For example, as opposed to rigidly assigning a first carrier channel to FDD and a second carrier channel to TDD, both carrier channels may be capable of dynamic switching between FDD and TDD operation, thereby resulting in scenarios where both carrier channels use the same duplexing scheme or other scenarios where the carrier channels utilize different duplexing schemes. Multi-channel FDD/TDD balancing may then be applied in scenarios where the carrier channels utilize different duplexing schemes.

Spatial balancing may also be incorporated into such multi-channel FDD/TDD data allocation detailed above. Specifically, Multiple Input Multiple Output (MIMO) with separate FDD and TDD spatial streams (i.e. using the same wireless frequency resources) may be calibrated in order to dynamically allocate data to the FDD and/or TDD spatial stream according to a desired data allocation. Furthermore, sectorized and phased array antennas may be applied to create directional spatial streams uniquely targeting a group of mobile terminals (i.e. "group-level") or a single mobile terminal (i.e. "handset-level").

The FDD set of wireless resources and the TDD set of wireless resources may be composed of the same physical wireless resources (i.e. single channel balancing or multi-channel balancing with MIMO spatial streams), i.e. may be composed of the same frequency subcarriers, or may be composed of different (e.g. mutually exclusive) physical wireless resources (i.e. multi-channel balancing). The data allocation may be adjusted by allocating a selected data sequence between the FDD set of wireless resources and the TDD set of wireless resources according to a specific data allocation ratio, which may be adjusted dependent on the temporally and spatially evolving conditions of a cell. Spatial balancing as introduced above may allow for further sensitivity in data allocation adjustment.

Accordingly, a first aspect of this disclosure may employ multi-channel balancing to dynamically adjust the data load between multiple wireless TDD and FDD channels based on evolving cell conditions. Specifically, the first aspect of the disclosure may provide a TDD channel and an FDD channel, where each carrier channel utilizes separate wireless resources (e.g. subcarriers distributed over the channel bandwidth), thus realizing an FDD/TDD carrier aggregation scheme. A base station (or multiple base stations) may provide the FDD channel and the TDD channel to one or more mobile terminals, and may dynamically adjust the allocation of data between the FDD channel and the TDD channel over time, e.g. by updating an FDD/TDD allocation ratio. The dynamic adjustments may be based on temporally and spatially evolving cell conditions, such as the positions, status, type/make, application requirements, etc. of targeted mobile terminals. The FDD and TDD channels may then be utilized to exchange uplink and/or downlink data between the base station(s) and the mobile terminals. The first aspect of the disclosure may be controlled by an FDD/TDD allocation controller, as will be detailed.

A second aspect of this disclosure may employ single-channel balancing to dynamically adjust the data load of a single wireless channel that alternates between FDD and TDD operation based on evolving cell conditions. Specifically, the first aspect of the disclosure may provide a single carrier channel. A base station may provide the FDD/TDD channel to one or more mobile terminals, and may dynamically switch the FDD/TDD channel between FDD and TDD operation over time, e.g. by switching between exclusive FDD operation and exclusive TDD operation. Additionally, FDD/TDD allocation ratios may be provided by utilizing FDD operation for a specific cumulative amount of time relative to TDD operation. Similarly to the first aspect of the disclosure, the dynamic adjustments may be dependent on temporally and spatially evolving cell conditions, such as the positions, status, type/make, application requirements, etc. of targeted mobile terminals The FDD/TDD channel may then be utilized to exchange uplink and/or downlink data between the base station(s) and the mobile terminals. The second aspect of the disclosure may be controlled by an FDD/TDD allocation controller, as will be detailed.

A third aspect of this disclosure may apply to a combination of single-channel balancing and multi-channel balancing to dynamically adjust the data load of multiple FDD and/or TDD wireless channels based on evolving cell conditions. Specifically, the third aspect of the disclosure may provide multiple channels, such as multiple channels utilizing separate frequency resources or multiple "spatial streams" utilizing the same frequency resources in the context of a Multiple Input Multiple Output (MIMO) scheme. A base station may provide multiple such wireless channels and may individually switch each wireless channel between FDD or TDD operation in addition to allocating user data to one or both channels, potentially using a carrier aggregation scheme. The third aspect of the disclosure may provide for FDD/TDD allocation ratios by operating each wireless channel in FDD operation for a specific cumulative amount of time relative to TDD operation, and/or by allocating user data between an FDD channel and a TDD channel. Similar to the first and second aspects of the disclosure, the dynamic adjustments may be based on temporally and spatially evolving cell conditions, such as the positions, status, type/make, application requirements, etc. of targeted mobile terminals. The FDD/TDD channel may then be utilized to exchange uplink and/or downlink data between the base station(s) and the mobile terminals. The third aspect of the disclosure may be controlled by an FDD/TDD allocation controller, as will be detailed.

A fourth aspect of this disclosure may apply single and/or multi-channel balancing to dynamically adjust the data load of multiple FDD and/or TDD wireless channels over multiple cells and/or subcells based on evolving cell/subcell conditions. Specifically, the fourth aspect of the disclosure may use sectorized or phased array antennas to create multiple cells or subcells that may be uniquely served by the single and/or multi-channel balancing of any of the first, second, and/or third aspects of the disclosure. The third aspect of the disclosure may be controlled by an FDD/TDD allocation controller, as will be detailed.

Accordingly, aspects of this disclosure may dynamically adjust the relative data allocation between an FDD set of wireless resources and a TDD set of wireless resources. A selected FDD/TDD data allocation may be applied in different manners. For example, a selected FDD/TDD data allocation may be applied to a single mobile terminal using multiple carrier channels, i.e. multi-channel FDD/TDD balancing. A selected portion of a data sequence intended for the mobile terminal may be mapped to an FDD carrier channel while the remaining portion of the data sequenced may be mapped to a TDD carrier channel using an FDD/TDD carrier aggregation scheme. Depending on the relative amount of data in the selected and remaining portions, different FDD/TDD data allocation ratios may be employed ranging from 100/0 (all data mapped to the FDD carrier channel) to 0/100 (all data mapped to the TDD carrier channel). The FDD/TDD data allocation ratio may be dynamically adjusted over time, such as dependent on detected cell conditions. Assuming multiple mobile terminals are served by the FDD carrier channel and the TDD carrier channel, each mobile terminal may be individually assigned an FDD/TDD data allocation ratio. Such FDD/TDD data allocation may be applied in both uplink and/or downlink communications.

Alternatively, in a single-channel balancing scenario, FDD/TDD data allocation may be limited to cell-wide application as the carrier channel switches between FDD and TDD operation. Accordingly, the carrier channel may be controlled to operate with FDD for a first cumulative duration of time over a given time period and with TDD for the remaining cumulative duration of the given time period. Different FDD/TDD data allocation ratios may be similarly employed ranging from 100/0 (exclusive FDD operation over the entire given time period) to 0/100 (exclusive TDD operation over the entire given time period) for the given time period. The FDD/TDD data allocation ratio may be dynamically adjusted over time by adjusting the relative amounts of time spent in FDD and TDD operation one or more arbitrary time periods, such as based on detected cell conditions. As the carrier channel serves an entire cell, each mobile terminal in the cell may be assigned the FDD/TDD data allocation ratio.

Furthermore, selection of a 100/0 or 0/100 FDD/TDD data allocation ratio in certain multi-channel FDD/TDD balancing use cases may involve switching from an FDD/TDD carrier aggregation scheme to either a conventional FDD scheme (i.e. utilizing only an FDD carrier channel) or a conventional TDD scheme (i.e. utilizing only a TDD carrier), respectively, using e.g. either of the carrier channels available in the FDD/TDD carrier aggregation scheme. FDD/TDD carrier aggregation may then be "re-activated" if a new FDD/TDD data allocation ratio is selected. Alternatively, selection of a 100/0 or 0/100 FDD/TDD data allocation ratio in an FDD/TDD carrier aggregation context may involve switching both available carrier channels to FDD or TDD, respectively, thus increasing the overall bandwidth by utilizing both carrier channels in FDD carrier aggregation or TDD carrier aggregation scheme according to the FDD/TDD data allocation ratio.

Further options for applying FDD/TDD data allocations may also be utilized. For example, the modulation schemes, coding/data rates, energy levels per symbol, energy levels per set of resources/Resource Block, Forward Error Correction (FEC) schemes, beamforming schemes, coding schemes, channel bandwidth, symbol duration, and other various radio or baseband processing parameters may be adjusted between the FDD and TDD channel in order to realize FDD/TDD data allocation ratios. For example, the data rate of the FDD channel may be selected to be twice the data rate of the TDD channel, thus resulting in a 66/33 FDD/TDD data allocation ratio. It is appreciated that one or more of the aforementioned radio or baseband parameters may be similarly adjusted in order to realize various FDD/TDD data allocation ratios. Such may be relevant both for single and multi-channel FDD/TDD balancing, for example, by adjusting radio or baseband parameters for simultaneously operating FDD and TDD channels in multi-channel FDD/TDD balancing or by adjusting radio or baseband parameters during the respective active operation periods of FDD and TDD in single-channel FDD/TDD balancing.

It is appreciated that channel capacity, such as limited by channel bandwidth, may additionally be factored into the FDD/TDD data allocation ratio. For example, a 50/50 FDD/TDD cumulative time split over a given period of time may in effect result in a 66/33 FDD/TDD data allocation ratio if the FDD channel has double the channel capacity of the TDD channel. Accordingly, it is appreciated that FDD/TDD data allocation ratios may be expressed as an "absolute FDD/TDD data allocation ratio" or a "relative FDD/TDD data allocation ratio". For example, an absolute FDD/TDD data allocation ratio may designate the actual physical resource split (i.e. over time and frequency) between FDD, e.g. an unpaired 20 MHz TDD channel is allocated for a 1 minute duration followed by (or concurrent to) a paired 10 MHz FDD channel (i.e. 5 MHz uplink band and 5 MHz downlink band) for a 1 minute duration may in effect yield a 33/66 FDD/TDD absolute data allocation ratio. Alternatively, a relative FDD/TDD data allocation ratio may designate the relative percentage of each the TDD and FDD resources are allocated, e.g. utilizing 50% of the unpaired 20 MHz TDD channel and utilizing 50% of the paired 10 MHz FDD channel may in effect yield a 50/50 relative FDD/TDD data allocation ratio. For purposes of explanation, it is appreciated that unless otherwise detailed the exemplary FDD/TDD data allocation ratios may refer to an absolute FDD/TDD data allocation ratio with equal channel capacity between the FDD and TDD channels.

It is appreciated that the aforementioned multi-channel FDD/TDD balancing schemes may be applied to more than two carrier channels, where a selected FDD/TDD data allocation ratio may be appreciably reflected dependent on relative the FDD/TDD balancing of each carrier channel relative to one another.

FIG. 1 shows mobile communication network 100, which includes base station 104, mobile terminal 102, and FDD/TDD allocation controller 120, where base station 104 may be e.g. a macro base station. As shown in FIG. 1, base station 104 and mobile terminal 102 may share wireless connections in the form of FDD channel 110 and TDD channel 112, where FDD channel 110 and TDD channel 112 are wireless carrier channels each respectively composed of a specific set of subcarriers distributed across the channel bandwidth. FDD/TDD allocation controller 120 may be connected to base station 104, and may act as a controller for FDD/TDD data allocations. FDD/TDD allocation controller 120 may be incorporated as part of base station 104, such as part an existing internal component of base station 104, including e.g. a Remote Radio Unit (RRU) or Baseband Unit (BBU), or may be incorporated separately. Alternatively, FDD/TDD allocation controller 120 may be located externally to base station 104, such as located in the core network of mobile communication network 100, and thus may be connected with base station 104 over an interface.

Base station 104 may send downlink data using both FDD channel 110 and TDD channel 112, i.e. data transmitted from base station 104 and received by the mobile terminal 102. Mobile terminal 102 may send uplink data using both FDD channel 110 and TDD channel 112, i.e. data transmitted from mobile terminal 102 and received by the base station 104, according to the respective frequency and time divided duplexing schemes.

The specific wireless resources respectively assigned to FDD channel 110 and TDD channel 112 may be mutually exclusive, i.e. FDD channel 110 and TDD channel 112 may utilize different frequency bands and may e.g. be composed of different sets of subcarriers. Furthermore, the specific wireless resources respectively assigned to FDD channel 110 and TDD channel 112 may be contiguous, i.e. may border one another along the frequency axis (including any necessary guard bands)(e.g. inter-band contiguous carrier aggregation), or may be separated, i.e. may be separated from one another by a non-negligible distance on the frequency axis (e.g. separated by more than a guard band)(e.g. intra-band non-contiguous or inter-band non-contiguous). Additionally, the channel capacity of FDD channel 110 and TDD channel 112 may be either the same or different, such as according to bandwidth. For example, FDD channel 110 may have a greater channel bandwidth than TDD channel 112, and accordingly FDD channel 110 may be capable of higher data rates than TDD channel 112. Alternatively, FDD channel 110 may have equal channel bandwidth to TDD channel 112.

Accordingly, mobile terminal 102 and base station 104 may be configured to operate in accordance with a carrier aggregation scheme. Specifically, given the incorporation of both an FDD channel in FDD channel 110 and a TDD channel in TDD channel 112, mobile terminal 102 and base station 104 may be configured to operate in accordance with an FDD/TDD carrier aggregation scheme.

Carrier aggregation may allow for increased data rates due to the availability of multiple distinct channels with separate channel capacity. For example, from a downlink perspective, base station 104 may able to transmit data intended for the mobile terminal 102 (e.g., user equipment UE 102) using both FDD channel 110 and TDD channel 112, thereby utilizing the bandwidths (and connected channel capacities) of both FDD channel 110 and TDD channel 112. Base station 104 may therefore be able to transmit greater quantities of data to mobile terminal 102 through the use of both FDD channel 110 and TDD channel 112. Uplink data transmission from mobile terminal 102 to base station 104 may be similarly increased.

The carrier aggregation scheme of mobile communication network 100 may be characterized as intra-site carrier aggregation, as a single base station (base station 104) is providing all carrier channels available in the carrier aggregation scheme. Alternatively, an inter-site carrier aggregation scheme may be provided in which multiple base stations may separately provide carrier channels to the carrier aggregation scheme.

Figure 2:
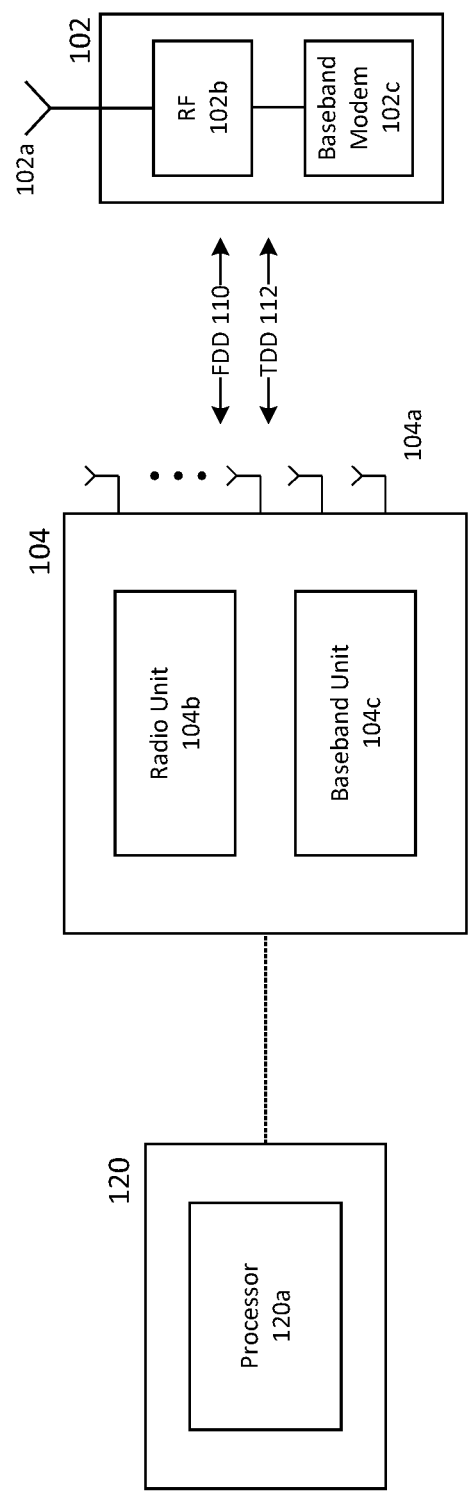
FIG. 2 shows a block diagram illustrating the internal configuration of an FDD/TDD allocation controller, a base station, and a mobile terminal.

FIG. 2 shows a block diagram illustrating the respective internal configurations of FDD/TDD allocation controller 120, base station 104, and mobile terminal 102.

As illustrated in FIG. 2, mobile terminal 102 may include antenna 102a, radio frequency (RF) transceiver 102b, and baseband modem 102c. As shown in FIG. 2, the aforementioned components of mobile terminal 102 may be implemented as separate components. However, it is appreciated that the architecture of mobile terminal 102 depicted in FIG. 2 is for purposes of explanation, and accordingly one or more of the aforementioned components of mobile terminal 102 may be integrated into a single equivalent component or divided into two separate components with collective equivalence. It is understood that mobile terminal 102 may have one or more additional components, such as additional hardware, software, or firmware elements. For example, mobile terminal 102 may further include various additional components including hardware, firmware, processors, microprocessors, memory, and other specialty or generic hardware/processors/circuits, etc., in order to support a variety of additional operations. Mobile terminal 102 may additionally include an application processor implemented as a Central Processing Unit (CPU) that may act as a controller of mobile terminal 102. Mobile terminal 102 may also include a variety of user input/output devices (display(s), keypad(s), touchscreen(s), speaker(s), external button(s), camera(s), microphone(s), etc.), peripheral device(s), memory, power supply, external device interface(s), subscriber identify module(s) (SIM) etc.

It is appreciated that the aforementioned components of mobile terminal 102, in particular, RF transceiver 102b, and baseband modem 102c may be implemented in a number of different manners, such as by hardware, firmware, software executed on hardware (e.g. a processor), or any combination thereof. Various option include analog circuit(s), digital circuit(s), logic circuit(s), processor(s), microprocessor(s), controller(s), microcontroller(s), scalar processor(s), vector processor(s), Central Processing Unit(s) (CPU), Graphics Processing Unit(s) (GPU), Digital Signal Processor(s) (DSP), Field Programmable Gate Array(s) (FPGA), integrated circuit(s), or Application Specific Integrated Circuit(s) (ASIC).

As will be detailed in an aspect of the disclosure, mobile terminal 102 may be a mobile terminal device having a radio processing circuit (RF transceiver 102b) and a baseband processing circuit (baseband modem 102c) adapted to interact with the radio processing circuit. Mobile terminal 102 may be configured to transmit or receive a data sequence using a first channel and a second channel according to a data allocation ratio, wherein the data sequence is allocated between FDD transmission or reception and TDD transmission or reception according to the data allocation ratio; and concurrently to transmitting or receiving the data sequence, recurrently adjust the data allocation ratio to re-allocate the distribution of the data sequence between FDD transmission or reception and TDD transmission or reception on the first channel and the second channel.

In a further aspect of the disclosure, mobile terminal 102 may be a mobile terminal device having a radio processing circuit (RF transceiver 102b) and a baseband processing circuit (baseband modem 102c) adapted to interact with the radio processing circuit. Mobile terminal 102 may be configured to transmit or receive first data using a first channel and a second channel according to a first data allocation ratio, wherein the first data is allocated between FDD transmission or reception and TDD transmission or reception according to the first data allocation ratio; select a second data allocation ratio different from the first data allocation ratio dependent on cell conditions of a cell served by the first channel and the second channel; and transmit or receive second data using the first channel and the second channel according to the second data allocation ratio, wherein the second data is allocated between FDD transmission or reception and TDD transmission or reception according to the second data allocation ratio.

In an abridged overview of the operation of mobile terminal 102, mobile terminal 102 may be configured to receive and/or transmit wireless signals according to multiple different wireless access protocols or radio access technologies (RATs), including any one of, or any combination of, LTE (Long Term Evolution), WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The RAT capabilities of mobile terminal 102 may be determined by one or more Subscriber Identity Modules (SIM) included in mobile terminal 102 (not explicitly shown in FIG. 1). It is appreciated that separate components may be provided for each distinct type of compatible wireless signals, such as a dedicated LTE antenna, RF transceiver, and baseband modem for LTE reception and transmission and a dedicated WiFi antenna, RF transceiver, and baseband modem for WiFi reception and transmission. Alternatively, one or more components of mobile terminal 102 may be shared between different wireless access protocols, such as e.g. by sharing antenna 102a between multiple different wireless access protocols. In an exemplary aspect of disclosure, RF transceiver 102b and/or baseband modem 102c may operate according to multiple mobile communication access protocols (i.e. "multi-mode"), and thus may be configured to support one or more of LTE, UMTS, and/or GSM access protocols.

Further according to the abridged overview of an operation of mobile terminal 102, RF transceiver 102b may receive radio frequency wireless signals via antenna 102a, which may be implemented as e.g. a single antenna or an antenna array composed of multiple antennas. RF transceiver 102b may include various reception circuitry elements, which may include e.g. analog circuitry, configured to process externally received signals, such as mixing circuitry to convert externally received RF signals to baseband and/or intermediate frequencies. RF transceiver 102b may also include amplification circuitry to amplify externally received signals, such as power amplifiers (PAs) and/or Low Noise Amplifiers (LNAs), although it is appreciated that such components may also be implemented separately. RF transceiver 102b may additionally include various transmission circuitry elements configured to transmit internally received signals, such as e.g. baseband and/or intermediate frequency signals provided by baseband modem 102c, which may include mixing circuitry to modulate internally received signals onto one or more radio frequency carrier waves and/or amplification circuitry to amplify internally received signals before transmission. RF transceiver 102b may provide such signals to antenna 102a for wireless transmission. Further references herein to reception and/or transmission of wireless signals by mobile terminal 102 may thus be understood as an interaction between antenna 102a, RF transceiver 102b, and baseband modem 102c as detailed above. Although not explicitly depicted in FIG. 2, RF transceiver 102b may be provided in addition to an application processor of mobile terminal 102.

Baseband modem 102c may include various processing circuitry configured to perform baseband (herein also including "intermediate") frequency processing, such as Analog to Digital Converters (ADCs) and/or Digital to Analog Converters (DACs), modulation/demodulation circuitry, encoding/decoding circuitry, audio codec circuitry, digital signal processing circuitry, etc. Baseband modem 102c may include hardware, software, or a combination of hardware and software. Specifically, baseband modem 102c may include one or more logic circuits, processors, microprocessors, controllers, microcontrollers, scalar processors, vector processors, Central Processing Units (CPU), Graphics Processing Units (GPU) (including General-Purpose Computing on GPU (GPGPU)), Digital Signal Processors (DSP), Field Programmable Gate Arrays (FPGA), integrated circuits, Application Specific Integrated Circuits (ASIC), etc., or any combination thereof. It is understood that a person of skill in the art will appreciate the corresponding structure disclosed herein, be it in explicit reference to a physical structure and/or in the form of mathematical formulas, prose, flow charts, or any other manner providing sufficient structure (such as e.g. regarding an algorithm). The components of baseband modem 102c may be detailed herein substantially in terms of functional operation in recognition that a person of skill in the art may readily appreciate the various possible structural realizations of baseband modem 102c using digital processing circuitry that will provide the desired functionality.

Baseband modem 102c may also include volatile and/or non-volatile memory, including random access memory (RAM), read-only memory (ROM), flash memory, solid-state storage, magnetic tape, hard disk drive(s), optical drive(s), register(s), shift register(s), processor register(s), data buffer(s) etc., or any combination thereof.

Baseband modem 102c be configured to operate one or more protocol stacks, such as a GSM protocol stack, a UMTS protocol stack, an LTE protocol stack, etc. Baseband modem 102c may be "multimode" and may thus be configured to operate in accordance with multiple RATs by executing multiple protocol stack instances simultaneously. Baseband modem 102c may therefore include a processor configured to execute program code in accordance with the protocol stacks of each associated RAT, where the program code may be stored on a memory of baseband modem 102c. Although not explicitly depicted in FIG. 2, baseband modem 102c may be configured to control one or more further components of UE 100, in particular one or more microphones and/or speakers, such as by providing output audio signals to one or more speakers and/or receiving input audio signals from one or more microphones.

The protocol stack(s) of baseband modem 102c may be configured to control operation of baseband modem 102c, such as in order to transmit and receive mobile communication signals using antenna 102a, RF transceiver 102b, and other audio components (e.g. audio transducers including microphone(s) and/or speaker(s)) in accordance with the corresponding RAT(s).

As shown in FIG. 2, base station 104 may include antenna 104a, radio unit 104b, and baseband unit 104c. Antenna 104a may, for example, include an antenna array composed of multiple antennas as shown in FIG. 2. Radio unit 104b may be connected with antenna 104a in order to perform radio frequency processing on signals before transmission or after reception on antenna 104a. Radio unit 104a may include analog processing circuitry in order to perform analog processing on radio frequency signals. Radio unit 104a may also contain digital processing circuitry.

Baseband unit 104c may be connected with radio unit 104b in order to provide and receive signals to and from radio unit 104b. Baseband unit 104c may include digital processing circuitry to perform digital processing on baseband signals. Baseband unit 104c may also include analog processing circuitry.

FDD/TDD allocation controller 120 may be connected to base station 104. FDD/TDD allocation controller 120 may be integrated as an internal component of base station 104. Accordingly, FDD/TDD allocation controller 102 may be integrated into base station 104 as an individual component or e.g. as part of baseband unit 104c.

Alternatively, FDD/TDD allocation controller 120 may be an external component connected to base station 104. FDD/TDD allocation controller 120 may be implemented as a core network component, and may be connected with one or more additional base stations.

FDD/TDD allocation controller 120 may include processor 120a, which may be configured to accumulate and evaluate dynamic allocation criteria, select FDD/TDD data allocation ratios using the dynamic allocation criteria, provide control signaling to base station 104 and mobile terminal 102, etc. Processor 120a may be implemented as e.g. a microcontroller (MCU), microprocessor (MPU), Central Processing Unit (CPU), etc., and may be configured to execute program code stored in a memory of FDD/TDD allocation controller 120 in order to control operation of FDD/TDD allocation controller 120.

As will be detailed in an aspect of the disclosure, FDD/TDD allocation controller 120 may be a network control device configured to control transmitting or receiving of first data partially in accordance with FDD operation and partially in accordance with TDD operation on a first channel and a second channel according to a first data allocation ratio, wherein the first data is allocated between FDD transmission or reception and TDD transmission or reception according to the first data allocation ratio; during the transmitting or receiving of the first data, obtain one or more criteria characterizing cell conditions of a cell corresponding to the first channel and the second channel; and select, based on the one or more criteria, a second data allocation ratio to transmit or receive second data partially in accordance with FDD operation and partially in accordance with TDD operation on the first channel and the second channel according to the second data allocation ratio. Alternatively, FDD/TDD allocation controller 120 may be an electronic circuit (i.e. processor 120a) configured to control transmitting or receiving of first data partially in accordance with FDD operation and partially in accordance with TDD operation on a first channel and a second channel according to a first data allocation ratio, wherein the first data is allocated between FDD transmission or reception and TDD transmission or reception according to the first data allocation ratio; during the transmitting or receiving of the first data, obtain one or more criteria characterizing cell conditions of a cell corresponding to the first channel and the second channel; and select, based on the one or more criteria, a second data allocation ratio to transmit or receive second data partially in accordance with FDD operation and partially in accordance with TDD operation on the first channel and the second channel according to the second data allocation ratio.

FDD/TDD allocation controller 120 may be configured to provide control signaling to base station 104 and mobile terminal 102 (via base station 104). As will be detailed, FDD/TDD allocation controller 120 may select an FDD/TDD data allocation based on dynamic allocation criteria and provide control signaling to base station 104 and mobile terminal 102 indicating the selected FDD/TDD data allocation. The control signaling may be provided to one or more of radio unit 104b, baseband unit 104c, RF transceiver 102b, and/or baseband modem 102c, which may accordingly reconfigure uplink and/or downlink communication settings in order to apply the selected FDD/TDD data allocation for uplink/and or downlink communications. Specifically, baseband unit 104c and baseband modem 102c may utilize received control signaling in order to configure uplink and/or downlink communication settings in order to implement a selected FDD/TDD data allocation. Base station 104 may either relay control signaling provided by FDD/TDD allocation controller 120 to mobile terminal 102 or may receive control signaling from FDD/TDD allocation controller 120 and determine or select or modify the form and format of control signaling to be provided to mobile terminal 102.

In a further aspect, FDD/TDD allocation controller 120 may be provided as a component of base station 104, e.g. as an electronic circuit of base station 104. Accordingly, base station 104 may be configured to control transmitting or receiving of first data partially in accordance with FDD operation and partially in accordance with TDD operation on a first channel and a second channel according to a first data allocation ratio, wherein the first data is allocated between FDD transmission or reception and TDD transmission or reception according to the first data allocation ratio; during the transmitting or receiving of the first data, obtain one or more criteria characterizing cell conditions of a cell corresponding to the first channel and the second channel; and select, based on the one or more criteria, a second data allocation ratio to transmit or receive second data partially in accordance with FDD operation and partially in accordance with TDD operation on the first channel and the second channel according to the second data allocation ratio.

The additional mobile terminals and base stations referenced herein may be configured in a similar manner as to base station 104 and mobile terminal 102.

Figure 3:
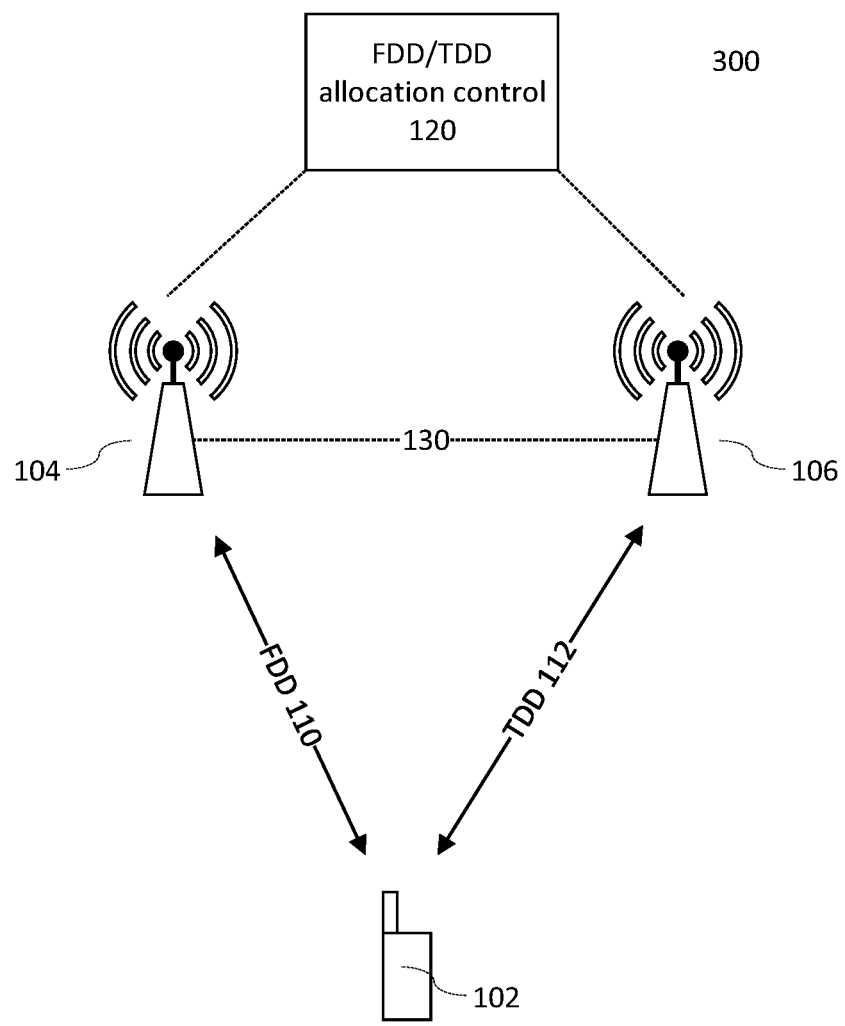
FIG. 3 shows a second mobile communication network.

FIG. 3 shows mobile communication network 300, which includes base station 104, mobile terminal 102, and FDD/TDD allocation controller 120. Mobile communication network 300 may also include base station 106. It is appreciated that base stations 104 and 106 may be realized in a number of different manners. For example, base station 104 and 106 may be macro base stations, and may be connected by interface 130 such as e.g. an X2 interface. Alternatively, in a heterogeneous network configuration, one of base stations e.g. base station 104, may be a macro base station while the other of base stations 104 and 106, e.g. base station 104, may be a micro base station (e.g. home evolved NodeB (home eNB), microcell, femtocell, picocell, etc.), and may be similarly be connected to the macro base station by interface 130 such as e.g. an X2 interface. Alternatively, one of base stations 104 and 106, e.g. base station 104, may be a macro base station while the other of base stations 104 and 106, e.g. base station 104, may be a Remote Radio Head (RRH) connected to the macro base station over interface 130 e.g. an optical fiber interface.

As shown in FIG. 3, each of FDD channel 110 and TDD channel 112 may be provided from a separate site, e.g. one of base stations 104 or 106. Accordingly, mobile terminal 102 may exchange uplink and/or downlink data with base stations 104 and 106 in accordance with an inter-site carrier aggregation scheme, e.g. an FDD/TDD carrier aggregation scheme. Base stations 104 and 106 may need to maintain a level of coordination, e.g. by interacting over interface 130, in order to effectively transmit and receive data to and from mobile terminal 102. For example, downlink data intended for mobile terminal 102 may need to be available at both base stations 104 and 106, where the downlink data may be allocated to one or both of FDD channel 110 and TDD channel 112 in coordination in order to allow for mobile terminal 102 to receive and recover the entire downlink data sequence. Similarly, data separately received by base stations 104 and 106 from mobile terminal 102 may need to be aggregated in order to recover an entire uplink data sequence.

Each of base station 104 and 106 may be connected to FDD/TDD allocation controller 120. Accordingly, FDD/TDD allocation controller 120 may be located in the core network of mobile communication network 300 in order to allow equal access by both base station 104 and 106. Alternatively, FDD/TDD allocation controller 120 may be located at one of base station 104 or 106, such as at base station 104 in a realization in which base station 104 is a macro base station and base station 106 is e.g. an RRH of base station 104. Alternatively, each of base stations 104 and 106 may include a separate instance of FDD/TDD allocation controller 120, where the separate instances of FDD/TDD allocation controller 120 may be configured to interact with one another in order to perform multi-channel FDD/TDD data allocation, as will be later detailed.

It is understood that carrier aggregation may be implanted in one of or both of the uplink and downlink paths. For example, carrier aggregation (including FDD/TDD carrier aggregation) may be applied only in the downlink path, where a mobile terminal receives downlink data on two separate carrier channels (e.g. from one or more base stations) and transmits uplink data on a single carrier channel (e.g. one of the two separate carrier channels according to conventional uplink communications). Alternatively, carrier aggregation may be applied only in the uplink path, where a mobile terminal transmits uplink data on two separate carrier channels (e.g. to one or more base stations) and receives downlink data on a single carrier channel (e.g. one of the two separate carrier channels according to conventional downlink communications). Alternatively, carrier aggregation may be applied in both the uplink and downlink paths, where a mobile terminal transmits uplink data on two separate carrier channels (e.g. to one or more base stations) and receives downlink data on two separate carrier channels (e.g. the two separate carrier channels). Accordingly, the following may refer to "uplink and/or downlink" communications in recognition thereof.

Conventional carrier aggregation may employ licensed frequency bands in order to allocate respective bandwidth to the available carrier channels. For example, a given Mobile Network Operation (MNO) may utilize dedicated frequency bands specifically licensed to the given MNO in order to allocate wireless frequency resources for each participating carrier channel, i.e. FDD channel 110 and TDD channel 112. For example, a given MNO may have a specific set of licensed wireless frequency resources across one or more frequency bands. Base station 104 may therefore select (or e.g. may be pre-configured with or supplied from a higher layer component in the core network) wireless frequency resources from the specific set of licensed wireless frequency resources to respectively allocate to both FDD channel 110 and TDD channel 112. As previously indicated, the participating carrier channels may be allocated wireless frequency resources according to several possible schemes including intra-band contiguous allocation, intra-band non-contiguous allocation, and inter-band non-contiguous allocation.

However, recent developments in radio frequency licensing have introduced new possibilities for the wireless resources available for use in carrier aggregation schemes. In particular, shared spectrum schemes such as Licensed Spectrum Access (LSA, proposed mainly for Europe in the 2.3-2.4 GHz bands) and Spectrum Access System (SAS, proposed mainly in the U.S. for the 3.55-3.7 bands) may open up access to previously restricted wireless frequency bands for mobile communications. In addition to LSA and SAS, further bands may also emerge as candidates for spectrum sharing, including in particular frequency bands under 6 GHz traditionally utilized for wireless communications as well as centimeter- and millimeter-wavelength bands above 6 GHz. Frequency bands already allocated for wireless usage in other geographic reasons may be particularly applicable candidates for spectrum sharing as manufacturers may already have mobile devices to support the candidate bands. Accordingly, in such cases only a network infrastructure may be required while existing mobile devices may be readily employed without substantial reconditioning.

While the targeted frequency bands for LSA and SAS may already be officially licensed and/or owned by incumbents (mainly related to government use), the targeted frequency bands are relatively underutilized over time and/or space. For example, the incumbents may utilize the targeted frequency bands relatively rarely, and/or may employ the targeted frequency bands only in certain areas. Accordingly, LSA and SAS propose a system in which the targeted frequency bands may be made available to cellular MNOs in scenarios, i.e. temporally and/or geographically dependent, where the incumbent is not occupying the band. For example, one or more MNOs may be granted access to the targeted frequency bands in scenarios where the incumbent is not actively occupying the targeted frequency bands, and accordingly may utilize the newly available bandwidth for mobile communications.

As indicated above, LSA has identified the 2.3-2.4 GHz frequency band (corresponding to 3GPP LTE Band 40) as a suitable candidate for spectrum sharing. Under the proposed LSA framework, a licensed MNO may operate a 3GPP LTE network on licensed shared basis, where an MNO may engage in a multi-year sharing contract with an incumbent (such as e.g. 10 years or more). As incumbents maintain prioritized access of the targeted LSA band over all licensees, any licensed MNO may be required to vacate the targeted LSA band for a given geographic area, given frequency range, and given period of time during which an incumbent is accessing the targeted LSA band.

Figure 4:
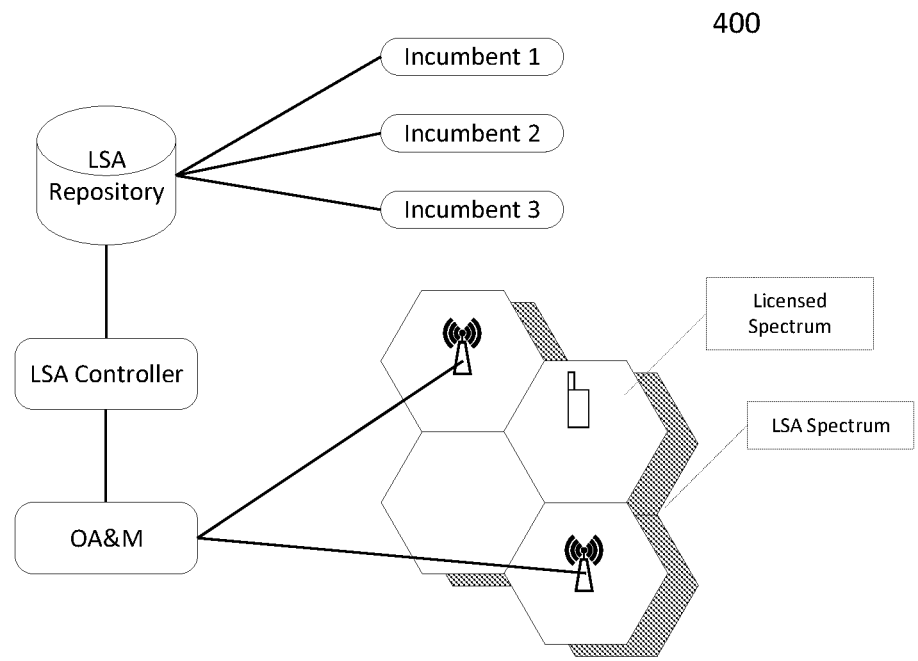
FIG. 4 shows a network architecture for an LSA network.

FIG. 4 shows block diagram 400 illustrating an LSA network architecture. As shown in FIG. 4, LSA Spectrum Management relies on a centralized LSA Repository. Incumbents may be required to provide a-priori usage information to the database on the availability of LSA spectrum on a time- and geographic-basis. Depending on the indicated usage information, an LSA controller may employ control mechanisms to grant/deny spectrum access to various licensed incumbents and issue commands to vacate concerned bands. In this operation operational approach, sensing mechanisms may not be required to support the system for identification of incumbent operation.

Similarly to LSA, proposed SAS arrangements may allow a licensed MNO to operate a 3GPP LTE network on the 3.55-3.7 GHz frequency band on a shared basis with an incumbent. However, as opposed to the two-tier system between incumbent and licensee (tier-2 and tier-2, respectively) in LSA, SAS additionally proposes a third tier (tier-3) composed of General Authorized Access (GAA) users. In this three-tier system, tier-2 users, or "Primary Access License" (PAL) users, may only be allocated a limited portion of the entire SAS band (e.g. the PAL spectrum with to 70 MHz bandwidth) in the absence of an incumbent. The remaining spectrum, in addition to any unused portions of the PAL spectrum, may be allotted to GAA users which may typically employ the available tier-3 spectrum for LTE Licensed Assisted Access (LSA) or WiFi-type systems.

Figure 5:
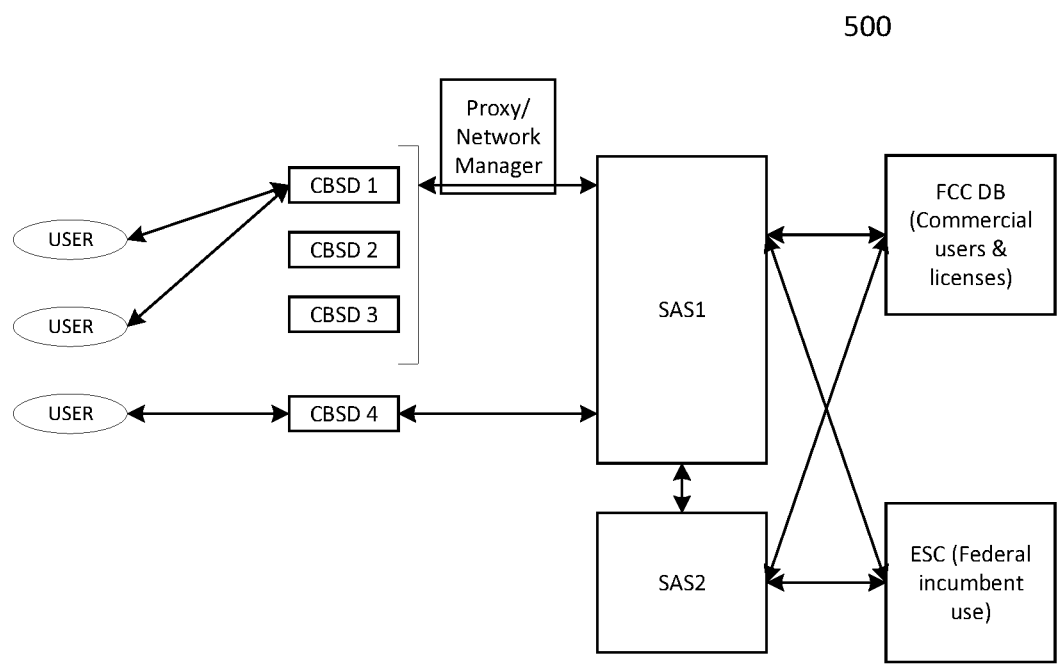
FIG. 5 shows a network architecture for an SAS network.

FIG. 5 shows block diagram 500 illustrating an SAS network architecture. In contrast to LSA, SAS may be designed to ensure coexistence between incumbent users that are not able to provide any a-priori information to a centralized database. In the context of SAS, incumbents may conventionally be military-related, and accordingly SAS systems may provide an Environmental Sensing Capability (ESC) to perform required sensing tasks. Spectrum access decisions for tier-2 (PAL) and tier-3 (GAA) users may be based on sensing results provided by an ESC.

Both LSA and SAS may additionally involve Quality of Service (QOS) guarantees, where an MNO that is granted access to a particular frequency band may be guaranteed a certain QOS level. LSA and SAS also resolve congestion problems through central coordination, such as preventing over-utilization of the targeted frequency bands by incumbents and/or other MNOs at a given time at a central control entity. As previously detailed regarding FIGS. 4 and 5, LSA and SAS systems may employ an LSA controller and SAS entity, respectively, to coordinate access between incumbents and secondary users (e.g. registered MNOs). Accordingly, these central control entities may grant secondary users access to LSA and SAS spectrum, which may be on an exclusive basis. Secondary users may therefore enjoy dedicated access to the additional spectrum available through LSA and SAS for a given period of time and in a given geographic area.

As access to LSA and SAS spectrum may be situation-dependent (i.e. time and geographic dependent), usage of LSA and SAS spectrum may be appropriate for utilization in a supplemental role. For example, given the variable availability of LSA and SAS spectrum, it may be impractical (albeit nevertheless possible) in many scenarios to realize a comprehensive wireless system entirely on LSA and SAS spectrum. However, use of LSA and SAS spectrum in a supplemental role, such as in conjunction with other licensed spectrum, during periods when the LSA and SAS spectrum is available may allow for increased bandwidth without excessive reliance on constant availability of the LSA and SAS spectrum. Furthermore, use of LSA and SAS in a supplemental role may allow for greater fluidity in availability transitions.

Accordingly, LSA and SAS spectrum may be well-suited for use in carrier aggregation schemes, which may commonly have a "primary" carrier and one or more "secondary" carriers. Accordingly, LSA and SAS spectrum may be selected for allocation of the wireless frequency resources for such secondary carriers, while dedicated (i.e. exclusively licensed) spectrum may be utilized to allocate wireless frequency resources for primary carriers. The LSA and SAS spectrum may thus be employed when available, i.e. times and/or areas where/when the incumbent is not utilizing the LAS and SAS spectrum, for secondary carriers, thus offering increased bandwidth when LSA and SAS spectrum is available while still utilizing dedicated spectrum for primary carriers at all times.

Many of the bands identified by the proposed LSA and SAS systems for European and American systems are employed in other regions as TDD bands for Third Generation Partnership Project (3GPP) networks. Accordingly, many Original Equipment Manufacturers (OEM) may already manufacture handsets configured to utilize the LSA and SAS spectrum for 3GPP TDD networks. Accordingly, it may be relatively straightforward for OEMs to enable manufactured handsets to additionally use the LSA and SAS bands for 3GPP TDD in other regions where the LSA and SAS bands were previously unavailable due to wireless frequency licensing restrictions.

Accordingly, the spectrum made available through LSA and SAS may be particularly applicable for FDD/TDD carrier aggregation, where MNOs may utilize the existing dedicated (i.e. exclusively licensed) spectrum for primary FDD carriers and the shared LSA/SAS spectrum for secondary TDD carriers, i.e. a supplementary role. It is appreciated that LSA and SAS systems may be of particular interest to multi-channel systems addressed by this disclosure, in particular where an FDD carrier channel and a TDD carrier channel are statically assigned. However, this disclosure is understood as recognizing the applicability of dynamic FDD/TDD data allocation in a comprehensive range of single- and multi-channel systems.

Accordingly, the first aspect of this disclosure introduced above regarding FIGS. 1 and 3 may employ FDD/TDD carrier aggregation, which may utilize solely dedicated spectrum for both FDD and TDD carriers, both dedicated and shared spectrum for FDD and TDD carriers, or solely shared spectrum for FDD and TDD carriers (although sole use of shared spectrum may not be preferred).

The first aspect of the disclosure may seek to optimize an FDD/TDD carrier aggregation scheme by dynamically adjusting the data allocation between an FDD and TDD carrier. As previously indicated, various cell conditions may be better served by either an FDD or TDD scheme. Similarly, various cell conditions may be better served by a specific balance between FDD and TDD, which may be open for dynamic adjustment due to the presence of separate FDD and TDD carriers. The first aspect of the disclosure adjusts the multi-channel FDD/TDD balance using FDD/TDD dynamic allocation criteria which indicate current cell conditions, including mobile terminal positioning, mobile terminal access channel properties (e.g. channel state), mobile terminal type (i.e. specific make and/or model), current mobile terminal status information, mobile terminal application and other operational requirements, etc., and may consider the aforementioned performance criteria for a single mobile terminal (i.e. handset-level), a select group of mobile terminals (i.e. group-level), or an entire cell of mobile terminals (i.e. cell-level). Such FDD/TDD data allocation may be performed at FDD/TDD allocation controller 120, which may be part of the core network or located at a base station.

The first aspect of the disclosure may be considered a frequency multiplexing scheme of FDD/TDD operation, i.e. in which certain frequency resources (i.e. a first carrier channel) are allocated for FDD operation while certain other frequency resources (i.e. a second carrier channel of different frequency resources than the first carrier channel) are allocated for TDD operation.

Figure 6:
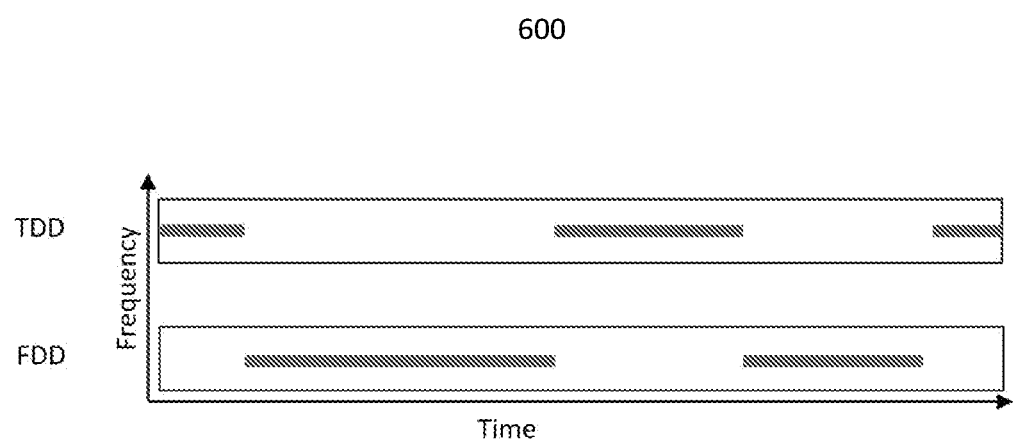
FIG. 6 shows a first timing diagram according to a multi-channel FDD/TDD data allocation scheme.
Figure 7:
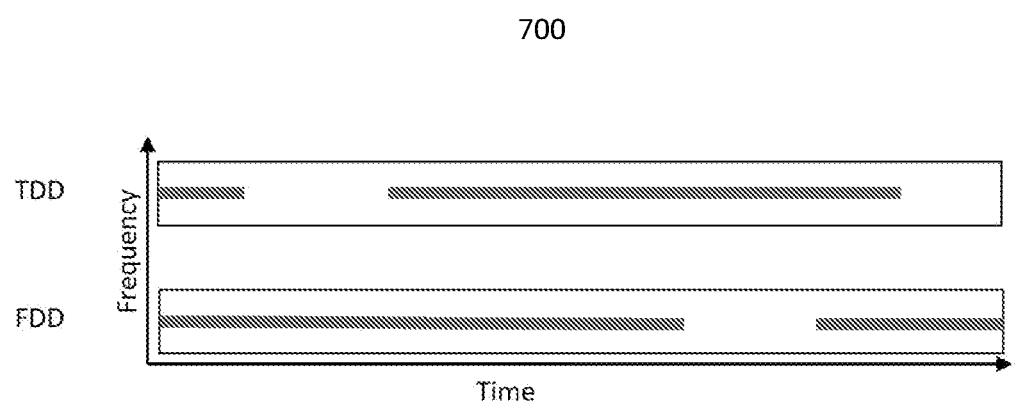
FIG. 7 shows a second timing diagram according to a multi-channel FDD/TDD data allocation scheme.

FIGS. 6 and 7 illustrate time-frequency charts 600 and 700, respectively, which illustrate FDD/TDD allocation from a handset perspective, e.g. relative to mobile terminal 102. The plotted lines of time-frequency charts 600 and 700 denote a particular FDD/TDD data allocation with respect to the first aspect of the disclosure. Accordingly, a data sequence intended for (e.g. in a downlink scenario) or originating from (e.g. in an uplink scenario) may be distributed between FDD channel 110 and TDD channel 112 according to the particular FDD/TDD data allocation ratio, such as by selecting a one or more sections of the data sequence to be allocated to FDD channel 110 and the remaining one or more sections of the data sequence to be allocated to TDD channel 112. As previously introduced, various other radio and baseband parameters may be also adjusted to realize FDD/TDD data allocation ratios, including modulation scheme, coding/data rate, energy level per symbol, energy level per set of resources/Resource Block, Forward Error Correction (FEC) scheme, beamforming scheme, coding scheme, channel bandwidth, symbol duration, etc.

FIG. 6 illustrates a multi-channel FDD/TDD data allocation scheme in time-frequency chart 600. As shown in FIG. 6, mobile terminal 102 may operate exclusively on one of either an FDD or TDD channel at a given time, e.g. either on FDD channel 110 or TDD channel 112. A network-side component, such as FDD/TDD allocation controller 120, may select which of the exclusive FDD allocation or the exclusive TDD allocation is optimal for a given scenario, which may evolve spatially and temporally, and may indicate to mobile terminal 102 which of FDD channel 110 or TDD channel 112 mobile terminal 102 should operate on over time. The FDD/TDD data allocation may be dependent on certain dynamic allocation criteria, including mobile terminal positioning, mobile terminal access channel properties (e.g. channel state), mobile terminal type (i.e. specific make and/or model), current mobile terminal status information, mobile terminal application and other operational requirements, etc., which may be accumulated and evaluated by FDD/TDD allocation controller 120 in order to determine a suitable FDD/TDD data allocation. FDD/TDD allocation controller 120 may assign mobile terminals on a handset-level, group-level, or cell-level to either FDD channel 110 or TDD channel 112 in order to realize a selected FDD/TDD data allocation ratio.

FIG. 7 illustrates a balanced FDD/TDD data allocation in time-frequency chart 700. In contrast, to time-frequency chart 600, mobile terminal 102 may be able to operate on FDD channel 110 and TDD channel 112 simultaneously. Accordingly, mobile terminal 102 may operate exclusively on FDD channel 110, exclusively on TDD channel 112, or simultaneously on both FDD channel 110 and TDD channel 112 according to an FDD/TDD data allocation between FDD channel 110 and TDD channel 112. It is appreciated that time-frequency chart 700 does not explicitly illustrate the exact FDD/TDD data allocation during time periods when mobile terminal 102 is operating on both FDD channel 110 and TDD channel 112. However it is appreciated that the FDD/TDD data allocation may vary anywhere in the range between 100/0 and 0/100. FDD/TDD allocation controller 120 may assign mobile terminals on a handset-level, group-level, or cell-level to exclusively utilize FDD channel 110, exclusively utilize TDD channel 112, or simultaneously utilize both FDD channel 110 and TDD channel 112 in order to realize a selected FDD/TDD data allocation ratio.

Figure 8:
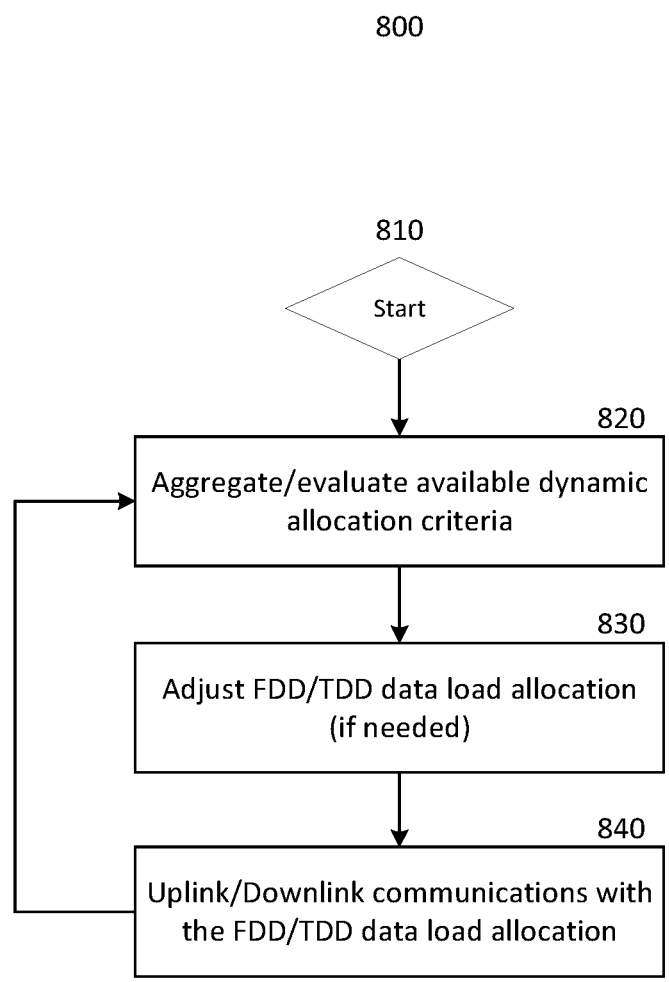
FIG. 8 shows a first flow chart illustrating method for performing multi-channel FDD/TDD data allocation.

FIG. 8 shows a flow chart illustrating a method 800 for performing multi-channel FDD/TDD data allocation in accordance with the first aspect of the disclosure. Method 800 may be performed on e.g. the network side, such as by FDD/TDD allocation controller 120, which may be configured to interact with one or more base stations in order to provide control in order to perform FDD/TDD data allocation.

Method 800 may initiate at 810. At 820, FDD/TDD allocation controller 120 may evaluate available dynamic allocation criteria in order to analyze current cell conditions, including mobile terminal positioning, mobile terminal access channel properties (e.g. channel state), mobile terminal type (i.e. specific make and/or model), current mobile terminal status information, mobile terminal application and other operation requirements (e.g. including uplink/downlink symmetry), etc. FDD/TDD allocation controller 120 may obtain the dynamic allocation criteria using control signaling received from one or more target mobile terminals, where the one or more target mobile terminals are served by the FDD/TDD carrier aggregation scheme of method 800. The dynamic allocation criteria may be provided upon request from control signaling or may be autonomously provided in a continuous or periodic manner. For example, FDD/TDD allocation controller 120 may provide control signaling to target mobile terminals (e.g. via a base station and radio access network) requesting available dynamic allocation criteria from the target mobile terminals. The control signaling may be a one-time request for available dynamic allocation criteria, which may be repeatedly sent and responded to, may request continuous provision of dynamic allocation criteria from target mobile terminals as the dynamic allocation criteria becomes available, may request periodic provision of dynamic allocation criteria from target mobile terminals according to a set period, etc.

For example, in reference to FIG. 1, mobile terminal 100 may transmit control signaling to FDD/TDD allocation controller 120 (e.g. via the radio access network and base station 104) that indicate relevant dynamic allocation criteria of mobile terminal 102. For example, mobile terminal 102 may transmit control signaling indicating the geographic position of mobile terminal 102, such as by transmitting a geographic location of mobile terminal 102 (e.g. obtained via Global Positioning Systems (GPS)) or by transmitting a reference signal from which FDD/TDD allocation controller 120 may determine the relative position, e.g. distance, of mobile terminal 102 from base station 104.

Additionally and/or alternatively, mobile terminal 102 may transmit control signaling to FDD/TDD allocation controller 120 (e.g. via the radio access network and base station 104) indicating access channel properties of the wireless channel between mobile terminal 102 and base station 104, such as e.g. channel properties of FDD channel 110 and/or TDD channel 112. For example, mobile terminal 102 may transmit data to base station 104 indicating the channel state of FDD channel 110 and/or TDD channel 112, such as by measuring reference signals transmitted by base station 104 on FDD channel 110 and/or TDD channel 112 and transmitting a report back to base station 104 indicating the channel status of FDD channel 110 and/or TDD channel 112. Alternatively, mobile terminal 102 may transmit reference signals to base station 104 on FDD channel 110 and/or TDD channel 112, which may derive the channel status of FDD channel 110 and/or TDD channel 112 by measuring the reference signals and provide the resulting measurements to FDD/TDD allocation controller 120. Such may be particularly applicable for TDD channel 112 due to channel reciprocity although may also be considered for FDD channel 110. Furthermore, mobile terminal 102 may transmit information to base station 104 to enable base station 104 to construct a Radio Environment Map (REM), which is a map detailing the receive power levels of one or more mobile terminals across a cell that may enable base station 104 to mitigate interference and/or optimize transmit power. Additionally, mobile terminal 102 may transmit information indicating spectrum sensing data to FDD/TDD allocation controller 120 (e.g. via the radio access network and base station 104), which may enable FDD/TDD allocation controller 120 to determine the presence of incumbents (e.g. in an SAS/LSA context), detect other secondary operators (e.g. in an SAS/LSA context), and to detect interference with nearby mobile terminals. The channel access properties may indicate whether mobile terminal 102 is spectrally isolated from and/or has poor wireless propagation conditions with base station 104, including spectral shielding, shadowing, interference, other phenomena, etc.

Additionally and/or alternatively, mobile terminal 102 may transmit information indicating the specific type of mobile terminal 102, such as make, model, hardware, carrier aggregation capabilities (including FDD/TDD carrier aggregation capabilities), other important features relative to FDD/TDD, etc. For example, mobile terminal 102 may transmit control signaling to FDD/TDD allocation controller 120 (e.g. via the radio access network and base station 104) specifying the make, model, presence of FDD- and/or TDD-specific hardware (e.g. presence/absence of duplexing circuitry, shared receive/transmit chain components, etc.), etc. Alternatively, mobile terminal 102 may transmit identification information of mobile terminal 102 to FDD/TDD allocation controller 120 (e.g. via the radio access network and base station 104), which FDD/TDD allocation controller 120 may utilize to access mobile terminal type information from an external location using identification information of the mobile terminal, such as by accessing a database that is pre-programmed with mobile type information for numerous mobile terminals based on mobile terminal identity.

Additionally and/or alternatively, mobile terminal 102 may transmit information indicating the current status of mobile terminal 102 to FDD/TDD allocation controller 120 (e.g. via the radio access network and base station 104), such as the current battery power level, current energy consumption level, total decode energy utilized per bit, etc.

Additionally and/or alternatively, mobile terminal 102 may transmit information indicating current application and other operational requirements of mobile terminal 102 to FDD/TDD allocation controller 120 (e.g. via the radio access network and base station 104). For example, mobile terminal 102 may transmit control signaling to FDD/TDD allocation controller 120 specifying the type of data usage currently being utilized for applications running on mobile terminal 102, such as applications using mainly voice data, mainly streaming data, etc., and/or e.g. the specific uplink/downlink data requirements of each application. Mobile terminal 102 may also indicate whether a low-latency connection is required or whether latency is not a priority. Alternatively, base station 104 may be able to determine such information based on data received from mobile terminal 102 and subsequently provide the information to FDD/TDD allocation controller 120. Additionally and/or alternatively, mobile terminal 102 may transmit information indicating other operational requirements, such as the operation of a Device-to-Device (D2D, also known as Proximity Services (ProSe)) link (e.g. active ProSe Discovery and/or ProSe Communication). For example, mobile terminal 102 may have an active D2D sidelink with another proximate mobile terminal. Mobile terminal 102 may transmit control signaling to FDD/TDD allocation controller 120 that indicate D2D activity. Alternatively, base station 104 may be able to determine such information.

Additionally and/or alternatively, mobile terminal 102 may evaluate dynamic allocation criteria locally available at mobile terminal 102, such as any of the exemplary dynamic allocation criteria detailed above. Mobile terminal 102 may then determine whether performance would be optimized if mobile terminal 102 operated with an FDD scheme (100/0 FDD/TDD data allocation ratio on a handset-level), with a TDD scheme (0/100 FDD/TDD data allocation ratio on a handset-level), or with a balance between FDD and TDD (between 100/0 and 0/100 FDD/TDD data allocation ratio on a handset level) based on the dynamic allocation criteria. Mobile terminal 102 may then transmit control signaling to FDD/TDD allocation controller 120 (via base station 104) specifying the requested FDD/TDD data allocation ratio. Accordingly, part or all of the analysis to determine the FDD/TDD data allocation ratio may be performed at mobile terminal 102. It is appreciated that any remaining analysis may then be performed at FDD/TDD allocation controller 120.

It is appreciated that numerous additional "dynamic allocation criteria" that indicate cell conditions relevant to the respective advantages and disadvantages of FDD and TDD may similarly be incorporated and considered by FDD/TDD allocation controller 120 for decision regarding FDD/TDD data allocation. Furthermore, it is appreciated that further references to "dynamic allocation criteria" may include any one of or combination of the dynamic allocation criteria detailed above.

Accordingly, FDD/TDD allocation controller 120 may receive the various dynamic allocation criteria and evaluate the available dynamic allocation criteria in 820. FDD/TDD allocation controller 120 may evaluate all dynamic allocation criteria equally, or may provide greater weight or emphasis to certain dynamic allocation criteria over others. Additionally, method FDD/TDD allocation controller 120 may evaluate only instantaneous dynamic allocation criteria, i.e. the most recently received dynamic allocation criteria, or may evaluate dynamic allocation criteria on a historical basis, such as by taking into consideration historical dynamic allocation criteria values obtained at an earlier time.

Furthermore, FDD/TDD allocation controller 120 may receive (via base station 104) dynamic allocation criteria from further mobile terminals in addition to mobile terminal 102, such as all mobile terminals served by the cell of base station 104 corresponding to FDD channel 110 and TDD channel 112. Accordingly, FDD/TDD allocation controller 120 may accumulate dynamic allocation criteria from one or more mobile terminals in order to perform FDD/TDD data allocation on a handset-level, group-level, or cell-level.

FDD/TDD allocation controller 120 may then in 830 adjust the FDD/TDD data allocation between FDD channel 110 and TDD channel 112 based on the evaluation of the available dynamic allocation criteria. In a handset-level adjustment scenario, FDD/TDD allocation controller 120 may evaluate only the dynamic allocation criteria corresponding to mobile terminal 102 in order to determine a suitable FDD/TDD data allocation ratio between FDD channel 110 and TDD channel 112 for data intended for or received from mobile terminal 102. The selected FDD/TDD data allocation ratio may range from all data exclusively allocated to FDD channel 110 to all data exclusively allocated to TDD channel 112, including the numerous data allocation ratios involving partial distribution to FDD channel 110 and partial distribution to TDD channel 112.

As previously indicated, FDD schemes may yield better performance for cell-edge mobile terminals and/or mobile terminals with challenging channel conditions. TDD schemes may allow more efficient power usage. Furthermore, certain make and models of mobile terminals may be better suited to either FDD or TDD based on the specific internal configuration and hardware. Additionally, FDD schemes may be apt for voice data due to the uplink/downlink data symmetry while streaming and Internet applications may be improved through the asymmetric uplink/downlink capabilities of TDD schemes. FDD/TDD allocation controller 120 may consider such factors when evaluating the dynamic allocation criteria in 820 to identify an optimal FDD/TDD data allocation in 830.

After adjusting the FDD/TDD data allocation in 830, FDD/TDD allocation controller 120 may continue uplink/downlink communications using the selected FDD/TDD data allocation in 840, such as by providing base station 104 with control signaling indicating the selected FDD/TDD data allocation. Base station 104 may then apply the FDD/TDD data allocation specified by the control signaling received from FDD/TDD allocation controller 120, such as by configuring uplink and downlink communications to utilize FDD channel 110 and TDD channel 112 according to the FDD/TDD data allocation specified by FDD/TDD allocation controller 120. Base station 104 may additionally provide control signaling to mobile terminal 102 (and any further target mobile terminals affected by the FDD/TDD data allocation) in order to allow mobile terminal 102 to configure uplink and downlink communications to utilize FDD channel 110 and TDD channel 112 according to the FDD/TDD data allocation specified by FDD/TDD allocation controller 120.

For example, referring to FIG. 1 in a downlink perspective, base station 104 may have a data sequence intended for mobile terminal 102. Base station 104 may distribute the data sequence between FDD channel 110 and TDD channel 112 according to the selected FDD/TDD data allocation provided by FDD/TDD allocation controller 120, such as by distributing a certain percentage of the data sequence to FDD channel 110 and the remaining portion of the data sequence to TDD channel 112. For example, FDD/TDD allocation controller 120 may select a 50/50 FDD/TDD data allocation ratio in 830. Base station 104 may therefore allocate half of the data sequence to FDD channel 110 and the other half of the data sequence to TDD channel 112. Alternatively, 830 may select a 100/0 FDD/TDD data allocation ratio, and base station 102 may accordingly allocate all of the data sequence to FDD channel 110.

Alternatively, from an uplink perspective, mobile terminal 102 may have a data sequence intended for base station 104. Mobile terminal 104 may distribute the data sequence between FDD channel 110 and TDD channel 112 according to the selected FDD/TDD data allocation provided by FDD/TDD allocation controller 120, such as by distributing a certain percentage of the data sequence to FDD channel 110 and the remaining portion of the data sequence to TDD channel 112. For example, FDD/TDD allocation controller 120 may select a 75/25 FDD/TDD data allocation ratio in 830. Mobile terminal 102 may therefore allocate 75% of the data sequence to FDD channel 110 and the remaining 25% of the data sequence to TDD channel 112.

As previously introduced, various other radio and baseband parameters may be also adjusted to realize FDD/TDD data allocation ratios, including modulation scheme, coding/data rate, energy level per symbol, energy level per set of resources/Resource Block, Forward Error Correction (FEC) scheme, beamforming scheme, coding scheme, channel bandwidth, symbol duration, etc. It is further appreciated that one or more radio or baseband parameters may be adjusted in conjunction with a FDD/TDD data sequence and/or operational time split. Accordingly, the FDD/TDD data allocation ratio may be dependent on multiple such factors at any given time.

Base station 104 may additionally transmit control signaling to mobile terminal 102 indicating the selected FDD/TDD data allocation ratio specified by FDD/TDD allocation controller 120, such as by specifying a downlink FDD/TDD data allocation between FDD channel 110 and TDD channel 112 for downlink transmissions from base station 104 to mobile terminal 102 and/or specifying an uplink FDD/TDD data allocation between FDD channel 110 and TDD channel 112 or uplink transmission from mobile terminal 102 to base station 104. It is understood that method 800 may be applied solely to downlink communications, solely to uplink communications, or simultaneously to both downlink and uplink communications.

FDD/TDD allocation controller 120 may apply method 800 on e.g. a handset-level, group-level, or cell-level. For example, FDD/TDD allocation controller 120 may individually evaluate mobile terminals (i.e. handset-level) in order to select an FDD/TDD data allocation ratio for each mobile terminal to be applied to FDD channel 110 and TDD channel 112. Alternatively, FDD/TDD allocation controller 120 may aggregate dynamic allocation criteria corresponding to a group of mobile terminals (i.e. group-level) in order to identify an FDD/TDD data allocation ratio to be uniformly applied to FDD channel 110 and TDD channel 112 for each mobile terminal in the group of mobile terminal. Alternatively, FDD/TDD allocation controller 120 may aggregate dynamic allocation criteria for all mobile terminals of an entire cell of base station 102, which may be the entire coverage area of base station 102 or a sectorized cell of base station 102, in order to identify an FDD/TDD data allocation ratio to be uniformly applied to FDD channel 110 and TDD channel 112 for all served mobile terminal. Such may additionally include setting a 100/0 or 0/100 FDD/TDD data allocation ratio to an entire cell, thus in effect de-activating one of FDD channel 110 or TDD channel 112. Base station 104 may exchange the appropriate control signaling with each target mobile terminal in order to specify the FDD/TDD data allocation ratio to be used for future uplink and/or downlink communications in 840.

FDD/TDD allocation controller 120 may additionally specify a cell- or group-level FDD/TDD allocation ratio that is cumulatively distributed between each mobile terminal in the cell or group. For example, FDD/TDD allocation controller 120 may select a cell-level FDD/TDD data allocation ratio, e.g. 75/25 for the following example. FDD/TDD allocation controller 120 may thus provide control signaling to each mobile terminal in the cell to utilize FDD channel 110 and TDD channel 112 according to a 75/25 data allocation ratio. Alternatively, FDD/TDD allocation controller 120 may individually assign each mobile terminal in the cell a respective FDD/TDD data allocation ratio, where the cumulative effect of the FDD/TDD data allocation ratio of each mobile terminal is equal to a 75/25 FDD/TDD data allocation ratio. Such may be similarly applied to groups of mobile terminals on a group-level.

Additionally, FDD/TDD allocation controller 120 may specifically control the allocation of certain types of data and the allocation of data for certain types of mobile terminals. For example, FDD/TDD allocation controller 120 may specify that all voice data may be transmitted and received using FDD channel 110 in recognition of the lower latency of FDD while all Internet download data may be transmitted and received using TDD channel 112. Similarly, FDD/TDD allocation controller 120 may allocate all uplink and downlink data for cell-edge mobile terminals to utilize FDD channel 110 while allocating all uplink and downlink data for geographically proximate mobile terminals to utilize TDD channel 112 in recognition of the stronger propagation of FDD. Alternatively, base station 102 may receive control signaling from FDD/TDD allocation controller 120 and proceed to perform such data allocation control based on the certain types of data and the allocation of data for certain types of mobile terminals.

Alternatively, each mobile terminal may identify the selected FDD/TDD data allocation at a handset-level and proceed to allocate uplink and data in recognition of the respective advantages of FDD and TDD. For example, a mobile terminal may identify an FDD/TDD data allocation ratio split between both FDD channel 110 and TDD channel 112 that is performing an Internet download at the same time as operating a voice call and may allocate possible Internet download data to FDD channel 110 and possible voice data to TDD channel 112 (e.g. constrained by the exact FDD/TDD data allocation ratio and amount of data involved in the Internet download and the voice call).

In an implementation where mobile terminals perform analysis on locally available dynamic allocation criteria, one or more mobile terminals served by base station 104 may transmit a requested FDD/TDD data allocation to FDD/TDD allocation controller 120. FDD/TDD allocation controller 120 may then evaluate the received FDD/TDD data allocations on a handset-level, group-level, or cell-level. For example, FDD/TDD allocation controller 120 may assign each mobile terminal to FDD channel 110 and TDD channel 112 according to the requested FDD/TDD data allocation provided by each mobile terminal in handset-level configuration. Alternatively, FDD/TDD allocation controller 120 may accumulate the requested FDD/TDD data allocations received from all mobile terminals served by a given cell of base station 104, and may subsequently assign a cell-level FDD/TDD allocation between FDD channel 110 and TDD channel 112 using the requested FDD/TDD data allocations FDD/TDD allocation controller 120 may perform method 800 exclusively at a single point, e.g. at base station 104 in reference to FIG. 1, as both FDD channel 110 and TDD channel 112 are served by base station 104. Alternatively, FDD/TDD allocation controller 120 may perform method 800 at multiple points, i.e. multiple base stations, in order to cooperatively adjust the FDD/TDD data allocation. For example, base station 104 and 106 may individually obtain different dynamic allocation criteria from mobile terminal 102. For example, base station 104 may obtain mobile terminal positioning location of mobile terminal 102 (i.e. relative to base station 104) in addition to access channel state information of FDD channel 110. Base station 106 may obtain mobile terminal positioning location of mobile terminal 102 (i.e. relative to base station 106) in addition to access channel state information of TDD channel 112. The dynamic allocation criteria obtained by both base stations 104 and 106 may be relevant to the FDD/TDD data allocation ratio between FDD channel 110 and TDD channel 112.

Accordingly, dependent on the location of FDD/TDD allocation controller 120 (e.g. in the core network, at one of base stations 104 or 106, or separate instances of FDD/TDD allocation controller 120 each at base station 104 and 106), base stations 104 and 106 may provide the obtained dynamic allocation criteria to FDD/TDD allocation controller 120 for evaluation. FDD/TDD allocation controller 120 may then aggregate the various dynamic allocation criteria in order to evaluate all available dynamic allocation criteria in 820 to select an optimal FDD/TDD data allocation in 830. FDD/TDD allocation controller 120 may then provide any control signaling to base stations 104 and 106 indicating the selected FDD/TDD data allocation, which may be subsequently relayed to mobile terminal 102 with further control signaling. Base stations 104 and 106 may then perform uplink/downlink communications in 840 with mobile terminal 102 using the selected FDD/TDD data allocation specified by FDD/TDD allocation controller 120.

Base stations 104 and 106 may additionally utilize interface 130 to coordinate data viability to support carrier aggregation. For example, a single data sequence may be intended for transmission to mobile terminal 102. Accordingly, base stations 104 and 106 may need to have the data sequence available, or specific assigned sections of the data sequence, to map the data sequence to FDD channel 110 and TDD channel 112, respectively, according to the selected FDD/TDD data allocation ratio to transmit the data sequence to mobile terminal 102.

Figure 9:
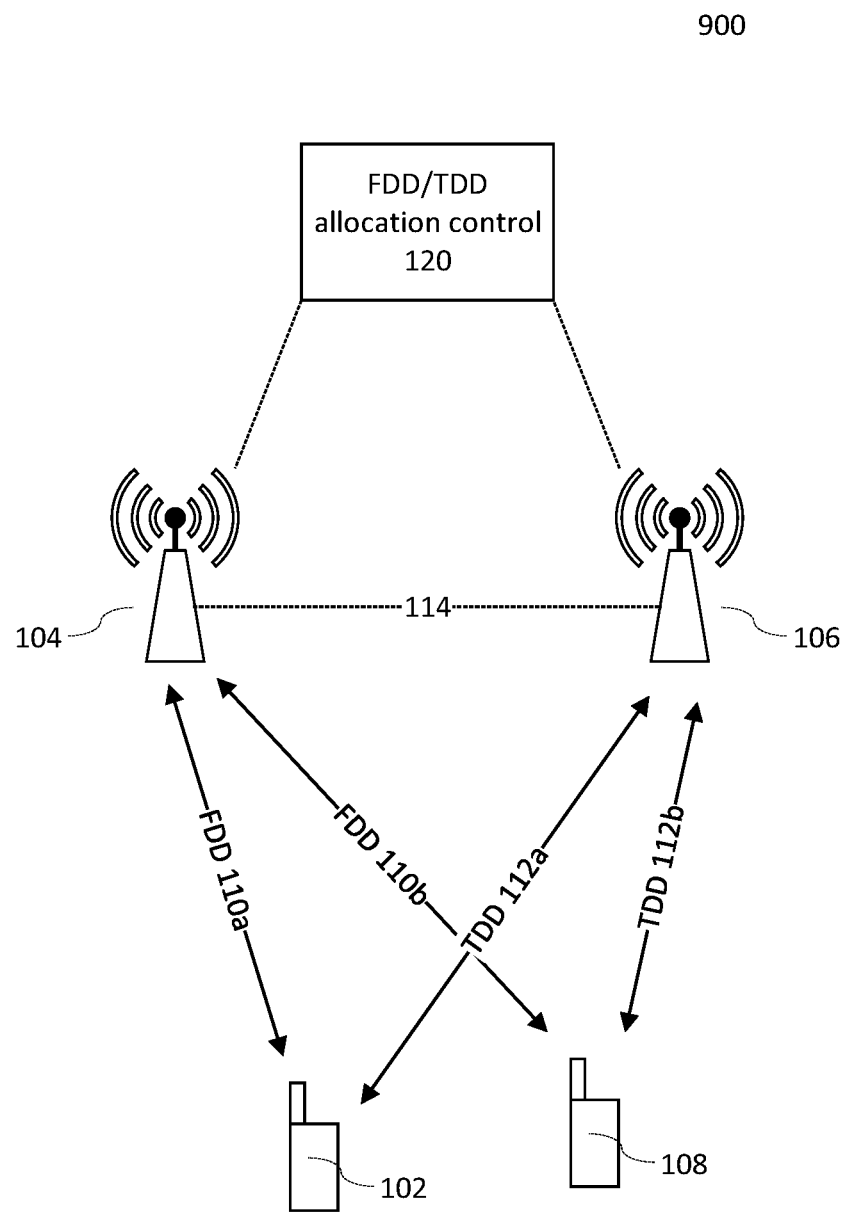
FIG. 9 shows a third mobile communication network.

Such may be additionally expanded to multiple served mobile terminals. FIG. 9 shows mobile communication network 900, which includes mobile terminals 102 and 108, base stations 104 and 106, and FDD/TDD allocation controller 120. Both mobile terminals 102 and 108 may operate as part of the FDD/TDD carrier aggregation scheme provided by base stations 104 and 106. Accordingly, both mobile terminals 102 and 108 may utilize FDD channel 110 provided by base station 104, which may be further composed of physical wireless FDD channels 110a and 110b from the perspective of mobile terminals 102 and 108, respectively. Similarly, both mobile terminals 102 and 108 may utilize TDD channel 112 provided by base station 106, which may be further composed of physical wireless TDD channels 112a and 112b from the perspective of mobile terminals 102 and 108, respectively. It is appreciated that FDD channels 110a and 110b may cumulatively compose FDD channel 110, i.e. may utilize the same wireless frequency resources (i.e. same subcarriers distributed across the channel bandwidth) as one another. However, the wireless channel response of each of FDD channels 110a and 110b may differ due to the different respective locations of mobile terminals 102, and 108 relative to base station 104. It is understood that TDD channels 112a and 112b and TDD channel 112 may be related in a substantially equivalent manner.

FDD/TDD allocation controller 120 may aggregate dynamic allocation criteria provided by base stations 104 and 106 (part or all of which may be initially received from both mobile terminals 102 and 108) in order to determine the FDD/TDD data allocation for FDD channel 110 and TDD channel 112, which may be done on a handset-level (i.e. individual FDD/TDD data allocation ratios for mobile terminals 102 and 108), on a group-level (i.e. a uniform FDD/TDD data allocation for both mobile terminals 102 and 108), or a cell-level (i.e. a uniform FDD/TDD data allocation for both mobile terminals 102, 108, and one or more further mobile terminals (not explicitly shown in FIG. 9)).

FDD/TDD allocation controller 120 (or separate counterpart instances of FDD/TDD allocation controller) may perform aggregation and coordination of dynamic allocation criteria and FDD/TDD data allocation for both base station 104 and 106. FDD/TDD allocation controller may aggregate dynamic allocation criteria received from base stations 104 and 106 and provide one or more resulting FDD/TDD data allocations to be used for mobile terminals 102 and 108 for FDD/TDD data allocation between FDD channel 110 and TDD channel 112.

As previously detailed, FDD/TDD allocation controller 120 may implemented at a higher layer within the core network of mobile communication network 900, and may be adapted to interact with both base stations 104 and 106 therefrom. Such may be particularly applicable where base stations 104 and 106 are separately located, i.e. are separate macro and/or micro base stations.

The functionality of FDD/TDD allocation controller 120 may be implemented into a single macro base station in the event that one of base stations 104 and 106 is a macro base station and the other of base stations 104 and 106 is an RRH.

Alternatively, separate counterpart instances of FDD/TDD allocation controller 120 may be realized at both base stations 104 and 106, which may communicate with one another in order to perform aggregation of dynamic allocation criteria and coordination of FDD/TDD data allocation based thereon.

Accordingly, method 800 may be used to facilitate multi-channel FDD/TDD data allocation between an FDD channel and a TDD channel in a number of different scenarios involving one or more mobile terminals, one or more base stations, and various different carrier aggregation architectures. Method 800 may rely on the aforementioned dynamic allocation criteria indicating current cell conditions, including mobile terminal positioning, mobile terminal access channel properties (e.g. channel state), mobile terminal type (i.e. specific make and/or model), current mobile terminal status information, mobile terminal application and other operational requirements, etc., in order to select an optimal FDD/TDD data allocation ratio to be applied to a single mobile terminal (handset-level), group of mobile terminals (group-level), entire cell of mobile terminals (cell-level), etc. Method 800 may thus allow adaptation of FDD/TDD balancing in order to dynamically address temporally and spatially evolving situations and cell properties to utilize an optimal FDD/TDD balance. Method 800 may utilize control signaling between FDD/TDD allocation controller 120, base station 104, and mobile terminal 102 (in addition to any further mobile terminals) in order to indicate adjustment of the FDD/TDD data allocation, thereby allowing base station 104 and mobile terminal 102 to configured uplink and downlink communications in accordance with the FDD/TDD data allocation specified by FDD/TDD allocation controller 120.

As shown in FIG. 8, method 800 may be iterative over 820-840. FDD/TDD allocation controller 120 thus may continuously repeat method 800 over time. Participating mobile terminals may therefore continuously provide dynamic allocation criteria for use by FDD/TDD allocation controller 120 in 820. Accordingly, FDD/TDD allocation controller 120 may repeatedly make any necessary adjustments to the FDD/TDD data allocation ratio before continuing to perform uplink/downlink communications with the updated FDD/TDD data allocation. FDD/TDD allocation controller 120 may execute subroutine 820-840 periodically, such as by evaluating available dynamic allocation criteria in 820 and adjusting the FDD/TDD data allocation in 830 according to a set period. Alternatively or additionally, FDD/TDD allocation controller 120 may actively trigger 820-840, such as by monitoring performance of the FDD/TDD carrier aggregation scheme and triggering an adjustment of the FDD/TDD data allocation if (or e.g. only if) performance falls below certain satisfactory performance metrics. Mobile terminals may therefore continuously provide dynamic allocation criteria and/or further reports detailing performance to FDD/TDD allocation controller 120. FDD/TDD allocation controller 120, base station 104, and any target mobile terminals may continuously exchange control signaling in order to realize any adjustments to the FDD/TDD data allocation.

Figure 10:
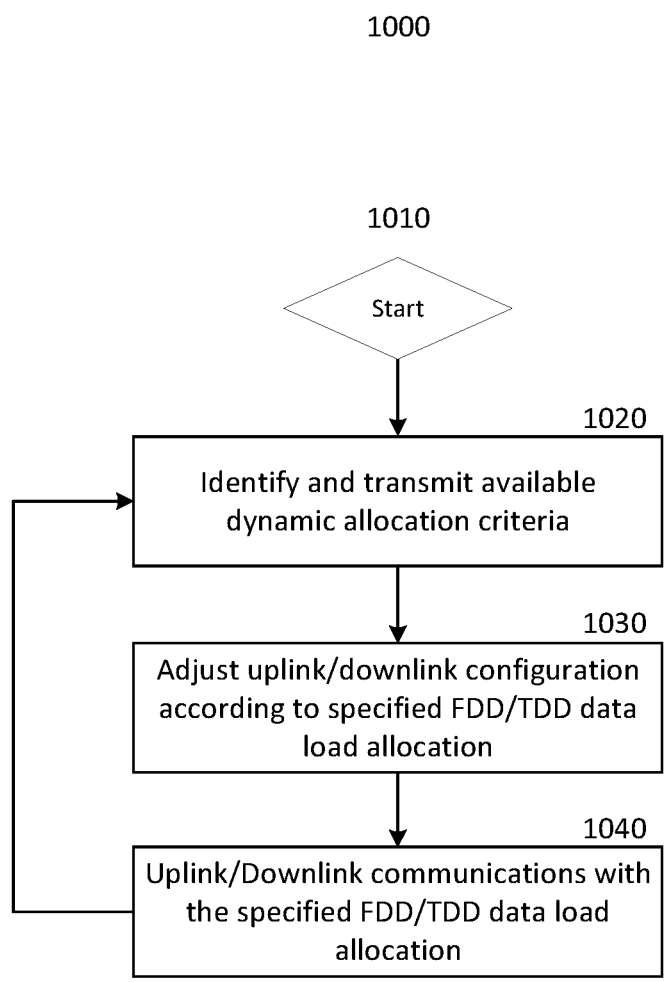
FIG. 10 shows a second flow chart illustrating a method for performing multi-channel FDD/TDD data.

FIG. 10 shows a flow chart illustrating method 1000 for performing multi-channel FDD/TDD data allocation in accordance with the first aspect of the disclosure. Method 1000 may be performed on e.g. the user side, e.g. at mobile terminal 102 and/or mobile terminal 104, and thus may act as a user-side counterpart to network-side method 800.

Method 1000 may initiate in 1010. At 1020, mobile terminal 102 may identify and transmit available dynamic allocation criteria, including mobile terminal positioning, mobile terminal access channel properties (e.g. channel state), mobile terminal type (i.e. specific make and/or model), current mobile terminal status information, mobile terminal application and other operational requirements, etc., similarly as detailed above regarding method 800. Accordingly, a mobile terminal 102 may identify any dynamic allocation criteria at the mobile terminal and transmit the dynamic allocation criteria to the network-side, e.g. to FDD/TDD allocation controller 120. 1020 may be e.g. triggered upon request by the network-side, such as by receiving a request at mobile terminal 102 from FDD/TDD allocation controller 120 (via e.g. base station 104 or 106) to provide any available current dynamic allocation criteria, which may be done using control signaling. Alternatively, 1020 may be periodically triggered according to a set period, yielding continuous repetitive iterations of 1020-1040 of method 1000. It is also appreciated that 1020 may be repeated e.g. several times before proceeding to 1030, such as by sending multiple dynamic allocation criteria reports before obtaining an updated FDD/TDD data allocation. It is appreciated that certain implementations may be modified as to not require 1020, as all dynamic allocation criteria applied for the multi-channel FDD/TDD data allocation may be potentially obtained on the network side, e.g. by base station 104 and/or 106, without user-side assistance.

Mobile terminal 102 may then adjust the uplink and/or downlink configuration in 1030, such as by adjusting transmit and/or receive configurations at a protocol stack level, according to a specified FDD/TDD data allocation, which may be e.g. received from the network side as control signaling derived from FDD/TDD allocation controller 120. For example, mobile terminal 102 may receive control signaling from e.g. base station 104 or 106 (originally derived from FDD/TDD allocation controller 120) specifying an updated FDD/TDD data allocation originally selected by FDD/TDD allocation controller 120. As detailed regarding method 800, FDD/TDD allocation controller 120 may determine the updated FDD/TDD data allocation based on the available dynamic allocation criteria.

Mobile terminal 102 may then in 1040 perform uplink and/or downlink communications with the specified FDD/TDD data allocation over FDD channel 110 and TDD channel 112. As shown in FIG. 10, mobile terminal 102 may repeat 1020-1040 iteratively.

Accordingly, the first aspect of the disclosure may apply multi-channel FDD/TDD data allocation to separate FDD/TDD channels in order to balance the FDD/TDD data load balance between the separate FDD and TDD channels. The first aspect of the disclosure may be considered a frequency multiplexing scheme of FDD/TDD operation, i.e. in which certain frequency resources (i.e. a first carrier channel) are allocated for FDD operation while certain other frequency resources (i.e. a second carrier of different frequency resources than the first carrier channel) are allocated for TDD operation.

Such an approach may allow a mobile communication network to dynamically adapt to temporally and spatially evolving cell conditions in order to utilize an optimal balance between or exclusive use of FDD and/or TDD. Such may be applicable in many FDD/TDD carrier aggregation scenarios, including FDD/TDD carrier aggregation scenarios stemming from the availability of LSA and/or SAS spectrum. It is additionally appreciated that FDD/TDD allocation controller 120 may be adapted to interact with an LSA and/or SAS control entity (e.g. LSA controller and/or SAS entity) in order to select FDD/TDD allocation ratios in accordance with LSA/SAS spectrum availability (such as for a multi-channel FDD/TDD balancing scheme).

As previously introduced, it is recognized that carrier aggregation (or e.g. FDD/TDD carrier aggregation) may only be supported in e.g. the downlink path in certain scenarios, and accordingly mobile terminals may be able to receive downlink data on multiple carrier channels but only transmit uplink data with a single carrier channel. Accordingly, mobile terminals incapable of uplink carrier aggregation that are participating in a multi-channel FDD/TDD data load allocation scheme may receive downlink data using e.g. both FDD channel 110 and TDD channel 112 while transmitting uplink data on only one of e.g. FDD channel 110 or TDD channel 112. It is understood that in such scenarios, the FDD/TDD data allocation ratio may only be applied to downlink communications (i.e. only downlink transmissions on FDD channel 110 and TDD channel 112 may be allocated according to the FDD/TDD data allocation ratio specified by FDD/TDD allocation controller 120) while mobile terminals (or e.g. all mobile terminals that do not support FDD/TDD carrier aggregation) may transmit uplink data on one of FDD channel 110 or TDD channel 112. In such scenarios, mobile terminals may continuously transmit on either FDD channel 110 or TDD channel 112, e.g. not in accordance with the FDD/TDD data allocation ratio (i.e. the FDD/TDD data allocation ratio may only apply to downlink in situations where an FDD channel and a TDD channel are constantly available). Alternatively, mobile terminals not capable of uplink carrier aggregation may switch uplink data transmission between FDD channel 110 and TDD channel 112 in order to utilize FDD for a certain amount of time relative to TDD, thus in effect satisfying the FDD/TDD data allocation ratio specified by FDD/TDD allocation controller 120 (as will be detailed regarding the second aspect of the disclosure). FDD/TDD allocation controller 120 may thus additionally consider the carrier aggregation capabilities of each mobile terminal on a handset-level, group-level, or cell-level as dynamic allocation criteria in selecting an FDD/TDD data allocation.

Accordingly, FDD/TDD allocation controller 120 may designate both an uplink FDD/TDD data allocation ratio and a downlink FDD/TDD data allocation ratio, e.g. in multi-channel FDD/TDD balancing. For example, mobile terminal 102 may receive downlink data on FDD channel 110 and TDD channel 112 according to the downlink FDD/TDD data allocation ratio, and may transmit uplink data exclusively using either FDD channel 110 (100/0 FDD/TDD data allocation ratio), TDD channel 112 (0/100 FDD/TDD data allocation ratio), or by periodically switching between transmitting uplink data on FDD channel 110 and transmitting uplink data on TDD channel 112 (FDD/TDD data allocation ratio between 100/0 and 0/100 dependent on the duration of time using FDD channel 110 relative to the duration of time using TDD channel 112). Alternatively, mobile terminal 102 may concurrently transmit uplink data on FDD channel 110 and TDD channel 112 using an uplink FDD/TDD data allocation ratio different from a downlink FDD/TDD data allocation ratio used to receive data on FDD channel 110 and TDD channel 112. For purposes of explanation, it is appreciated that the description included below may mainly focus on use cases in which FDD/TDD carrier aggregation is available in both the downlink and uplink directions. However, as detailed above it is additionally recognized that the single- and multi-channel FDD/TDD balancing detailed herein may be readily applied to other potential use cases.

Many mobile communication networks may not support any carrier aggregation, such as due to wireless frequency licensing and/or technological complexity issues. Accordingly, many such mobile communication networks may utilize a single carrier channel for uplink and downlink communications (e.g. a single paired spectrum channel in the case of FDD or a single unpaired channel for TDD). It is appreciated that the term "single-channel" may refer to a single set of wireless frequency resources, which may in effect be utilized as two distinct channels each using the same set of wireless frequency resources that are multiplexed in time between FDD and TDD operation, i.e. a time multiplexing scheme between FDD and TDD operation.

In the second aspect of the disclosure, multi-channel FDD/TDD data allocation as detailed herein may also be applied to such systems that utilize only a single carrier for mobile communications. The single carrier may be dynamically switched between FDD and TDD operation, such as based on evaluation of dynamic allocation criteria as detailed regarding the first aspect of the disclosure. As the single carrier (i.e. single set of wireless resources) may typically be used to serve an entire cell, the single-channel FDD/TDD data allocation of the second aspect of the disclosure may be applied on a cell-level, i.e. to all of the mobile terminals served by a given cell. Accordingly, the evaluation of dynamic allocation criteria may involve aggregating available dynamic allocation criteria from all mobile terminals served by a given cell in order to identify which of FDD or TDD would be better suited to the current situation and cell properties. The single-channel FDD/TDD data allocation may thus be based on the collective statuses and needs of each served mobile terminal in a given cell. It is appreciated that the single-channel FDD/TDD data allocation may be considered a form of cell-level multi-channel FDD/TDD data allocation switching exclusively between 100/0 or 0/100 FDD/TDD data allocation ratios. Additionally, it is appreciated that the relative time spent in FDD and TDD mode may cumulate over time to also result in a form of FDD/TDD data allocation, such as e.g. by spending 90% of the available time of a given time window in FDD and the remaining 10% of the time of the given time window in TDD, thus realizing a 90/10 FDD/TDD data allocation ratio over the given time window. It is appreciated that such FDD/TDD switching over cumulative time periods may be further adjusted to realize various FDD/TDD data allocation ratios.

Figure 11:
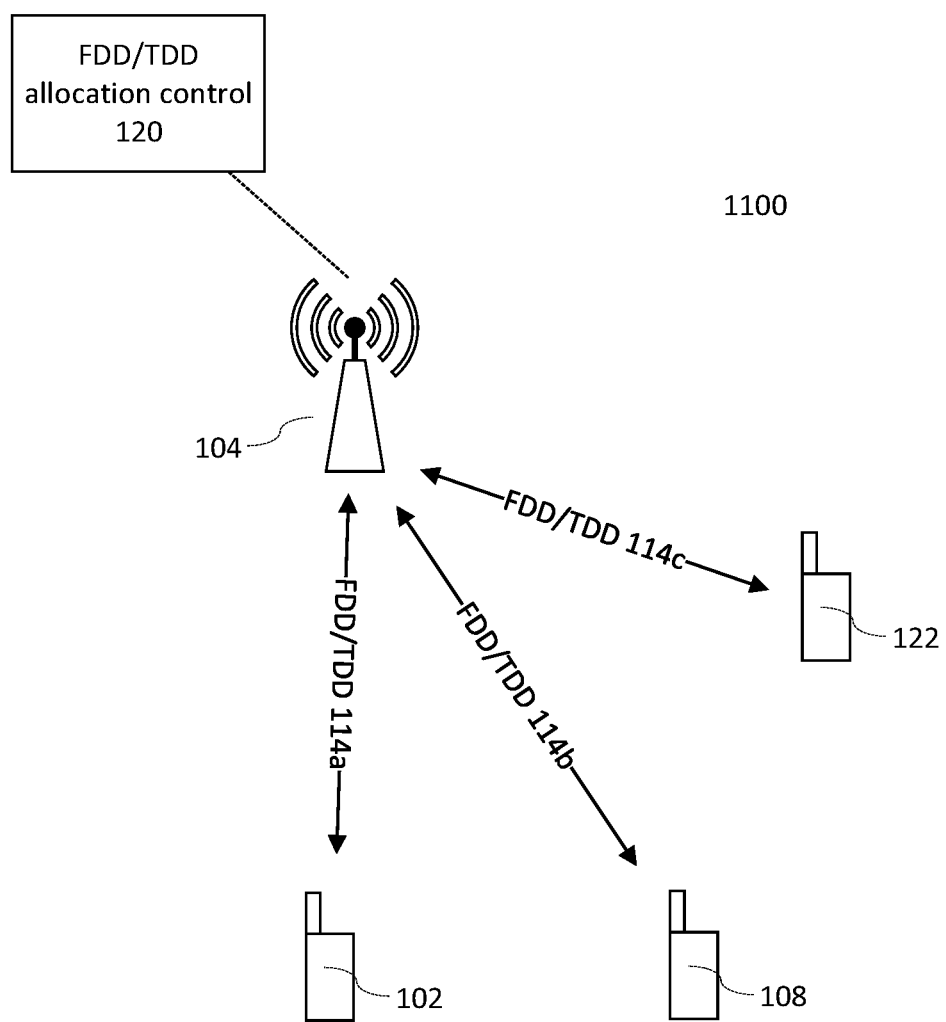
FIG. 11 shows a fourth mobile communication network.

FIG. 11 shows mobile communication network 1100, which includes base station 104, mobile terminals 102, 108, and 122, and FDD/TDD allocation controller 120. As shown in FIG. 11, base station 104 may provide alternating FDD/TDD channel 114 to mobile terminal mobile terminals 102, 108, and 122, i.e. where each of mobile terminals 102, 108, and 122 is wirelessly connected to base station 104 through alternating FDD/TDD channels 114a-114c. It is appreciated that alternating FDD/TDD channels 114a-114c may cumulatively compose alternating FDD/TDD channel 114, i.e. may utilize the same wireless frequency resources (i.e. same subcarriers distributed across the channel bandwidth) as one another. However, the wireless channel response of each of alternating FDD/TDD channels 114a-114c may differ due to the different respective locations of mobile terminals 102, 108, and 122 relative to base station 104.

As previously indicated, the single-channel FDD/TDD data allocation of the second aspect of the disclosure may entail exclusive switching of a single carrier channel (i.e. single set of wireless frequency resources) between FDD and TDD on a cell level. Accordingly, alternating FDD/TDD channel 114 may periodically alternate between FDD operation and TDD channel operation, such as controlled by FDD/TDD allocation controller 120. The FDD/TDD switching of alternating FDD/TDD channel 102 may thus adapt to the spatially and temporally evolving situations and cell properties relevant to base station 104. The single-channel FDD/TDD data allocation scheme may thus be considered a time-multiplexed FDD/TDD operation scheme, in which certain durations of time are allocated for FDD operation of a single carrier channel and other durations of time are allocated for TDD operation of the single carrier channel.

Figure 12:
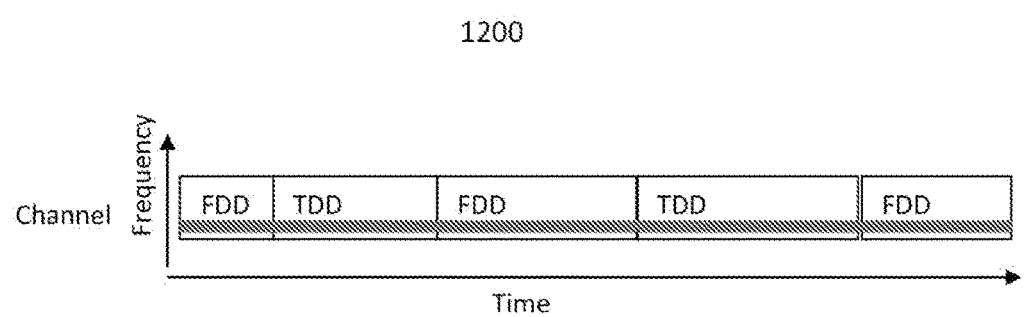
FIG. 12 shows a third timing diagram according to a single-channel FDD/TDD data allocation scheme.

FIG. 12 shows time-frequency chart 1200 illustrating the single-channel FDD/TDD data allocation of the second aspect of the disclosure. Time-frequency chart 1200 may depict single-channel FDD/TDD data allocation applicable to both a network and user perspective due to the cell-level application of the single-channel FDD/TDD data allocation of the second aspect of the disclosure.

Time-frequency chart 1200 illustrates an exemplary scenario in which alternating FDD/TDD channel 114 switches between FDD and TDD mode. As this FDD/TDD data load switching is applied cell-wide (i.e. on a cell-level), each of mobile terminals 102, 108, and 122 may experience switches from FDD to TDD and vice versa in alternating FDD/TDD channels 114a-114c. FDD/TDD data load switches may be signaled ahead of time, such as by base station 104 in the form of control signaling (derived from FDD/TDD allocation controller 120), which may be received by mobile terminals 102, 108, and 122. Mobile terminals 102, 108, and 122 may thus adjust the uplink/downlink configuration in order to adapt to the FDD/TDD switch of alternating FDD/TDD channel 114. Similarly to as detailed above regarding the first aspect of the disclosure, a network-side component such as FDD/TDD allocation controller 120 may determine the timing of the FDD/TDD switching based on the temporal and spatial variation of cell conditions, such as indicated by dynamic allocation criteria including mobile terminal positioning, mobile terminal access channel properties (e.g. channel state), mobile terminal type (i.e. specific make and/or model), current mobile terminal status information, mobile terminal application and other operational requirements, etc. FDD/TDD allocation controller 120 may then trigger dynamic FDD/TDD data allocation adjustments by instituting switches between FDD and TDD operation.

As will be detailed, methods 800 and 1000 as detailed regarding the multi-channel FDD/TDD data allocation of the first aspect of the disclosure may similarly be applicable to the single-channel FDD/TDD data allocation of the second aspect of the disclosure.

In reference to FIGS. 8 and 11, FDD/TDD allocation controller 120 may perform method 800 at the network-side. In 810, method 800 may initiate. In 820, FDD/TDD allocation controller 120 may evaluate available dynamic allocation criteria. As detailed above, FDD/TDD allocation controller 120 may utilize the dynamic allocation criteria to analyze current cell conditions, including mobile terminal positioning, mobile terminal access channel properties (e.g. channel state), mobile terminal type (i.e. specific make and/or model), current mobile terminal status information, mobile terminal application and other operational requirements, etc., which may be obtained from one or more of mobile terminals 102, 108, and 122 in addition to one or more further mobile terminals served by alternating FDD/TDD channel 114 (not explicitly shown in FIG. 11). The dynamic allocation criteria may be provided upon request from control signaling or may be autonomously provided in a continuous or periodic manner.

Accordingly, FDD/TDD allocation controller 120 may in 820 evaluate all available dynamic allocation criteria aggregated from e.g. all or substantially all mobile terminals served by alternating FDD/TDD channel 114 (i.e. all mobile terminals served by a particular cell of base station 104 served by alternating FDD/TDD channel 114). FDD/TDD allocation controller 120 may consider each dynamic allocation criteria equally or e.g. weigh each dynamic allocation criteria according to priority.

Based on the dynamic allocation criteria evaluation in 820, FDD/TDD allocation controller 120 may adjust the FDD/TDD data allocation of alternating FDD/TDD channel 114 in 830. Specifically, FDD/TDD allocation controller 120 may switch alternating FDD/TDD channel 114 between FDD and TDD operation, thereby switching the FDD/TDD data allocation ratio on a cell-level from 100/0 to 0/100 or from 0/100 to 100/0.

FDD/TDD allocation controller 120 may then initiate uplink and/or downlink communications with the selected FDD/TDD data allocation in 840, i.e. either with alternating FDD/TDD channel 114 set to FDD operation or and alternating FDD/TDD channel set to TDD operation. FDD/TDD allocation controller 120 may provide control signaling to base station 104 to initiate uplink and/or downlink communications with the selected FDD/TDD data allocation, which may then relay control signaling to mobile terminals 102, 108, and 122 in order to trigger reconfiguration of uplink and downlink communications in accordance with the selected FDD/TDD data allocation.

As previously detailed regarding the first aspect of the disclosure, FDD/TDD allocation controller 120 may iteratively repeat 820-840, i.e. may periodically evaluate available dynamic allocation criteria in order to determine whether the FDD/TDD data allocation should be adjusted, i.e. whether FDD/TDD channel 114 should be set to FDD operation or set to TDD operation. Such evaluation and adjustment may be performed according to e.g. a set period and/or may be triggered based on performance observations.

In reference to FIGS. 10 and 11, method 1000 may be performed at the user side, e.g. at one or more of mobile terminals 102, 108, and 122, e.g. at mobile terminal 102. Method 1000 may initiate at 1010. In 1020, mobile terminal 102 may identify and transmit available dynamic allocation criteria. Accordingly, mobile terminal 102 may identify any dynamic allocation criteria at the mobile terminal and transmit the dynamic allocation criteria to the network-side at 1020, e.g. to FDD/TDD allocation controller 120 via base station 104. 1020 may be triggered upon request from the network component, e.g. FDD/TDD allocation controller 120, such as by receiving a request at the mobile terminal from the counterpart network component, e.g. base station 104, to provide any available dynamic allocation criteria. Alternatively, 1020 may be periodically triggered according to a set period, yielding continuous repetitive iterations of 1020-1040 of method 1000. It is also appreciated that 1020 may be repeated e.g. several times before proceeding to 1030, such as by sending multiple dynamic allocation criteria reports before obtaining an updated FDD/TDD data allocation in 1030. It is appreciated that certain implementations may be modified as to not require 1020, as all dynamic allocation criteria applied for the single-channel FDD/TDD data allocation may be potentially obtained on the network side, e.g. by base station 104, without user-side assistance.

Mobile terminal 102 may then adjust the current uplink and/or downlink configuration in 1030, such as by adjusting transmit and/or receive configurations at a protocol stack level, according to a specified FDD/TDD data allocation, which may be e.g. received from the network side as control signaling from FDD/TDD allocation controller 120. In accordance with the single-channel FDD/TDD data allocation of the second aspect of the disclosure, the specified FDD/TDD data allocation may specify a switch in alternating FDD/TDD channel 114 between FDD and TDD operation. As detailed regarding method 800, a network-side component, such as e.g. FDD/TDD allocation controller 120, may determine the updated FDD/TDD data allocation based on the available dynamic allocation criteria. Mobile terminal 102 may then perform uplink and/or downlink communications over alternating FDD/TDD channel 114 according to the specified FDD/TDD data allocation in 1040, i.e. over alternating FDD/TDD channel 114 exclusively with FDD or TDD operation.

The second aspect of the disclosure may thus utilize single-channel FDD/TDD data allocation to alternatively switch a single carrier channel between FDD and TDD operation on a cell-level. FDD/TDD data load switches may be triggered based on dynamic allocation criteria aggregated from multiple mobile terminals served by the carrier channel, including mobile terminal positioning, mobile terminal access channel properties (e.g. channel state), mobile terminal type (i.e. specific make and/or model), current mobile terminal status information, mobile terminal application and other operational requirements, etc., and may be periodically triggered over time to dynamically evolve to changing cell conditions. Accordingly, it is appreciated that the single-channel FDD/TDD data allocation scheme of the second aspect of the disclosure may be a single-channel time-multiplexed scheme alternating between FDD and TDD operation on a time-basis, such as by operating in FDD for certain time periods and TDD for other time periods.

As previously indicated, while the single-channel FDD/TDD data allocation of the second aspect of the disclosure may operate in a mutually exclusive fashion, i.e. only one of FDD or TDD may be active at a given time, it may still be possible to implement an FDD/TDD data allocation ratio by allocating FDD and TDD time periods relative to one another over a cumulative time window. For example, a cumulative time period of e.g. 10 milliseconds may be selected. For a 90/10 FDD/TDD data allocation ratio, FDD-exclusive operation may be triggered for 90% of the 10 millisecond time window, i.e. 9 total milliseconds (which may be e.g. a contiguous 9 millisecond block or multiple dispersed blocks adding up to 9 milliseconds in total duration), while TDD-exclusive operation may be triggered for the remaining 10% of the 10 millisecond time window, i.e. 1 total millisecond (which may be e.g. a contiguous block of 1 millisecond or multiple dispersed blocks adding up to 1 millisecond in total duration). It is noted that all such values are exemplary, and accordingly may be adjusted for application of any FDD/TDD data allocation ratio between 100/0 and 0/100 over a time period of any selected duration.

Accordingly, FDD/TDD allocation controller 120 may at 830 select an FDD/TDD data allocation ratio, e.g. 60/40, and may additionally e.g. select a targeted time period. FDD/TDD allocation controller 120 may then apply the selected FDD/TDD data allocation ratio to initiate uplink and/or downlink communications over the targeted time period, such as by utilizing alternating FDD/TDD channel 114 with FDD for a cumulative 60% of the targeted time period and utilizing alternating FDD/TDD channel 114 with TDD for the remaining 40% of the targeted time period.

As previously introduced, other radio and baseband processing parameters may be adjusted in order to realize FDD/TDD data allocation ratios, including modulation schemes, coding/data rates, energy levels per symbol, energy levels per set of resources/Resource Block, Forward Error Correction (FEC) schemes, beamforming schemes, coding schemes, channel bandwidth, symbol duration, etc. Accordingly, adjustment of radio or baseband processing parameters may additionally effect the FDD/TDD data allocation ratio. Furthermore, equal FDD and TDD operation times may be utilized in a single-channel FDD/TDD balancing scenario in conjunction with adjustment of radio and baseband processing parameters in order to dynamically adjust the FDD/TDD data allocation over time.

Counterpart method 1000 may similarly perform uplink and/or downlink communications with the FDD/TDD data allocation ratio selected by 830, which may as previously detailed involve control signaling between user-side and network-side to coordinate the alternating FDD/TDD operation of alternating FDD/TDD channel 114

840 and 1040 may continue to perform uplink and/or downlink communications in accordance with the selected FDD/TDD data allocation ratio, ensuring that alternating FDD/TDD channel 114 operates in FDD and TDD mode for the proper cumulative durations over each application time period. 840 and 1040 may continue indefinitely, e.g. until a new FDD/TDD data allocation is selected at a later time, thus repeating the FDD/TDD data allocation adjustment and execution process, or for a certain number of repetitions of the application time period. The single-channel FDD/TDD data allocation operation of the second aspect of the disclosure may thus utilize a selected FDD/TDD data allocation ratio to dynamically adjust to evolving cell conditions.

The second aspect of the disclosure may be considered a time multiplexing scheme of FDD/TDD operation, i.e. in which certain portions of time are allocated for FDD operation of a single carrier channel while other portions of time are allocated for TDD operation of the single carrier channel.

It is understood that FDD/TDD carrier switching may have an appreciable effect on both uplink and downlink communications, as both a base station and all served mobile terminals may be required to perform both uplink and downlink communications according to an FDD or TDD scheme dependent on the current operation of the carrier channel.

In a third aspect of the disclosure, single-channel and multi-channel balancing may be simultaneously applied to multiple wireless carrier channels, which may be wireless channels with separate wireless frequency resources or the same frequency resources (e.g. a spatial stream in a MIMO context). Accordingly, it is appreciated that the third aspect of the disclosure may apply the multi-channel FDD/TDD balancing of the first aspect of the disclosure to the single-channel FDD/TDD balancing second aspect of the disclosure. For example, as opposed to exclusively operating carrier channel 110 as an FDD channel and carrier channel 112 as a TDD channel, FDD/TDD allocation controller 120 may instead utilize carrier channels 110 and 112 as alternating FDD/TDD channels. In other words, FDD/TDD allocation controller 120 may dynamically switch carrier channels 110 and 122 between FDD/TDD operations in addition to performing balancing using FDD/TDD data allocation.

Figure 13:
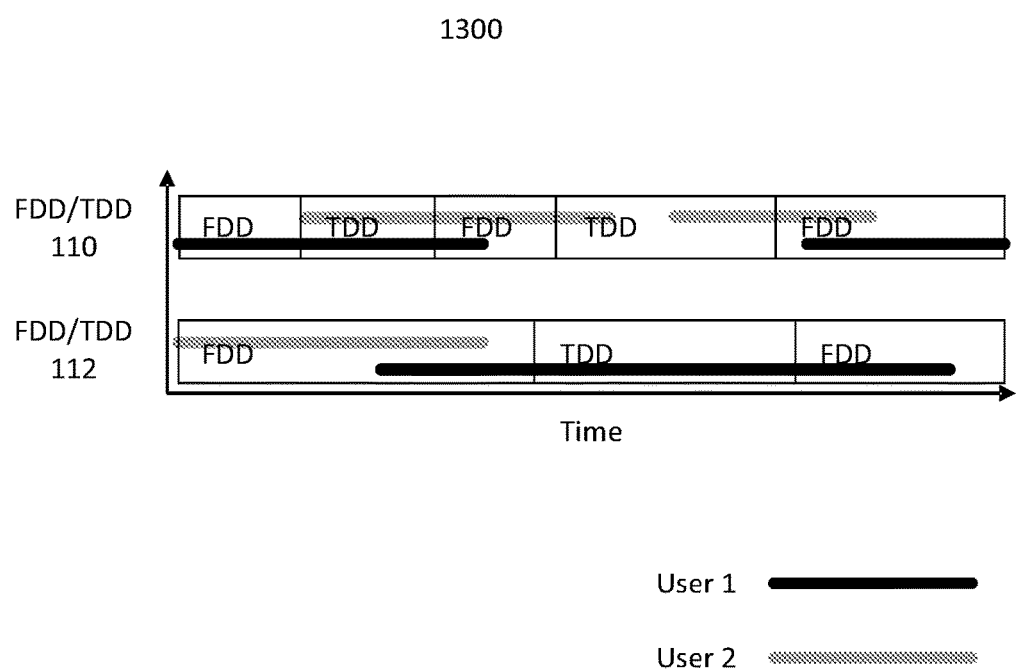
FIG. 13 shows a fourth timing diagram according to a multi-channel FDD/TDD data allocation scheme.

FIG. 13 shows time-frequency chart 1300 further illustrating the third aspect of the disclosure. As shown in time-frequency chart 1300, FDD/TDD allocation controller 1300 may switch both FDD/TDD channel 110 and FDD/TDD channel 112 between FDD and TDD operation. Accordingly, during certain periods of time FDD/TDD channel 110 and FDD/TDD channel 112 may both be operating in FDD, during other periods of time FDD/TDD channel 110 and FDD/TDD channel 112 may both be operating in TDD, during other periods of time FDD/TDD channel 110 may be operating in FDD and FDD/TDD channel 112 may be operating in TDD, during other periods of time FDD/TDD channel 110 may be operating in TDD and FDD/TDD channel 112 may be operating in FDD, and during other periods of time one or both of FDD/TDD channels 110 and 112 may be de-activated on a cell-level. FDD/TDD allocation controller 120 may render such decisions on the specific duplexing operation of FDD/TDD channels 110 and 112 on the dynamic allocation criteria previously detailed, including mobile terminal positioning, mobile terminal access channel properties (e.g. channel state), mobile terminal type (i.e. specific make and/or model), current mobile terminal status information, mobile terminal application and other operational requirements, etc.

As shown by the user plots in FIG. 13, FDD/TDD allocation controller 120 may allocate mobile terminals to both FDD/TDD channels 110 and 112 simultaneously. Accordingly, FDD/TDD allocation controller 120 may assign mobile terminals a particular FDD/TDD data allocation ratio in the event that one of FDD/TDD channels 110 and 112 is operating in FDD while the other of FDD/TDD channels 110 and 112 is operating in TDD, e.g. may perform multi-channel FDD/TDD data allocation using FDD/TDD carrier aggregation.

Alternatively, FDD/TDD allocation controller 120 may in certain periods control both FDD/TDD channels 110 and 112 to operate according to the same duplexing mode, e.g. FDD or TDD, e.g. based on the available dynamic allocation criteria. FDD/TDD allocation controller 120 may render such a decision in situations where cell conditions are heavily suited towards either FDD or TDD, such as e.g. when large numbers of mobile terminals are at the cell edge or in close proximity to base station 104, respectively. Accordingly, FDD/TDD allocation controller 120 may control base station 104 and mobile terminal 102 to perform either FDD or TDD carrier aggregation dependent on the current cell conditions.

FDD/TDD allocation controller 120 may additionally perform the cumulative time FDD/TDD data allocation as detailed above regarding the single-channel FDD/TDD balancing of the second aspect of the disclosure. Accordingly, FDD/TDD allocation controller 120 may control FDD/TDD channels 110 and 112 to operate according to a selected FDD/TDD cumulative time balance over a set time period, which may be different for both FDD/TDD channel 110 and FDD/TDD channel 112. For example, FDD/TDD allocation controller 120 may designate a 75/25 FDD/TDD data allocation ratio for FDD/TDD channel 110 and a 40/60 FDD/TDD data allocation ratio for FDD/TDD channel 112. Accordingly, FDD/TDD channel 110 may operate in FDD for 75% of a first set time period and TDD for the remaining 25% and FDD/TDD channel 112 may operate in TDD for 60% of a second set time period and FDD for the remaining 40%. It is appreciated that the first and second set time periods may be the same length, offset with the same length, or offset with different lengths. FDD/TDD allocation controller 120 may render such decisions based on the available dynamic allocation criteria.

As shown in FIG. 13, FDD/TDD allocation controller 120 may assign particular users to FDD/TDD channels 110 and 112. For example, FDD/TDD allocation controller 120 may assign mobile terminal 102 to exclusively utilize FDD/TDD channel 110, to exclusively utilize FDD/TDD channel 112, or to utilize both FDD/TDD channels 110 and 112, e.g. in a carrier aggregation scheme.

FDD/TDD allocation controller 120 may additionally aggregate dynamic allocation criteria from multiple or all mobile terminals served in a particular cell of base station 104 to render allocation of FDD/TDD channels 110 and 112, and may further allocate mobile terminals on a cell- or group-level to exclusively utilize one of FDD/TDD channels 110 and 112, e.g. or both of FDD/TDD channels 110 and 112 according to a carrier aggregation scheme, which may also include FDD/TDD data allocation.

It is appreciated that methods 800 and 1000 may similarly apply to FIG. 13, where FDD/TDD allocation controller 120 may aggregate and evaluate available dynamic allocation criteria on a handset-level, group-level, or cell-level in 820. FDD/TDD allocation controller 120 may then adjust the FDD/TDD data allocation based on the dynamic allocation criteria in 830, such as by assigning one or more mobile terminals to one or more of FDD/TDD channels 110 and 112 and/or designating the duplexing scheme of FDD/TDD channels 110 and 112. FDD/TDD allocation controller 120 may then initiate uplink and/or downlink communications in 840 using the selected FDD/TDD data allocation, such as by providing control signaling to base station 104 and the one or more affected mobile terminals (which may be e.g. cell-level in the case of a duplexing switch for FDD/TDD channel 110 or 112) that indicates the updated FDD/TDD data allocation.

Similarly, a mobile terminal executing method 1000 such as e.g. mobile terminal 102 may identify and transmit available dynamic allocation criteria to FDD/TDD allocation controller 120 (via e.g. base station 104) in 1020. Mobile terminal 102 may then adjust the uplink and/or downlink configuration in response to an FDD/TDD data allocation specified by FDD/TDD allocation controller in 1030, and may perform uplink and/or downlink communications in 1040 with the specified FDD/TDD data allocation. Such may involve switching between FDD/TDD channels 110 and 112 and/or switching to or from a carrier aggregation scheme using FDD/TDD channels 110 and 112, e.g. according to an FDD/TDD data allocation ratio.

The third aspect of the disclosure may additionally be applied to a Multiple Input Multiple Output (MIMO) scheme providing at least two separate spatial streams. For example, a base station may provide at least two spatial streams as part of a MIMO scheme, where the spatial streams may utilize identical time-frequency resources. In accordance with MIMO operation, both spatial streams may be uniquely recovered by exploiting spatial diversity in transmit and receive antennas as well as pre-coding.

Similarly to as detailed regarding FIG. 13, FDD/TDD allocation controller 120 may control each spatial stream to operate in FDD or TDD, and accordingly may perform uplink and/or downlink communications using dynamically selected FDD/TDD data allocation based on available dynamic allocation criteria.

Figure 14:
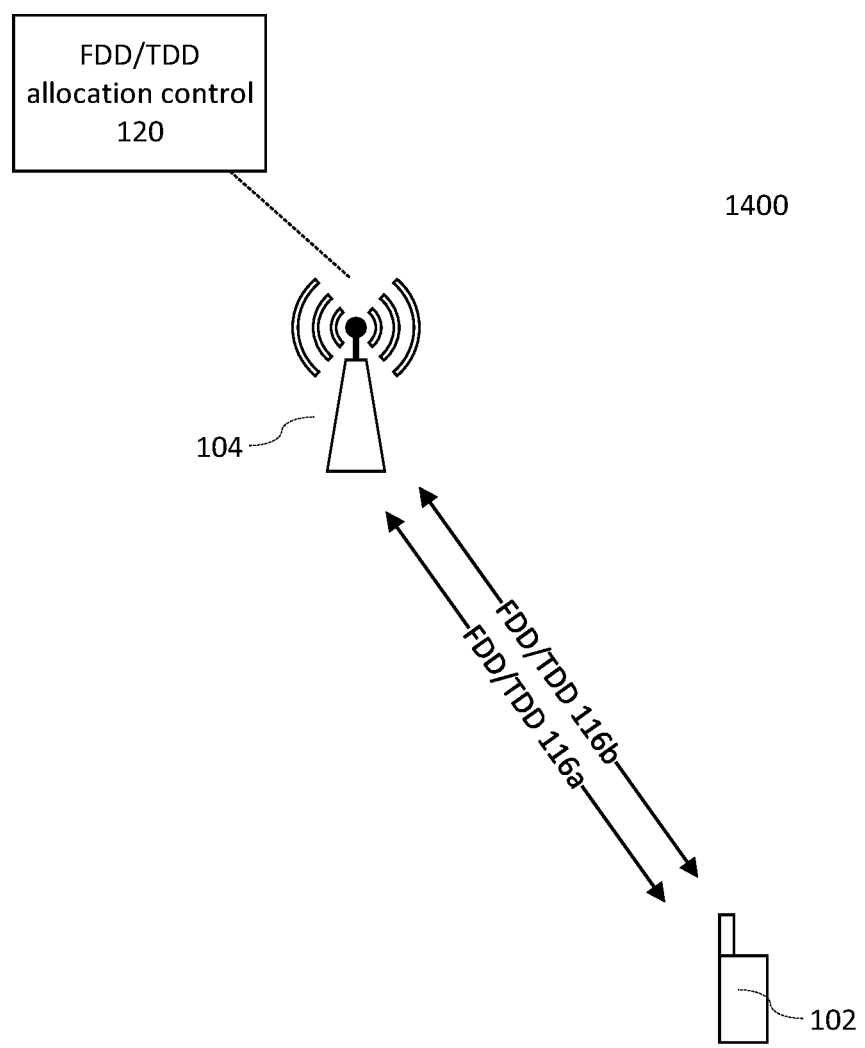
FIG. 14 shows a fifth mobile communication network.

FIG. 14 shows mobile communication network 1400, which may include mobile terminal 102, base station 104, and FDD/TDD allocation controller 120. As shown in FIG. 14, base station 104 may provide Multiple Input Multiple Output (MIMO) FDD/TDD channels 116a and 116b to mobile terminal 102. It is appreciated that MIMO FDD/TDD channels 116a and 116b may cumulatively compose alternating FDD/TDD channel 116, i.e. may utilize the same wireless frequency resources (i.e. same subcarriers distributed across the channel bandwidth) as one another. However, the wireless channel response of each of MIMO FDD/TDD channels 116a and 116b may differ due to the spatial diversity of transmit and receive antennas at base station 104 and mobile terminals 102 in addition to e.g. any pre-coding.

In addition to utilizing the same frequency resources, MIMO FDD/TDD channels 116a and 116b may each utilize the same time resources, i.e. may operate concurrently to one another for uplink and/or downlink communications. It is thus appreciated that base station 104 and mobile terminal 104 may accordingly require multiple transmit and receive antennas exhibiting spatial diversity in order to properly execute a MIMO scheme. Furthermore, the exemplary scenario of mobile network 1400 is understood as implementing a 2×2 MIMO scheme according to the two separate channels. However, such is considered demonstrative in nature and may be readily expanded to higher-rank MIMO schemes in order to utilize more than two spatial streams.

Accordingly, base station 104 may provide two separate wireless channels in MIMO FDD/TDD channels 116a and 116b. Although MIMO FDD/TDD channels 116a and 116b utilize the same time and frequency resources, spatial diversity may allow for both MIMO channels to be individually decoded at base station 104 and mobile terminal 102 for uplink and downlink transmissions, respectively.

Accordingly, FDD/TDD allocation controller 120 may perform FDD/TDD data allocation using MIMO FDD/TDD channels 116a and 116b as substantially independent channels, e.g. substantially similar in function as to the FDD/TDD data allocation between FDD/TDD channel 110 and FDD/TDD channel 112 detailed regarding FIG. 13.

FDD/TDD allocation controller 120 may individually control each of MIMO FDD/TDD channels 116a and 116b to switch between FDD and TDD operation. Such decisions may be based on dynamic allocation criteria indicating current cell conditions.

Figure 15:
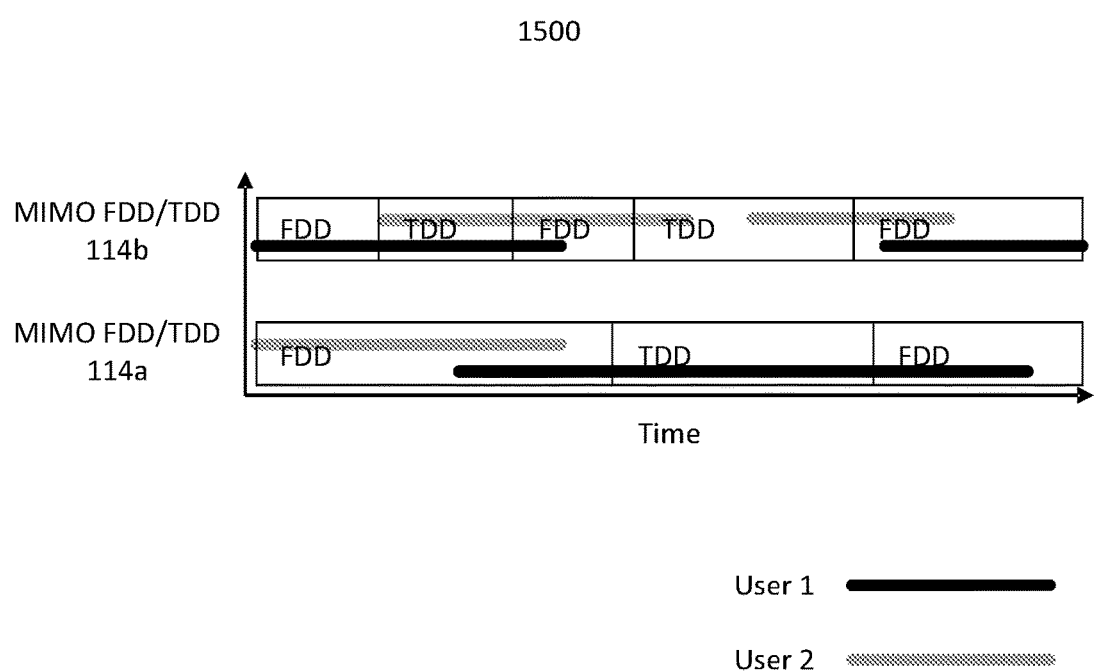
FIG. 15 shows a fifth timing according to an FDD/TDD data allocation scheme using MIMO.

FIG. 15 shows time-frequency chart 1500 illustrating the operation of the third aspect of the disclosure employing a MIMO approach. Accordingly, FDD/TDD allocation controller 120 may dynamically evaluate handset-level, group-level, or cell-level dynamic allocation criteria in order to adapt the operation of MIMO FDD/TDD channels 116a and 116b to address fluctuating cell conditions. Similarly to as detailed regarding FIG. 13, FDD/TDD allocation controller may dynamically control MIMO FDD/TDD channels 116a and 116b to operate according to the same duplexing scheme or different duplexing schemes. Additionally, FDD/TDD allocation controller 120 may individually allocate mobile terminals to operate exclusively on one of MIMO FDD/TDD channels 116a and 116b or to operate on both of MIMO FDD/TDD channels 116a and 116b, e.g. using a carrier aggregation scheme potentially employing an FDD/TDD data allocation ratio. It is appreciated that methods 800 and 1000 additionally apply hereto similarly as detailed regarding FIG. 13.

It is appreciated that single- and multi-channel FDD/TDD data allocation schemes detailed herein may be readily applied to scenarios offering more than two carrier channels or spatial streams. For example, carrier aggregation using three or more may similarly be controlled in accordance with an FDD/TDD data allocation ratio cumulative over all participating channels, and may be similarly controlled by FDD/TDD allocation controller 120 as detailed above. Massive MIMO massive MIMO systems, i.e. MIMO systems employing >8 spatial streams, may be of particular interest, and may be employed to offer more direct control over single or groups of target mobile terminals. For example, an exemplary 32-layer MIMO scheme may provide 32 separate spatial streams. FDD/TDD allocation controller 120 may control the 32 available spatial streams according to a single- and/or multi-channel FDD/TDD data allocation scheme. For example, a first and second spatial stream may be exclusively allocated to a first mobile terminal, while a third spatial stream may be exclusively allocated to a second and third mobile terminal. A fourth spatial stream may be shared between the first and second mobile terminals. The remaining spatial streams may similarly be allocated to the same or additional mobile terminals, where each spatial stream may be allocated to one or more mobile terminals and each mobile terminal may be allocated one or more spatial streams. Accordingly, each of the spatial streams may be controlled based on the served mobile terminals of each stream according to the single- and/or multi-channel FDD/TDD allocation schemes detailed herein. Furthermore, mobile terminals may be assigned and reassigned to spatial streams on a dynamic basis using dynamic allocation criteria, such as by dynamically assigning one or more spatial streams to a group of proximate mobile terminals and operating the one or more spatial streams based on the dynamic allocation criteria for the group of proximate mobile terminals. Such may similarly be controlled by FDD/TDD allocation controller 120 as detailed above regarding the single- and/or multi-channel FDD/TDD data allocation schemes detailed above.

In a fourth aspect of the disclosure, the single- and/or multi-channel balancing of the first, second, and/or third aspects of the disclosure may be spatially expanded using sectorized and/or phased array antennas. Accordingly, a given base station divide its coverage area into multiple cells or even "subcells" using sectorized and/or phased array antennas. The base station may then provide one or more distinct FDD/TDD wireless carrier channels to each cell or subcell, and may accordingly be capable of controlling a specific FDD/TDD data allocation for each individual cell or subcell, such as by using one or more of the single- and/or multi-channel balancing approaches detailed herein.

Figure 16:
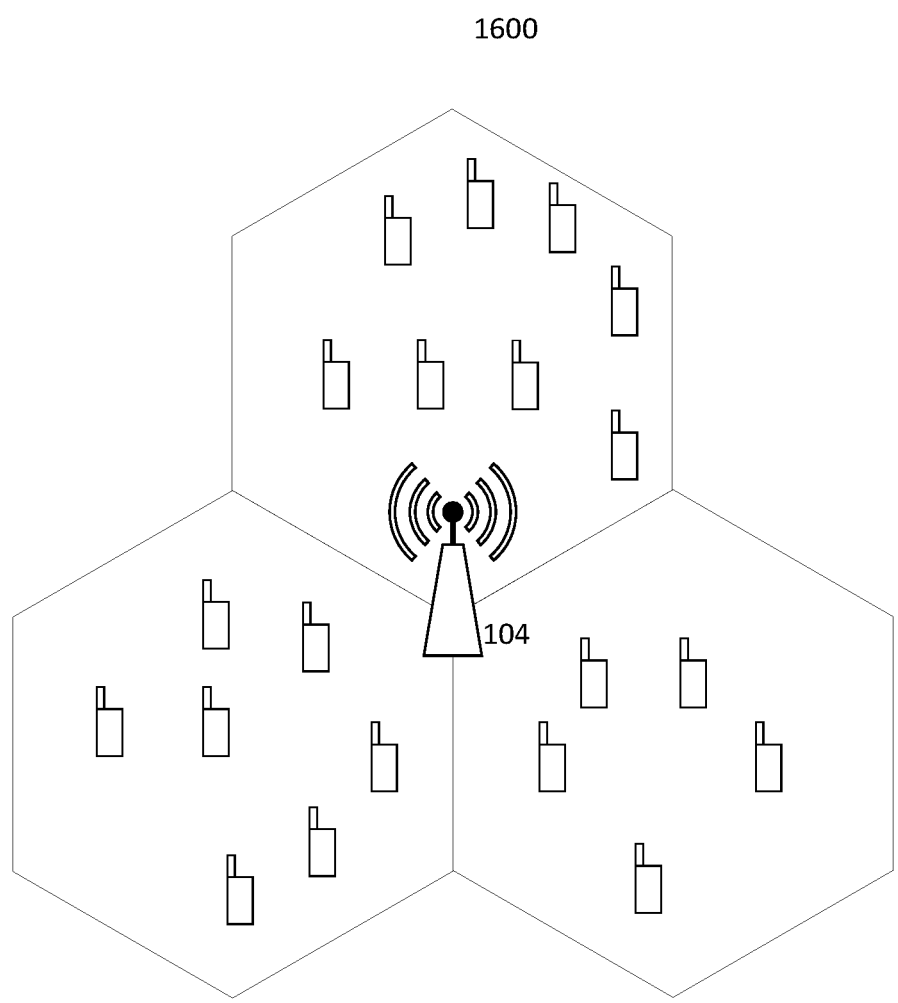
FIG. 16 shows a sixth mobile communication network.

FIG. 16 shows mobile communication network 1600, which may include base station 104 and multiple mobile terminals (not explicitly labeled in FIG. 16). As shown in FIG. 16, base station 104 may utilize sectorized antennas to create e.g. three separate cells, where each cell corresponds to at least one distinct wireless carrier channel. Although not explicitly shown in FIG. 16, it is understood that base station 104 may be connected, internally or externally, to FDD/TDD allocation controller 120, which may control the particular single- and/or multi-channel data allocation of each cell.

The various approaches for single- and/or multi-channel balancing of the first, second, and/or third aspects of the disclosure may thus be applied uniformly or individually to each of the three cells. For example, base station 104 may only be configured to support single channel/spatial stream communications (i.e. may not be configured to support carrier aggregation or MIMO), or may e.g. be configured to support carrier aggregation but not currently have access to sufficient wireless resources to implement carrier aggregation. Such an example of the latter may be in an LSA/SAS carrier aggregation implementation where an incumbent is currently occupying the registered shared bands, thus preventing an MNO from utilizing the LSA/SAS spectrum for mobile communications.

Accordingly, base station 104 may provide each of the three cells with a single carrier channel, thus facilitating uplink and downlink communications with the respective mobile terminals of each cell. In accordance with the single-channel balancing detailed regarding the first aspect of the disclosure, base station 104 may be able (via control provided by FDD/TDD allocation controller 120) to dynamically switch the duplexing operation of each carrier between FDD and TDD. Accordingly, FDD/TDD allocation controller 120 may aggregate and evaluate dynamic allocation criteria for each respective cell in order to determine whether FDD or TDD operation is more advantageous based on the current cell conditions. Base station 104 may then execute the FDD/TDD data allocation specified by FDD/TDD allocation controller 120, i.e. either exclusive TDD or FDD duplexing or a cumulative FDD/TDD data allocation ratio executed over a given time period, for each cell. FDD/TDD allocation controller 120 may thus apply the sectorized coverage areas, enabled by sectorized antennas of base station 104, in order to individually control the FDD/TDD data allocation for each cell.

Alternatively, base station 104 may be configured to support MIMO communications with each cell, and accordingly may have multiple spatial streams available for mobile communications with the mobile terminals of each cell. Accordingly, FDD/TDD allocation controller 120 may utilize the multiple spatial streams to provide multiple separate MIMO FDD/TDD channels to each cell, thus enabling the combined single- and multi-channel FDD/TDD data allocation detailed regarding the third aspect of the disclosure. Accordingly, FDD/TDD allocation controller 120 may evaluate cell conditions in each cell based on available dynamic allocation criteria in order to determine whether each spatial stream in each cell should be set to FDD or TDD operation in addition to allocating mobile terminals to operate according to carrier aggregation, which may include FDD/TDD carrier aggregation utilizing an FDD/TDD data allocation ratio.

Alternatively, base station 104 may be configured to operate with multiple carrier channels and may be allocated with sufficient wireless resources to realize operation of multiple carriers. Such may depend on spectrum availability, in particular in scenarios where a potential second carrier utilizes shared spectrum such as SAS/LSA spectrum.

Accordingly, FDD/TDD allocation controller 120 may individually control the two (or hypothetically e.g. three or more) carrier channels of each cell. In accordance with the multi-channel balancing of the first aspect of the disclosure, FDD/TDD allocation controller 120 may allocate a first carrier channel as an FDD channel and a second carrier channel as a TDD channel. FDD/TDD allocation controller 102 may then allocate mobile terminals on a handset-level, group-level, or cell-level to utilize one or both of the FDD and TDD channel, e.g. utilizing an FDD/TDD data allocation ratio as specified by FDD/TDD allocation controller 120 based on an analysis of current cell conditions.

Alternatively, FDD/TDD allocation controller 120 may employ the single- and multi-channel balancing detailed in the third aspect of the disclosure, where carrier channels may be dynamically switched between FDD and TDD operation in addition to allocating mobile terminals on a handset-level, group-level, or cell-level to utilize one or both carriers channels, such as by utilizing both carrier channels for carrier aggregation e.g. including FDD/TDD carrier aggregation using an FDD/TDD data allocation ratio.

Alternatively, one or more cells of base station 104 have different mobile communication capabilities regarding supported number of carriers, MIMO, spectral resources, etc., and may be further individually addressed based thereon by FDD/TDD allocation controller 120.

Figure 17:
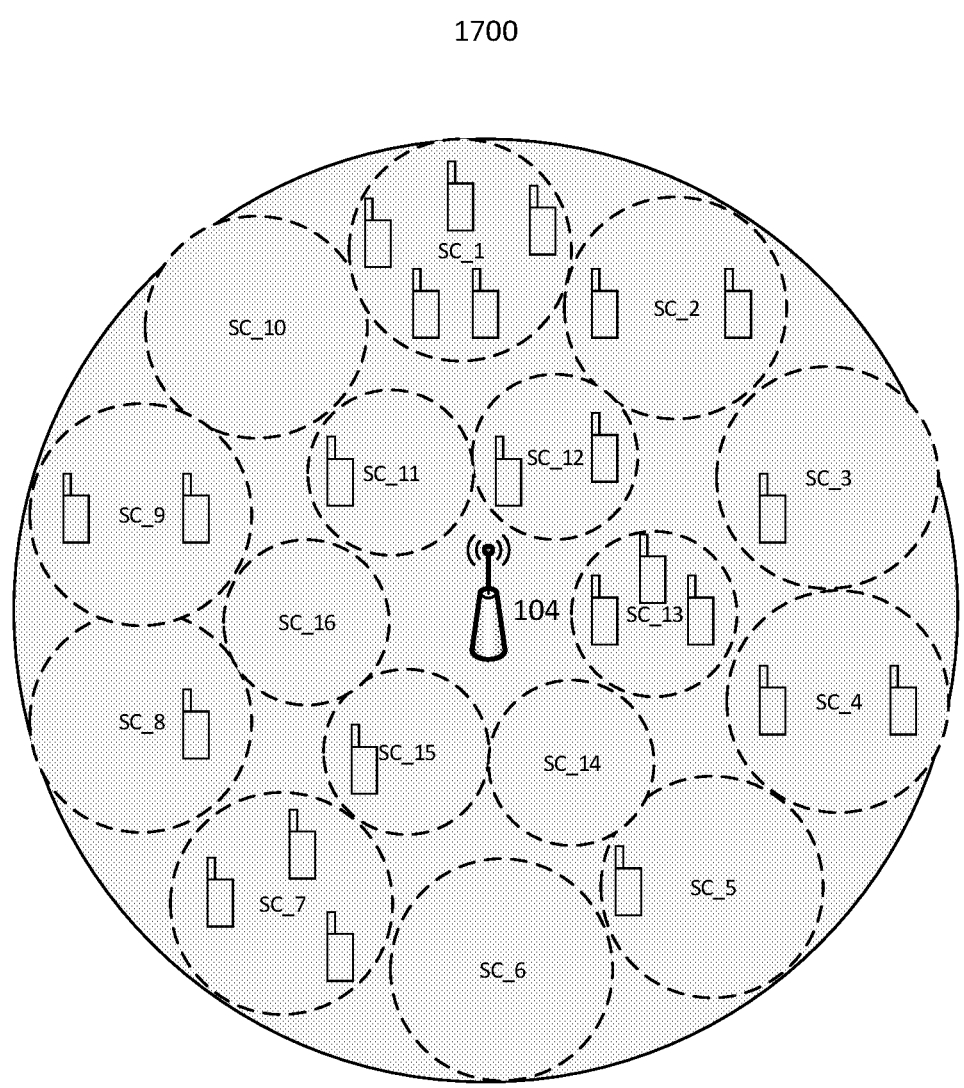
FIG. 17 shows a seventh mobile communication network.

FIG. 17 shows mobile communication network 1700, which may include base station 104 and multiple mobile terminals (not explicitly labeled in FIG. 17). As shown in FIG. 17, base station 104 may utilize phased array antennas to create multiple "subcells", where each subcell corresponds to at least one distinct wireless carrier channel. Although not explicitly shown in FIG. 17, it is understood that base station 104 may be connected, internally or externally, to FDD/TDD allocation controller 120, which may control the particular single- and/or multi-channel data allocation of each cell.

As shown in FIG. 17, base station 104 may serve e.g. 16 separate subcells through the use of phased array antennas. It is appreciated that the resolution and/or granularity of such subcells may be dependent on the capabilities of a particular base station, and accordingly more or fewer subcells may be provided with greater or smaller geographical areas. For example, subcells implemented by phased array antennas exhibiting exceptionally high resolution may be created for each mobile terminal, thereby providing an approach to uniquely serve (and potentially "track" over time and space) each mobile terminal individually. Accordingly, base station 104 may change the coverage area of each subcell in location and area over time by adjusting the phased array antennas serving each subcell. Base station 104 may therefore track the location(s) of one or a group of mobile terminals over time in order to continuously provide a selected FDD/TDD data allocation to the targeted mobile terminal(s) using single- and/or multi-channel balancing.

Accordingly, base station 104 may utilize phased array antennas to scan between each subcell (where each subcell may change in geographical location and area over time) in order to provide one or more carrier channels to the served mobile terminals. Similar to as detailed above regarding FIG. 16, FDD/TDD allocation controller 120 may individually address the cell conditions of each of subcells SC_1-SC_16 using available dynamic allocation criteria in order to determine an appropriate FDD/TDD data allocation for each subcell. Accordingly, dependent on the carrier aggregation support, MIMO support, and current spectral availability, FDD/TDD allocation controller 120 may be able to control single- and/or multi-channel FDD/TDD data allocation according to the first, second, and/or third aspects of the disclosure in order to serve each subcell. It is understood that the exemplary scenarios detailed regarding each cell of mobile communication network 1600 are equivalently applicable to each subcell of mobile communication network 1700.

Figure 18:
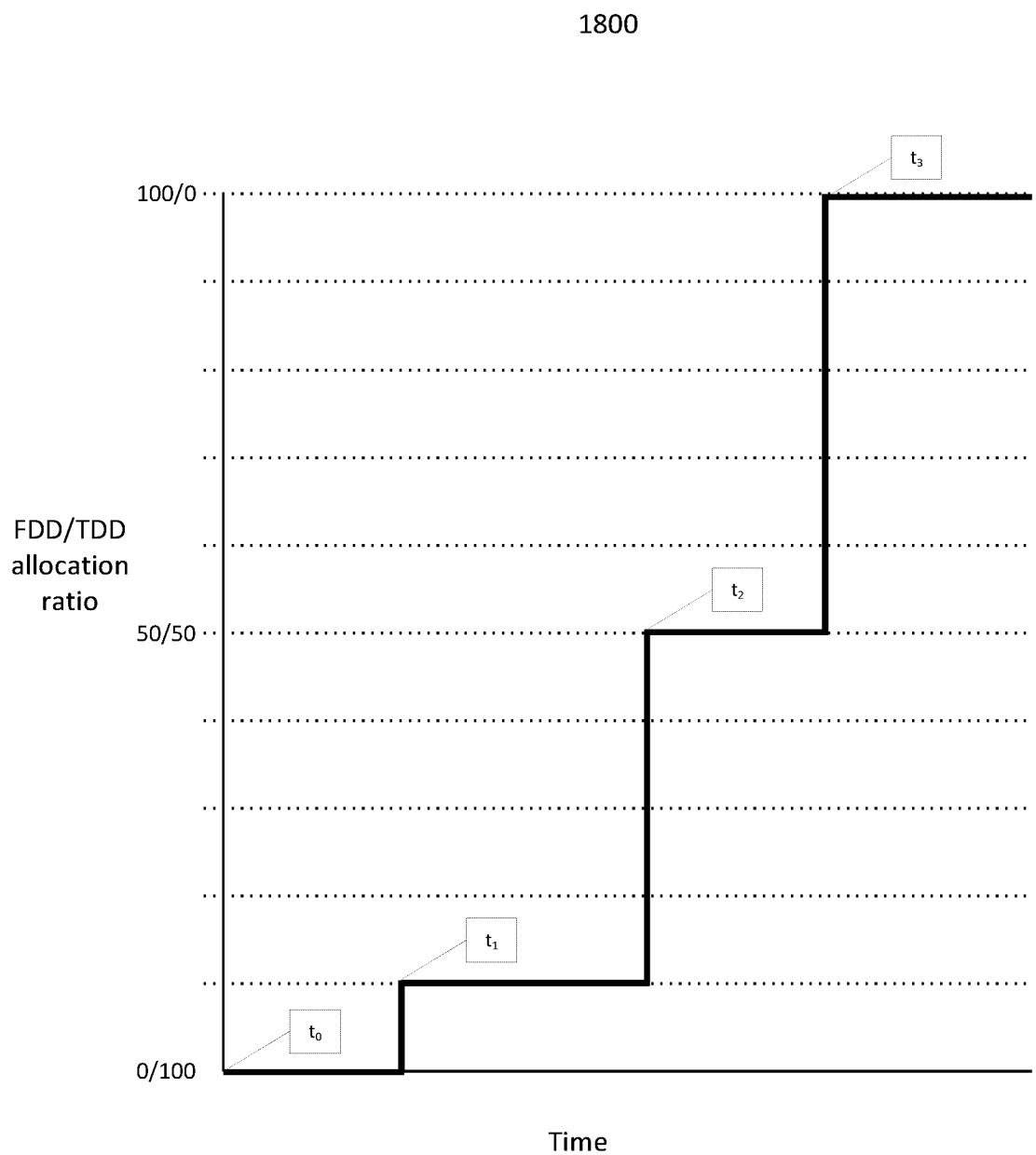
FIG. 18 shows an FD/TDD data allocation ratio plot.

FIG. 18 shows a FDD/TDD data allocation ratio plot 1800, which plots dynamic adjustment of the FDD/TDD data allocation ratio over time. It is appreciated that FDD/

TDD data allocation ratio plot 1800 may apply to any one of the singe- and/or multi-channel FDD/TDD balancing scenarios detailed above.

For example, FDD/TDD data allocation ratio plot 1800 may plot the FDD/TDD data allocation ratio between FDD channel 110 and TDD channel 112 provided by base station 104 on a cell level. Accordingly, FDD/TDD allocation controller 120 may control dynamic adjustments of cell-level data for base station 104 (i.e. for all mobile terminals in a given cell of base station 104 served by FDD channel 110 and TDD channel 112, which may be e.g. a sectorized cell or a subcell).

Accordingly, FDD/TDD allocation controller 120 may initially receive dynamic allocation criteria from one or more of the mobile terminals (e.g. target mobile terminals, via base station 104) served by FDD channel 110 and TDD channel 112, such as mobile terminal positioning, mobile terminal access channel properties (e.g. channel state), mobile terminal type (i.e. specific make and/or model), current mobile terminal status information, mobile terminal application and other operational requirements, etc. FDD/TDD allocation controller 120 may then evaluate the available dynamic allocation criteria to analyze current cell conditions. For example, FDD/TDD allocation controller 120 may determine that current cell conditions are appreciably favorable, e.g. all or most target mobile terminals are in geographic proximity and/or are experiencing strong propagation conditions (i.e. high channel quality with minimal interference, noise, spectral isolation, etc.). Accordingly, such cell conditions may be better suited for TDD operation. FDD/TDD allocation controller 120 may thus select an FDD/TDD data allocation ratio of 0/100 between FDD channel 110 and TDD channel 112, and may provide control signaling to base station 104 and the target mobile terminals (e.g. via base station 104) that indicates the selected FDD/TDD allocation ratio.

Accordingly, base station 104 may allocate all cell-level data (i.e. all data for the target mobile terminals) to TDD channel 110 for uplink and/or downlink communications. Similarly, the target mobile terminals may reconfigure the uplink and/or downlink configuration to exclusively utilize TDD channel 110. Base station 104 and the target mobile terminals may thus perform uplink and/or downlink communications utilizing the specified 0/100 FDD/TDD data allocation ratio beginning at time to.

FDD/TDD allocation controller 120 may continue to accumulate and evaluate dynamic allocation criteria aggregated from one or more of the target mobile terminals. Accordingly, based on the accumulated dynamic allocation criteria, FDD/TDD allocation controller 120 may determine that some of the target mobile terminals have moved away from base station 104, e.g. towards the cell edge, and/or propagation conditions are reasonably strong (e.g. some of the target mobile terminals are experiencing decent propagation conditions or e.g. most are still experiencing strong propagation conditions while relatively few are experiencing poor propagation conditions). Accordingly, FDD/TDD allocation controller 120 may adjust the FDD/TDD data allocation ratio to 10/90, and provide requisite control signaling to base station 104 and the target mobile terminals to apply the 10/90 FDD/TDD data allocation ratio at $t_1$.

After evaluating further dynamic allocation criteria, FDD/TDD allocation controller 120 may determine that some of the target mobile terminals are in geographic proximity while other of the target mobile terminals have moved towards the cell edge, and/or that propagation conditions are challenging (e.g. some of the target mobile terminals are experiencing shadowing, interference, noise, etc.). FDD/TDD allocation controller 120 may adjust the FDD/TDD data allocation ratio to 50/50, and provide requisite control signaling to base station 104 and the target mobile terminals to apply the 50/50 FDD/TDD data allocation ratio at $t_2$.

FDD/TDD allocation controller 120 may continue to accumulate and evaluate dynamic allocation criteria aggregated from one or more of the target mobile terminals in order to analyze cell conditions. FDD/TDD allocation controller 120 may then determine that most of the target mobile terminals have moved further towards the cell edge and/or propagation conditions are highly challenging (e.g. most of the target mobile terminals are experiencing shielding, shadowing, etc.). Accordingly, FDD/TDD allocation controller 120 may determine that the current cell conditions would be better suited for exclusive FDD operation, and may select a 100/0 FDD/TDD data allocation ratio. FDD/TDD allocation controller 120 may then provide the necessary control signaling to base station 104 and the target mobile terminals to apply the 100/0 FDD/TDD data allocation ratio at $t_3$.

It is appreciated that FDD/TDD allocation controller 120 may uniformly apply the FDD/TDD allocation ratio on an arbitrary basis, or may individually address specific target mobile terminals. For example, FDD/TDD allocation controller 120 may determine that approximately half of the target mobile terminals are experiencing strong propagation conditions while the remaining target mobile terminals are experiencing weak propagation conditions. FDD/TDD allocation controller 120 may then allocate the target mobile terminals experiencing strong propagation conditions to TDD channel 112 and the target mobile terminals experiencing weak propagation conditions to FDD channel 110, thus realizing a 50/50 FDD/TDD allocation ratio. Many such variations are appreciated herein.

It is noted that the above disclosure may emphasize a conventional mobile communication context, such as wireless communications between one or more base stations and one or more mobile terminals. However, it is appreciated that the implementation of FDD/TDD allocation controller 120 may be readily applied in other contexts both inside and outside the scope of mobile communications. For example, FDD/TDD allocation controller 120 may be applied in a Machine-to-Machine (M2M) or Device-to-Device (D2D, also known as Proximity Services or "ProSe" in an LTE contest) in order to organize M2M or D2D communications between two or more devices. For example, mobile terminal 102 may engage in M2M or D2D communications with another device, such as e.g. mobile terminal 108. Depending on the wireless frequency resources available for the M2M or D2D communications, mobile terminal 102 may be configured to select to utilize the wireless frequency resources for M2M or D2D communications with mobile terminal 108 in accordance with an FDD or TDD scheme. Additionally, mobile terminal 102 may be configured to control M2M or D2D transmission or reception of the allocated wireless frequency resources with a single- and/or multi-channel FDD/TDD data allocation scheme in accordance with any one or more of the aspects detailed herein. Accordingly, mobile terminal 102 may include an instance of FDD/TDD allocation controller 120, which may identify dynamic criteria characterizing the M2M or D2D communications with mobile terminal 108 in order to select an FDD/TDD data allocation to apply to the M2M or D2D communications, such as the distance between mobile terminal 102 and mobile terminal 108, channel properties of the wireless channel composed of the allocated wireless frequency resources, mobile terminal types of mobile terminal 102 and mobile terminal 108, mobile terminal status information of mobile terminal 102 and mobile terminal 108, mobile terminal application and other operational requirements of mobile terminal 102 and mobile terminal 108, etc. FDD/TDD allocation controller 120 may then evaluate the dynamic allocation criteria at mobile terminal 102 in order to control FDD and/or TDD operation of the wireless frequency resources allocated for the M2M or D2D communications between mobile terminal 102 and mobile terminal 108. Accordingly, it is appreciated that FDD/TDD allocation controller 120 may be realized in numerous different manners in order to control FDD and/or TDD operation of wireless frequency resources.

Figure 19:
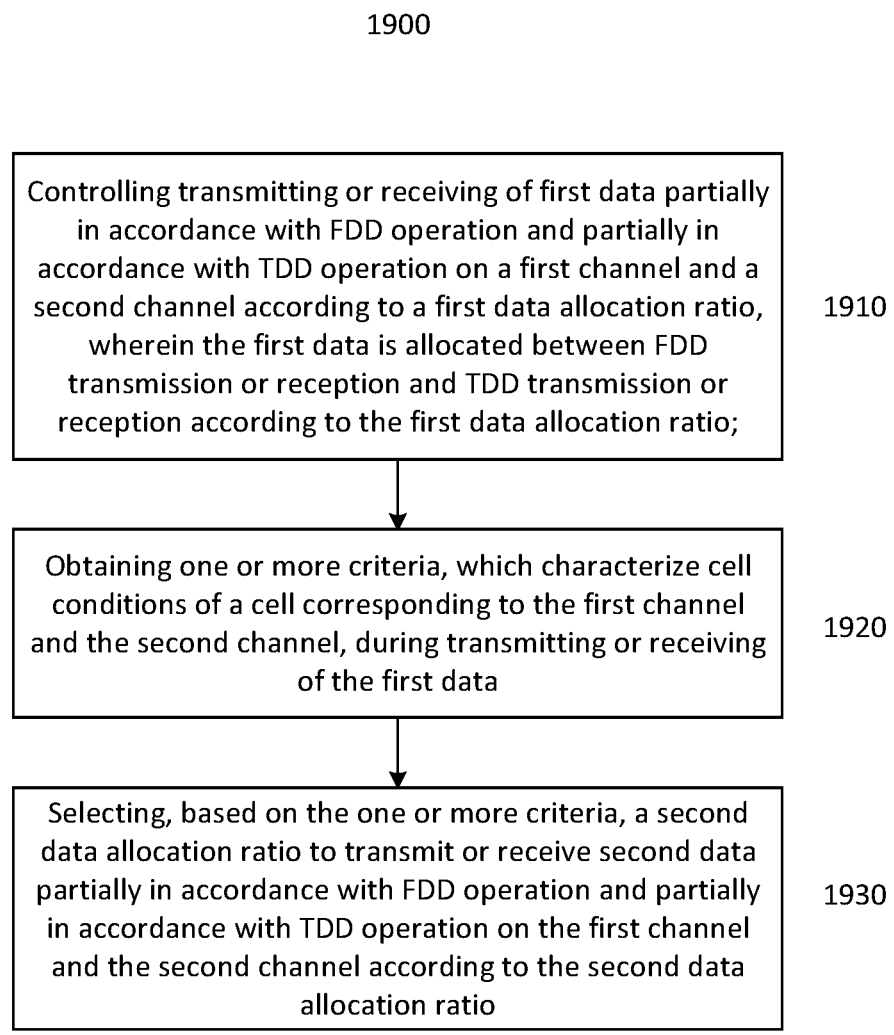
FIG. 19 shows a third flow chart illustrating a method for performing mobile communications.

FIG. 19 shows a flow chart illustrating method 1900 for performing mobile communications. Method 1900 may control transmitting or receiving of first data partially in accordance with FDD operation and partially in accordance with TDD operation on a first channel and a second channel according to a first data allocation ratio, wherein the first data is allocated between FDD transmission or reception and TDD transmission or reception according to the first data allocation ratio in 1910. Method 1900 may include obtaining one or more criteria, which characterize cell conditions of a cell corresponding to the first channel and the second channel, during transmitting or receiving of the first data in 1920. In 1930, method 1900 may select, based on the one or more criteria, a second data allocation ratio to transmit or receive second data partially in accordance with FDD operation and partially in accordance with TDD operation on the first channel and the second channel according to the second data allocation ratio.

In one or more further exemplary aspects of the disclosure, one or more of the features described above in reference to FIGS. 1-18 may be further incorporated into method 1900. In particular, method 1900 may be configured to perform further and/or alternate processes as detailed regarding FDD/TDD allocation controller 120 and/or base station 104.

Figure 20:
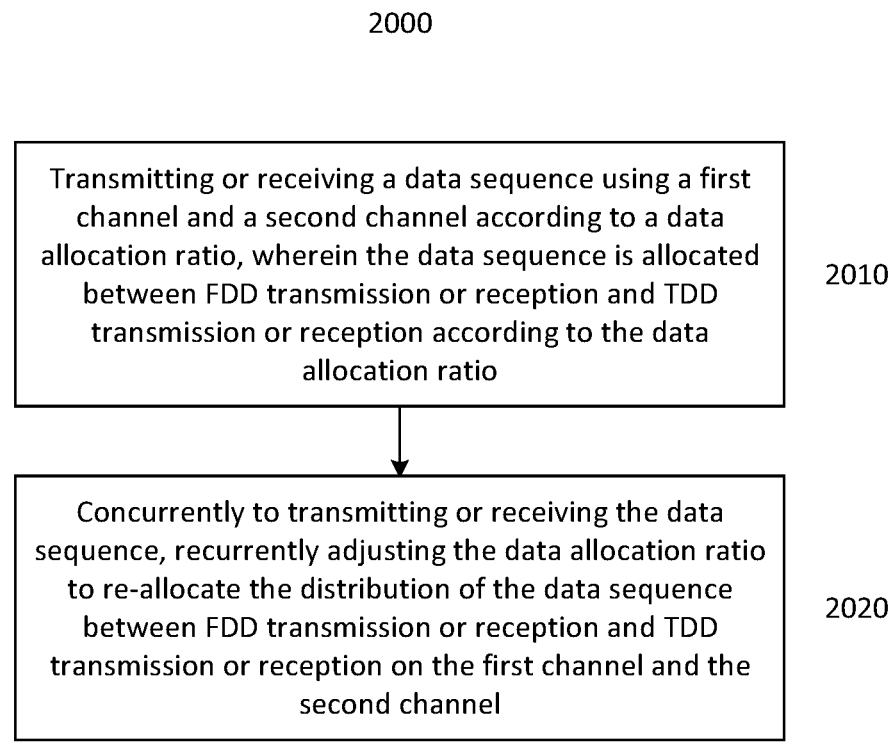
FIG. 20 shows a fourth flow chart illustrating a method for performing mobile communications.

FIG. 20 shows method 2000 for performing mobile communications. Method 2000 may in 2010 transmit or receive a data sequence using a first channel and a second channel according to a data allocation ratio, wherein the data sequence is allocated between FDD transmission or reception and TDD transmission or reception according to the data allocation ratio. Method 2000 may also in 2020, concurrently to transmitting or receiving the data sequence, recurrently adjust the data allocation ratio to re-allocate the distribution of the data sequence between FDD transmission or reception and TDD transmission or reception on the first channel and the second channel.

In one or more further exemplary aspects of the disclosure, one or more of the features described above in reference to FIGS. 1-18 may be further incorporated into method 2000. In particular, method 2000 may be configured to perform further and/or alternate processes as detailed regarding mobile terminal 102.

Figure 21:
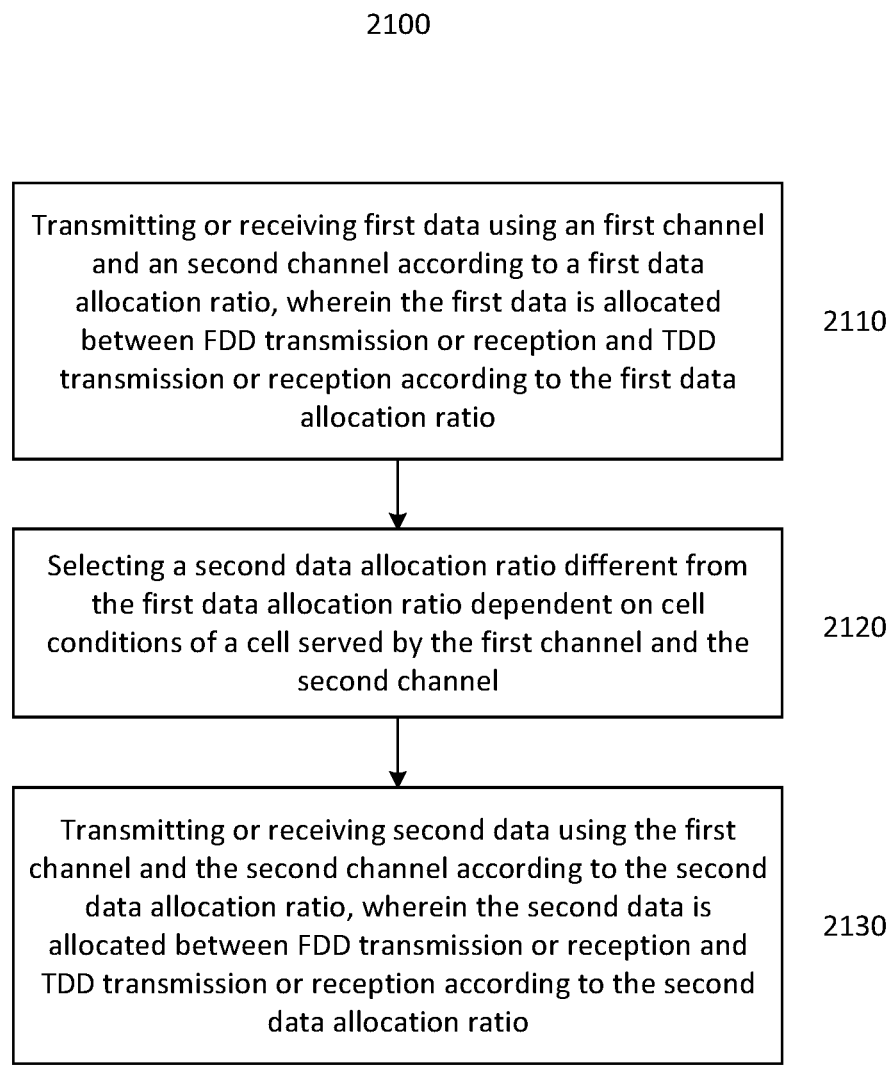
FIG. 21 shows a fifth flow chart illustrating a method for performing mobile communications.

FIG. 21 shows method 2100 for performing mobile communications. Method 2100 may in 2110 transmit or receive first data using an first channel and an second channel according to a first data allocation ratio, wherein the first data is allocated between FDD transmission or reception and TDD transmission or reception according to the first data allocation ratio. In 2120, method 2100 may select a second data allocation ratio different from the first data allocation ratio dependent on cell conditions of a cell served by the first channel and the second channel. Method 2100 may then in 2130 transmit or receive second data using the first channel and the second channel according to the second data allocation ratio, wherein the second data is allocated between FDD transmission or reception and TDD transmission or reception according to the second data allocation ratio.

In one or more further exemplary aspects of the disclosure, one or more of the features described above in reference to FIGS. 1-18 may be further incorporated into method 2100. In particular, method 2100 may be configured to perform further and/or alternate processes as detailed regarding mobile terminal 102.

Although several of the examples detailed above have explicitly referenced two total carrier channels (including MIMO spatial streams), e.g. an FDD channel and a TDD channel, it is appreciated that the above disclosure may additionally be readily expanded and applied to more than two total carrier channels.

It is appreciated that the terms "user equipment", "UE", "mobile terminal", etc., may apply to any wireless communication device, including cellular phones, tablets, laptops, personal computers, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

The following examples pertain to further aspects of the disclosure:

Example 1 is a method for performing mobile communications. The method includes controlling transmitting or receiving of first data partially in accordance with FDD operation and partially in accordance with TDD operation on a first channel and a second channel according to a first data allocation ratio, wherein the first data is allocated between FDD transmission or reception and TDD transmission or reception according to the first data allocation ratio, during the transmitting or receiving of the first data, obtaining one or more criteria, which characterize cell conditions of a cell corresponding to the first channel and the second channel, during the transmitting or receiving of the first data, and selecting, based on the one or more criteria, a second data allocation ratio to transmit or receive second data partially in accordance with FDD operation and partially in accordance with TDD operation on the first channel and the second channel according to the second data allocation ratio.

In Example 2, the subject matter of Example 1 can optionally further include controlling transmitting or receiving of the second data on the first channel and the second channel according to the second data allocation ratio.

In Example 3, the subject matter of Example 2 can optionally include wherein the controlling transmitting or receiving of the second data on the first channel and the second channel according to the second data allocation ratio includes controlling a sectorized antenna system or phased antenna array to transmit or receive the second data to the one or more mobile terminals in the cell.

In Example 4, the subject matter of Example 2 can optionally include wherein the cell is a sectorized cell or a subcell of a base station.

In Example 5, the subject matter of Example 2 can optionally further include controlling transmitting or receiving of third data on a third channel corresponding to an additional cell.

In Example 6, the subject matter of Example 5 can optionally include wherein the cell and the additional cell are sectorized cells or a subcells of a base station.

In Example 7, the subject matter of Example 1 can optionally include wherein the first channel and the second channel share the same set of wireless frequency resources according to a time multiplexing scheme.

In Example 8, the subject matter of Example 7 can optionally include wherein the first channel is composed of one or more first durations of time during which the set of wireless frequency resources is allocated for FDD transmission or reception and the second channel is composed of one or more second durations of time during which the set of wireless frequency resources is allocated for TDD transmission or reception.

In Example 9, the subject matter of any one of Examples 1 or 7 to 8 can optionally further include controlling transmitting or receiving of the second data using FDD transmission or reception during a first time period on the first channel and controlling transmitting or receiving of the second data using TDD transmission or reception during a second time period on the second channel, wherein the duration of the first time period is proportional to the duration of the second time period according to the second data allocation ratio.

In Example 10, the subject matter of Example 1 can optionally include wherein the first channel includes the same wireless frequency resources as the second channel, and wherein the first channel is a first MIMO spatial stream and the second channel is a second MIMO spatial stream.

In Example 11, the subject matter of Example 1 can optionally include wherein the first channel and the second channel utilize different frequency resources according to a frequency multiplexing scheme.

In Example 12, the subject matter of Example 11 can optionally include wherein the first channel is composed of a first set of wireless frequency resources and the second channel is composed of a second set of wireless frequency resources different from the first set of wireless frequency resources.

In Example 13, the subject matter of any one of Examples 1, 11, or 12 can optionally further include controlling transmitting or receiving of a first portion of the second data using FDD transmission or reception on the first channel and controlling transmitting or receiving of a second portion of the second data using TDD transmission or reception on the second channel, wherein the size of the first portion of the second data is proportional to the size of the second portion of the second data according to the second data allocation ratio.

In Example 14, the subject matter of any one of Examples 1 to 2 or 13 can optionally include wherein the first channel and the second channel are carrier channels in an FDD/TDD carrier aggregation scheme.

In Example 15, the subject matter of any one of Examples 1 to 14 can optionally include wherein at least one of the first channel and the second channel is composed of Licensed Spectrum Access (LSA) or Spectrum Access System (SAS) frequency spectrum.

In Example 16, the subject matter of Example 1 can optionally further include utilizing an FDD/TDD carrier aggregation scheme to control transmitting or receiving of the second data partially in accordance with FDD transmission or reception on the first channel and partially in accordance with TDD transmission or reception on the second channel according to the second data allocation ratio.

In Example 17, the subject matter of Example 1 can optionally include wherein the first data and the second data consist of mobile communication data intended for a first mobile terminal.

In Example 18, the subject matter of Example 1 can optionally include wherein the first data and the second data include mobile communication data intended for a plurality of mobile terminals in the cell.

In Example 19, the subject matter of Example 18 can optionally include wherein the cell is a subcell and wherein the first data and the second data include data intended for a plurality of mobile terminals in the subcell.

In Example 20, the subject matter of any one of Examples 1 to 19 can optionally further include transmitting control signaling to one or more mobile terminals of the cell indicating the second data allocation ratio.

In Example 21, the subject matter of Example 1 can optionally include wherein the first data is allocated between FDD transmission or reception and TDD transmission or reception according to the first data allocation ratio according to the relative amount of the data transmitted or received using FDD transmission or reception and TDD transmission or reception.

In Example 22, the subject matter of Example 1 can optionally include wherein the first data is allocated between FDD transmission or reception and TDD transmission or reception according to the first data allocation ratio according to one or more of modulation scheme, coding rate, data rate, energy level per symbol, energy level per resource block, error correction scheme, beamforming scheme, coding scheme, channel bandwidth, or symbol duration.

In Example 23, the subject matter of any one of Examples 1 to 20 can optionally further include receiving control signaling from one or more mobile terminals of the cell, and determining the one or more criteria based on the control signaling.

In Example 24, the subject matter of any one of Examples 1 to 23 can optionally include wherein the one or more criteria include one or more of information indicating the location of the one or more mobile terminals within the cell, information indicating the wireless channel state of the one or more mobile terminals in the cell, information indicating the current status of the one or more mobile terminals in the cell, information indicating the mobile terminal type of the one or mobile terminals in the cell, or information indicating operational requirements of the one or more mobile terminals in the cell.

Example 25 is a base station device including a processor configured to perform the method of any one of Examples 1 to 24.

Example 26 is a mobile communication network control device including a processor configured to perform the method of any one of Examples 1 to 24.

Example 27 is an electronic circuit configured to perform the method of any one of Examples 1 to 24.

Example 28 is a method for performing mobile communications. The method includes transmitting or receiving a data sequence using a first channel and a second channel according to a data allocation ratio, wherein the data sequence is allocated between frequency division duplexing (FDD) transmission or reception and time division duplexing (TDD) transmission or reception according to the data allocation ratio, and concurrently to transmitting or receiving the data sequence, recurrently adjusting the data allocation ratio to re-allocate the distribution of the data sequence between FDD transmission or reception and TDD transmission or reception on the first channel and the second channel.

In Example 29, the subject matter of Example 28 can optionally include wherein the first channel and the second channel utilize the same set of wireless frequency resources according to a time multiplexing scheme.

In Example 30, the subject matter of Example 29 can optionally include wherein the first channel is composed of one or more first durations of time during which the set of wireless frequency resources is allocated for FDD transmission or reception and the second channel is composed of one or more second durations of time during which the set of wireless frequency resources is allocated for TDD transmission or reception.

In Example 31, the subject matter of any one of Examples 28 to 30 can optionally include wherein the transmitting or receiving a data sequence using a first channel and a second channel according to a data allocation ratio includes transmitting or receiving the data sequence using FDD transmission or reception during a first time period on the first channel and controlling transmission or reception of the data sequence using TDD transmission or reception during a second time period on the second channel, wherein the duration of the first time period is proportional to the duration of the second time period according to the data allocation ratio.

In Example 32, the subject matter of Example 28 can optionally include wherein the first channel includes the same wireless frequency resources as the second channel, and wherein the first channel is a first MIMO spatial stream and the second channel is a second MIMO spatial stream.

In Example 33, the subject matter of Example 28 can optionally include wherein the first channel and the second channel utilize different frequency resources according to a frequency multiplexing scheme.

In Example 34, the subject matter of Example 33 can optionally include wherein the first channel is composed of a first set of wireless frequency resources and the second channel is composed of a second set of wireless frequency resources different from the first set of wireless frequency resources.

In Example 35, the subject matter of any one of Examples 28 or 33 to 34 can optionally include wherein the transmitting or receiving a data sequence using a first channel and a second channel according to a data allocation ratio includes transmitting or receiving a first portion of the data sequence using FDD transmission on the first channel and transmitting or receiving a second portion of the data sequence using TDD transmission or reception on the second channel, wherein the size of the first portion of the second data is proportional to the size of the second portion of the second data according to the second data allocation ratio.

In Example 36, the subject matter of any one of Examples 28 or 33 to 35 can optionally include wherein the first channel and the second channel are carrier channels in an FDD/TDD carrier aggregation scheme.

In Example 37, the subject matter of any one of Examples 28 to 36 can optionally include wherein at least one of the first channel and the second channel is composed of Licensed Spectrum Access (LSA) or Spectrum Access System (SAS) frequency spectrum.

In Example 38, the subject matter of Example 28 can optionally include wherein the transmitting or receiving a data sequence using a first channel and a second channel according to a data allocation ratio includes utilizing an FDD/TDD carrier aggregation scheme to transmit or receive the data sequence with FDD transmission or reception on the first channel and with TDD transmission or reception on the second channel according to the second data allocation ratio.

In Example 39, the subject matter of any one of Examples 28 to 38 can optionally include wherein the recurrently adjusting the data allocation ratio to re-allocate the distribution of the data sequence between FDD transmission or reception and TDD transmission or reception on the first channel and the second channel includes receiving control signaling containing an instruction to adjust the data allocation ratio.

In Example 40, the subject matter of any one of Examples 28 to 38 can optionally further include transmitting control signaling indicating cell conditions of a cell corresponding to the first channel and the second channel.

In Example 41, the subject matter of Example 40 can optionally include wherein the recurrently adjusting the data allocation ratio to re-allocate the distribution of the data sequence between FDD transmission or reception and TDD transmission or reception on the first channel and the second channel includes responsive to the control signaling, receiving one or more control instructions to adjust the data allocation ratio.

In Example 42, the subject matter of Example 40 or 41 can optionally include wherein the control signaling includes information indicating the location of a mobile terminal in the cell, information indicating the wireless channel state of the mobile terminal, information indicating the current status of the mobile terminal, information indicating the mobile terminal type of the mobile terminal, or information indicating operational requirements of the mobile terminal.

In Example 43, the subject matter of Example 28 can optionally include wherein the data sequence is allocated between FDD transmission or reception and TDD transmission or reception according to the data allocation ratio according to the relative amount of the data transmitted or received using FDD transmission or reception and TDD transmission or reception.

In Example 44, the subject matter of Example 28 can optionally include wherein the data sequence is allocated between FDD transmission or reception and TDD transmission or reception according to the data allocation ratio according to one or more of modulation scheme, coding rate, data rate, energy level per symbol, energy level per resource block, error correction scheme, beamforming scheme, coding scheme, channel bandwidth, or symbol duration.

Example 45 is a mobile terminal device including a processor, wherein the processor is configured to perform the method of any one of Examples 28 to 44.

Example 46 is a mobile baseband modem including one or more digital processing circuits, wherein the mobile baseband modem is configured to perform the method of any one of Examples 28 to 44.

Example 47 is a method for performing mobile communications. The method includes transmitting or receiving first data using an first channel and an second channel according to a first data allocation ratio, wherein the first data is allocated between frequency division duplexing (FDD) transmission or reception and time division duplexing (TDD) transmission or reception according to the first data allocation ratio, selecting a second data allocation ratio different from the first data allocation ratio dependent on cell conditions of a cell served by the first channel and the second channel, and transmitting or receiving second data using the first channel and the second channel according to the second data allocation ratio, wherein the second data is allocated between FDD transmission or reception and TDD transmission or reception according to the second data allocation ratio.

In Example 48, the subject matter of Example 47 can optionally include wherein the first channel and the second channel utilize the same set of wireless frequency resources according to a time multiplexing scheme.

In Example 49, the subject matter of Example 48 can optionally include wherein the first channel is composed of one or more first durations of time during which the set of wireless frequency resources is allocated for FDD transmission or reception and the second channel is composed of one or more second durations of time during which the set of wireless frequency resources is allocated for TDD transmission or reception.

In Example 50, the subject matter of any one of Examples 47 to 49 can optionally include wherein the transmitting or receiving second data using the first channel and the second channel according to the second data allocation ratio includes transmitting or receiving the second data using FDD transmission or reception during a first time period on the first channel and controlling transmission or reception of the second data using TDD transmission or reception during a second time period on the second channel, wherein the duration of the first time period is proportional to the duration of the second time period according to the data allocation ratio.

In Example 51, the subject matter of Example 47 can optionally include wherein the first channel includes the same wireless frequency resources as the second channel, and wherein the first channel is a first MIMO spatial stream and the second channel is a second MIMO spatial stream.

In Example 52, the subject matter of Example 47 can optionally include wherein the first channel and the second channel utilize different frequency resources according to a frequency multiplexing scheme.

In Example 53, the subject matter of Example 52 can optionally include wherein the first channel is composed of a first set of wireless frequency resources and the second channel is composed of a second set of wireless frequency resources different from the first set of wireless frequency resources.

In Example 54, the subject matter of any one of Examples 47 or 52 to 53 can optionally include wherein the transmitting or receiving second data using the first channel and the second channel according to the second data allocation ratio includes transmitting or receiving a first portion of the second data using FDD transmission on the first channel and transmitting or receiving a second portion of the second data using TDD transmission or reception on the second channel, wherein the size of the first portion of the second data is proportional to the size of the second portion of the second data according to the second data allocation ratio.

In Example 55, the subject matter of any one of Examples 47 or 52 to 54 can optionally include wherein the first channel and the second channel are carrier channels in an FDD/TDD carrier aggregation scheme.

In Example 56, the subject matter of any one of Examples 47 to 55 can optionally include wherein at least one of the first channel and the second channel is composed of Licensed Spectrum Access (LSA) or Spectrum Access System (SAS) frequency spectrum.

In Example 57, the subject matter of Example 47 can optionally include wherein the transmitting or receiving second data using the first channel and the second channel according to the second data allocation ratio includes utilizing an FDD/TDD carrier aggregation scheme to transmit or receive the second data sequence partially with FDD transmission or reception on the first channel and with TDD transmission or reception on the second channel according to the second data allocation ratio.

In Example 58, the subject matter of any one of Examples 47 to 57 can optionally further include receiving control signaling indicating the second data allocation ratio.

In Example 59, the subject matter of any one of Examples 47 to 57 can optionally further include transmitting control signaling indicating cell conditions of a cell corresponding to the first channel and the second channel.

In Example 60, the subject matter of Example 59 can optionally include wherein the selecting a second data allocation ratio different from the first data allocation ratio dependent on cell conditions of a cell served by the first channel and the second channel includes responsive to the control signaling, receiving a control instruction indicating the second data allocation ratio.

In Example 61, the subject matter of Example 59 or 60 can optionally include wherein the control signaling includes information indicating the location of a mobile terminal in the cell, information indicating the wireless channel state of the mobile terminal, information indicating the current status of the mobile terminal, information indicating the mobile terminal type of the mobile terminal, or information indicating operational requirements of the mobile terminal.

In Example 62, the subject matter of Example 47 can optionally include wherein the second data is allocated between FDD transmission or reception and TDD transmission or reception according to the second data allocation ratio according to the relative amount of the data transmitted or received using FDD transmission or reception and TDD transmission or reception.

In Example 63, the subject matter of Example 47 can optionally include wherein the second data is allocated between FDD transmission or reception and TDD transmission or reception according to the second data allocation ratio according to one or more of modulation scheme, coding rate, data rate, energy level per symbol, energy level per resource block, error correction scheme, beamforming scheme, coding scheme, channel bandwidth, or symbol duration.

Example 64 is a mobile terminal device including a processor, wherein the processor configured to perform the method of any one of Examples 47 to 63.

Example 65 is a mobile baseband modem including one or more digital processing circuits, wherein the mobile baseband modem is configured to perform the method of any one of Examples 47 to 63.

Example 66 is a mobile terminal device including a radio processing circuit and a baseband processing circuit adapted to interact with the radio processing circuit. The mobile terminal device is configured to transmit or receive a data sequence using a first channel and a second channel according to a data allocation ratio, wherein the data sequence is allocated between frequency division duplexing (FDD) transmission or reception and time division duplexing (TDD) transmission or reception according to the data allocation ratio, and concurrently to transmitting or receiving the data sequence, recurrently adjust the data allocation ratio to re-allocate the distribution of the data sequence between FDD transmission or reception and TDD transmission or reception on the first channel and the second channel.

In Example 67, the subject matter of Example 66 can optionally include wherein the first channel and the second channel utilize the same set of wireless frequency resources according to a time multiplexing scheme.

In Example 68, the subject matter of Example 67 can optionally include wherein the first channel is composed of one or more first durations of time during which the set of wireless frequency resources is allocated for FDD transmission or reception and the second channel is composed of one or more second durations of time during which the set of wireless frequency resources is allocated for TDD transmission or reception.

In Example 69, the subject matter of any one of Examples 66 to 68 can optionally include wherein the transmitting or receiving a data sequence using a first channel and a second channel according to a data allocation ratio includes transmitting or receiving the data sequence using FDD transmission or reception during a first time period on the first channel and controlling transmission or reception of the data sequence using TDD transmission or reception during a second time period on the second channel, wherein the duration of the first time period is proportional to the duration of the second time period according to the data allocation ratio.

In Example 70, the subject matter of Example 66 can optionally include wherein the first channel includes the same wireless frequency resources as the second channel, and wherein the first channel is a first MIMO spatial stream and the second channel is a second MIMO spatial stream.

In Example 71, the subject matter of Example 66 can optionally include wherein the first channel and the second channel utilize different frequency resources according to a frequency multiplexing scheme.

In Example 72, the subject matter of Example 71 can optionally include wherein the first channel is composed of a first set of wireless frequency resources and the second channel is composed of a second set of wireless frequency resources different from the first set of wireless frequency resources.

In Example 73, the subject matter of any one of Examples 66 or 71 to 72 can optionally include wherein the transmitting or receiving a data sequence using a first channel and a second channel according to a data allocation ratio includes transmitting or receiving a first portion of the data sequence using FDD transmission on the first channel and transmitting or receiving a second portion of the data sequence using TDD transmission or reception on the second channel, wherein the size of the first portion of the second data is proportional to the size of the second portion of the second data according to the second data allocation ratio.

In Example 74, the subject matter of any one of Examples 66 or 71 to 73 can optionally include wherein the first channel and the second channel are carrier channels in an FDD/TDD carrier aggregation scheme.

In Example 75, the subject matter of any one of Examples 66 to 74 can optionally include wherein at least one of the first channel and the second channel is composed of Licensed Spectrum Access (LSA) or Spectrum Access System (SAS) frequency spectrum.

In Example 76, the subject matter of Example 66 can optionally include wherein the transmitting or receiving a data sequence using a first channel and a second channel according to a data allocation ratio includes utilizing an FDD/TDD carrier aggregation scheme to transmit or receive the data sequence with FDD transmission or reception on the first channel and with TDD transmission or reception on the second channel according to the second data allocation ratio.

In Example 77, the subject matter of any one of Examples 66 to 76 can optionally include wherein the recurrently adjusting the data allocation ratio to re-allocate the distribution of the data sequence between FDD transmission or reception and TDD transmission or reception on the first channel and the second channel includes receiving control signaling containing an instruction to adjust the data allocation ratio.

In Example 78, the subject matter of any one of Examples 66 to 76 can optionally be further configured to transmit control signaling indicating cell conditions of a cell corresponding to the first channel and the second channel.

In Example 79, the subject matter of Example 78 can optionally include wherein the recurrently adjusting the data allocation ratio to re-allocate the distribution of the data sequence between FDD transmission or reception and TDD transmission or reception on the first channel and the second channel includes responsive to the control signaling, receiving one or more control instructions to adjust the data allocation ratio.

In Example 80, the subject matter of Example 78 or 79 can optionally include wherein the control signaling includes information indicating the location of a mobile terminal in the cell, information indicating the wireless channel state of the mobile terminal, information indicating the current status of the mobile terminal, information indicating the mobile terminal type of the mobile terminal, or information indicating operational requirements of the mobile terminal.

In Example 81, the subject matter of Example 66 can optionally include wherein the data sequence is allocated between FDD transmission or reception and TDD transmission or reception according to the data allocation ratio according to the relative amount of the data transmitted or received using FDD transmission or reception and TDD transmission or reception.

In Example 82, the subject matter of Example 66 can optionally include wherein the data sequence is allocated between FDD transmission or reception and TDD transmission or reception according to the data allocation ratio according to one or more of modulation scheme, coding rate, data rate, energy level per symbol, energy level per resource block, error correction scheme, beamforming scheme, coding scheme, channel bandwidth, or symbol duration.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A mobile terminal device comprising a radio processing circuit and a baseband processing circuit adapted to interact with the radio processing circuit, the mobile terminal device configured to:

transmit or receive a data sequence using a first channel and a second channel according to a data allocation ratio, wherein the data sequence is allocated between frequency division duplexing (FDD) transmission or reception and time division duplexing (TDD) transmission or reception according to the data allocation ratio; and concurrently to transmitting or receiving the data sequence, recurrently adjust the data allocation ratio to re-allocate a distribution of the data sequence between FDD transmission or reception and TDD transmission or reception on the first channel and the second channel.

2. The mobile terminal device of claim 1, wherein the transmitting or receiving a data sequence using a first channel and a second channel according to a data allocation ratio comprises:
 transmitting or receiving the data sequence using FDD transmission or reception during a first time period on the first channel and controlling transmission or reception of the data sequence using TDD transmission or reception during a second time period on the second channel, wherein the duration of the first time period is proportional to the duration of the second time period according to the data allocation ratio.

3. The mobile terminal device of claim 1, wherein the transmitting or receiving a data sequence using a first channel and a second channel according to a data allocation ratio comprises:
 transmitting or receiving a first portion of the data sequence using FDD transmission on the first channel and transmitting or receiving a second portion of the data sequence using TDD transmission or reception on the second channel, wherein the size of the first portion of the second data is proportional to the size of the second portion of the second data according to the second data allocation ratio.

4. The mobile terminal device of claim 1, wherein the first channel and the second channel are carrier channels in an FDD/TDD carrier aggregation scheme.

5. The mobile terminal device of claim 1, wherein at least one of the first channel and the second channel is composed of Licensed Spectrum Access (LSA) or Spectrum Access System (SAS) frequency spectrum.

6. The mobile terminal device of claim 1, further configured to transmit control signaling indicating cell conditions of a cell corresponding to the first channel and the second channel.

7. The mobile terminal device of claim 6, wherein the recurrently adjusting the data allocation ratio to re-allocate the distribution of the data sequence between FDD transmission or reception and TDD transmission or reception on the first channel and the second channel comprises:
 responsive to the control signaling, receiving one or more control instructions to adjust the data allocation ratio.

8. The mobile terminal device of claim 6, wherein the control signaling comprises information indicating the location of a mobile terminal in the cell, information indicating the wireless channel state of the mobile terminal, information indicating the current status of the mobile terminal, information indicating the mobile terminal type of the mobile terminal, or information indicating operational requirements of the mobile terminal.

9. The mobile terminal device of claim 1, wherein the data sequence is allocated between FDD transmission or reception and TDD transmission or reception according to the data allocation ratio according to the relative amount of the data transmitted or received using FDD transmission or reception and TDD transmission or reception.

10. The mobile terminal device of claim 1, wherein the data sequence is allocated between FDD transmission or reception and TDD transmission or reception according to the data allocation ratio according to one or more of modulation scheme, coding rate, data rate, energy level per symbol, energy level per resource block, error correction scheme, beamforming scheme, coding scheme, channel bandwidth, or symbol duration.

11. A method for performing mobile communications comprising:
 controlling transmitting or receiving of first data partially in accordance with frequency division duplexing (FDD) operation and partially in accordance with time division duplexing (TDD) operation on a first channel and a second channel according to a first data allocation ratio, wherein the first data is allocated between FDD transmission or reception and TDD transmission or reception according to the first data allocation ratio;
 obtaining one or more criteria, which characterize cell conditions of a cell corresponding to the first channel and the second channel, during the transmitting or receiving of the first data; and
 selecting, based on the one or more criteria, a second data allocation ratio to transmit or receive second data partially in accordance with FDD operation and partially in accordance with TDD operation on the first channel and the second channel according to the second data allocation ratio.

12. The method of claim 11, further comprising controlling transmitting or receiving of the second data on the first channel and the second channel according to the second data allocation ratio.

13. The method of claim 12, wherein the controlling transmitting or receiving of the second data on the first channel and the second channel according to the second data allocation ratio comprises:
 controlling a sectorized antenna system or phased antenna array to transmit or receive the second data to the one or more mobile terminals in the cell.

14. The method of claim 11, wherein the first channel and the second channel share the same set of wireless frequency resources according to a time multiplexing scheme.

15. The method of claim 11, wherein the first channel and the second channel utilize different frequency resources according to a frequency multiplexing scheme.

16. The method of claim 11, wherein the first channel and the second channel are carrier channels in an FDD/TDD carrier aggregation scheme.

17. The method of claim 11, wherein at least one of the first channel and the second channel is composed of Licensed Spectrum Access (LSA) or Spectrum Access System (SAS) frequency spectrum.

18. The method of claim 11, further comprising receiving control signaling from one or more mobile terminals of the cell; and
 determining the one or more criteria based on the control signaling.

19. The method of claim 11, wherein the one or more criteria comprise one or more of information indicating the location of the one or more mobile terminals within the cell, information indicating the wireless channel state of the one or more mobile terminals in the cell, information indicating the current status of the one or more mobile terminals in the cell, information indicating the mobile terminal type of the one or mobile terminals in the cell, or information indicating operational requirements of the one or more mobile terminals in the cell.

20. A method for performing mobile communications comprising:
 transmitting or receiving a data sequence using a first channel and a second channel according to a data allocation ratio, wherein the data sequence is allocated between frequency division duplexing (FDD) transmission or reception and time division duplexing (TDD) transmission or reception according to the data allocation ratio; and concurrently to transmitting or receiving the data sequence, recurrently adjusting the data allocation ratio to re-allocate the distribution of the data sequence between FDD transmission or reception and TDD transmission or reception on the first channel and the second channel.

21. The method of claim 20, wherein the data sequence is allocated between FDD transmission or reception and TDD transmission or reception according to the data allocation ratio according to one or more of modulation scheme, coding rate, data rate, energy level per symbol, energy level per resource block, error correction scheme, beamforming scheme, coding scheme, channel bandwidth, or symbol duration.

22. The method of claim 20, wherein the first channel and the second channel utilize the same set of wireless frequency resources according to a time multiplexing scheme.

23. The method of claim 20, wherein the first channel and the second channel utilize different frequency resources according to a frequency multiplexing scheme.

* * * * *